US012119881B2

(12) United States Patent
Doerr et al.

(10) Patent No.: US 12,119,881 B2
(45) Date of Patent: Oct. 15, 2024

(54) OPTICAL MULTIPLE-INPUT-MULTIPLE-OUTPUT (MIMO) RECEIVER USING STOKES VECTOR MEASUREMENTS

(71) Applicant: Aloe Semiconductor Inc., Irvine, CA (US)

(72) Inventors: Christopher R. Doerr, Middletown, NJ (US); Ying Zhao, Holmdel, NJ (US)

(73) Assignee: Aloe Semiconductor Inc., Middletown, NJ (US)

( * ) Notice: Subject to any disclaimer, the term of this patent is extended or adjusted under 35 U.S.C. 154(b) by 0 days.

(21) Appl. No.: 17/832,533

(22) Filed: Jun. 3, 2022

(65) Prior Publication Data

US 2023/0396340 A1    Dec. 7, 2023

(51) Int. Cl.
    *H04B 10/61*    (2013.01)
(52) U.S. Cl.
    CPC ......... *H04B 10/614* (2013.01); *H04B 10/615* (2013.01); *H04B 10/6166* (2013.01)
(58) Field of Classification Search
    CPC . H04B 10/614; H04B 10/615; H04B 10/6166
    USPC ....................................................... 398/208
    See application file for complete search history.

(56) References Cited

U.S. PATENT DOCUMENTS

| 10,788,679 B2* | 9/2020 | Baehr-Jones | G02B 6/274 |
| 11,050,505 B1* | 6/2021 | Jones | G01J 4/04 |
| 11,245,473 B2* | 2/2022 | Morsy-Osman | H04B 10/67 |
| 2010/0296152 A1* | 11/2010 | Shiraishi | H04B 10/2569 359/301 |
| 2015/0117872 A1* | 4/2015 | Lyubomirsky | H04B 10/616 398/205 |
| 2016/0204894 A1* | 7/2016 | Dong | H04B 10/5053 398/65 |
| 2019/0179163 A1* | 6/2019 | Baehr-Jones | G02B 6/105 |

(Continued)

FOREIGN PATENT DOCUMENTS

| JP | 2005309447 | 11/2005 |
| JP | 2011064657 A * | 3/2011 |

(Continued)

OTHER PUBLICATIONS

Che et al., "Implementing Simplified Stokes Vector Receiver for Phase Diverse Direct Detection," 2015 Optical Fiber Communications Conference and Exhibition (OFC), Los Angeles, CA, USA, Mar. 22-26, 2015, 3 pages.

(Continued)

*Primary Examiner* — Abbas H Alagheband
(74) *Attorney, Agent, or Firm* — Fish & Richardson P.C.

(57) ABSTRACT

An optical multiple-input-multiple-output (MIMO) receiver includes an input port configured to receive input light; a Stokes measurement apparatus configured to generate measurements of Stokes parameters; an optical MIMO demultiplexer configured to generate a plurality of demultiplexed output light signals based on (i) the input light and (ii) the measurements of the Stokes parameters generated by the Stokes measurement apparatus; and a plurality of output ports configured to output the plurality of demultiplexed output light signals generated by the optical MIMO demultiplexer. In particular, the Stokes measurement apparatus is connected to the optical MIMO demultiplexer in a parallel arrangement.

7 Claims, 26 Drawing Sheets

(56) References Cited

U.S. PATENT DOCUMENTS

| | | | |
|---|---|---|---|
| 2020/0099454 A1 | 3/2020 | Talkhooncheh et al. | |
| 2021/0234616 A1* | 7/2021 | Morsy-Osman | H04B 10/67 |
| 2022/0045766 A1* | 2/2022 | Le | H04B 10/614 |
| 2023/0043960 A1* | 2/2023 | Qu | H04B 10/541 |
| 2023/0097053 A1 | 3/2023 | Doerr | |

FOREIGN PATENT DOCUMENTS

| | | | | |
|---|---|---|---|---|
| WO | WO-2016046315 A1 * | 3/2016 | | H04B 10/67 |
| WO | WO-2020026007 A1 * | 2/2020 | | H04B 10/532 |

OTHER PUBLICATIONS

Doerr et al., "Monolithic PDM-DQPSK receiver in silicon", 36th European Conference and Exhibition on Optical Communication, Sep. 2010, 3 pages.

Doerr et al., "PDM-DQPSK Silicon Receiver With Integrated Monitor and Minimum Number of Controls," IEEE Photonics Technology Letters, Apr. 15, 2012, 24(8), 3 pages.

Doerr, "Proposed Architecture for MIMO Optical Demultiplexing Using Photonic Integration," IEEE Photonics Technology Letters, Nov. 1, 2011, 23(21), 3 pages.

Kikuchi et al., "Multi-level signaling in the Stokes space and its application to large-capacity optical communications," Optics Express, Apr. 2014, 22(7):7374-7387.

Li et al., "Side Effect of Normal Vector Recovery based Polarization Demultiplexing in Stokes Space and the Countermeasure," 2020 European Conference on Optical Communications (ECOC), Brussels, Belgium, Dec. 6-10, 2020, 4 pages.

Liao et al., "A 260 GB/s/λ PDM Link with Silicon Photonic Dual-Polarization Transmitter and Polarization Demultiplexer," 2021 European Conference on Optical Communication (ECOC), Sep. 2021, 4 pages.

Ma et al., "Automated control algorithms for silicon photonic polarization receiver," Optics Express, Jan. 20, 2020, 28(2), 12 pages.

Martinelli et al., "Endless Polarization Control Algorithm Using Adjustable Linear Retarders With Fixed Axes," Journal of Lightwave Technology, Sep. 2003, 21(9), 8 pages.

Martinelli et al., "Polarization Stabilization in Optical Communications Systems," Journal of Lightwave Technology, Nov. 2006, 24(11), 12 pages.

Morsy-Osman et al., "1 λ×224 Gb/s 10 km Transmission of Polarization Division Multiplexed PAM-4 Signals Using 1.3 μm SiP Intensity Modulator and a Direct-Detection MIMO-based Receiver," 2014 the European Conference on Optical Communication (ECOC), Cannes, France, Sep. 21-25, 2014, 3 pages.

Muga et. al. "Adaptive 3-D Stokes Space-Based Polarization Demultiplexing Algorithm," Journal of Lightwave Technology, Oct. 2014, 32(19):3290-3298.

Nespola et al., "Proof of Concept of Polarization-Multiplexed PAM Using a Compact Si-Ph Device," IEEE Photonics Technology Letters, Jan. 1, 2019, 31(1), 4 pages.

Noe et al., "Endless Polarization Control Systems for Coherent Optics," Journal of Lightwave Technology, Jul. 1988, 6(7), 10 pages.

Szafraniec et al, "Polarization demultiplexing in Stokes space," Optics Express, Aug. 2010, 18(17):17928-17939.

Wen et al., "200G self-homodyne detection with 64QAM by endless optical polarization demultiplexing," Optics Express, Jul. 20, 2020, 28(15), 16 pages.

* cited by examiner

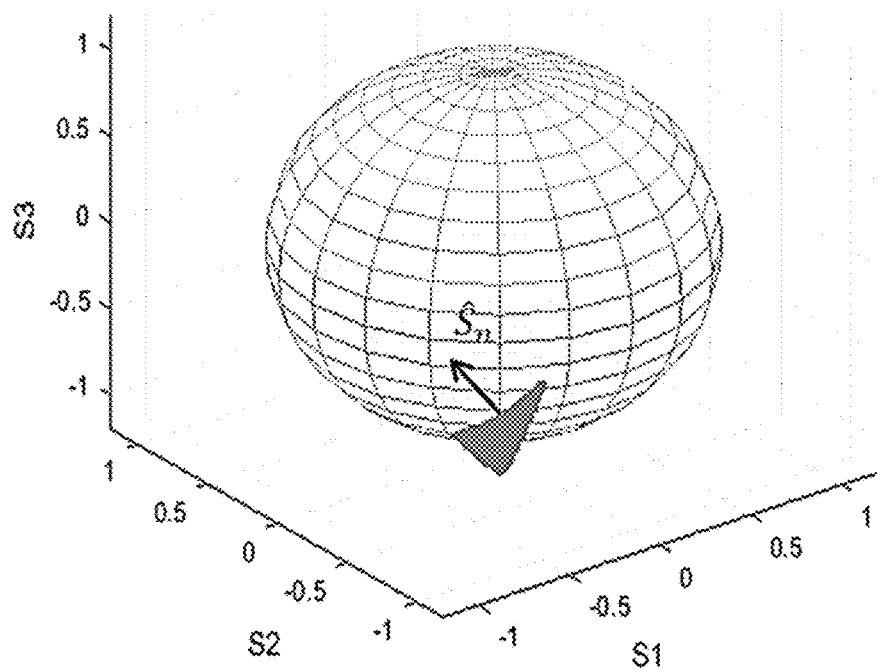
FIG. 6A
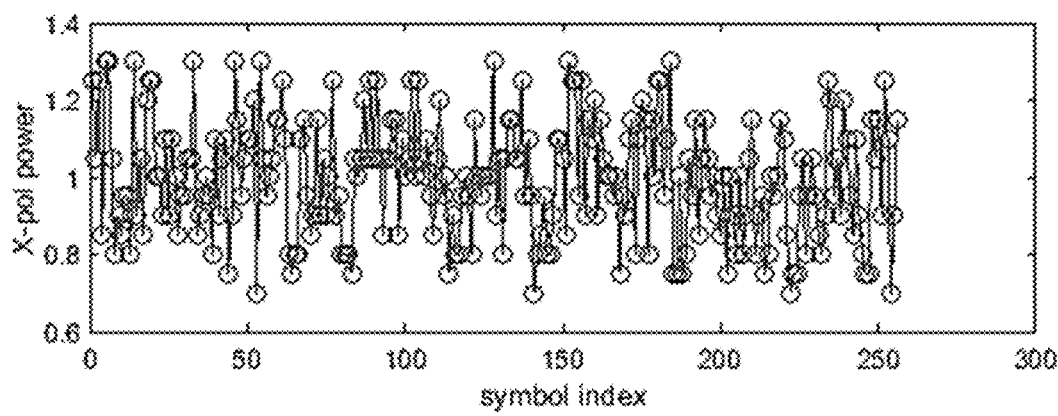
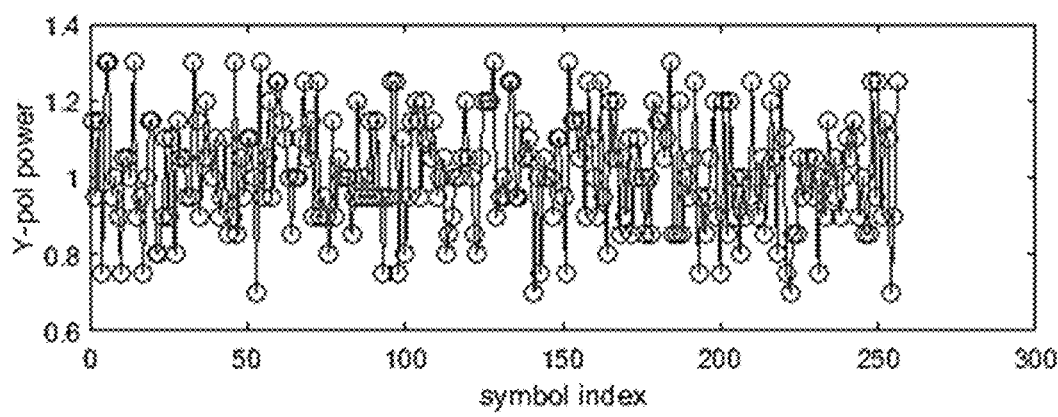
FIG. 6B

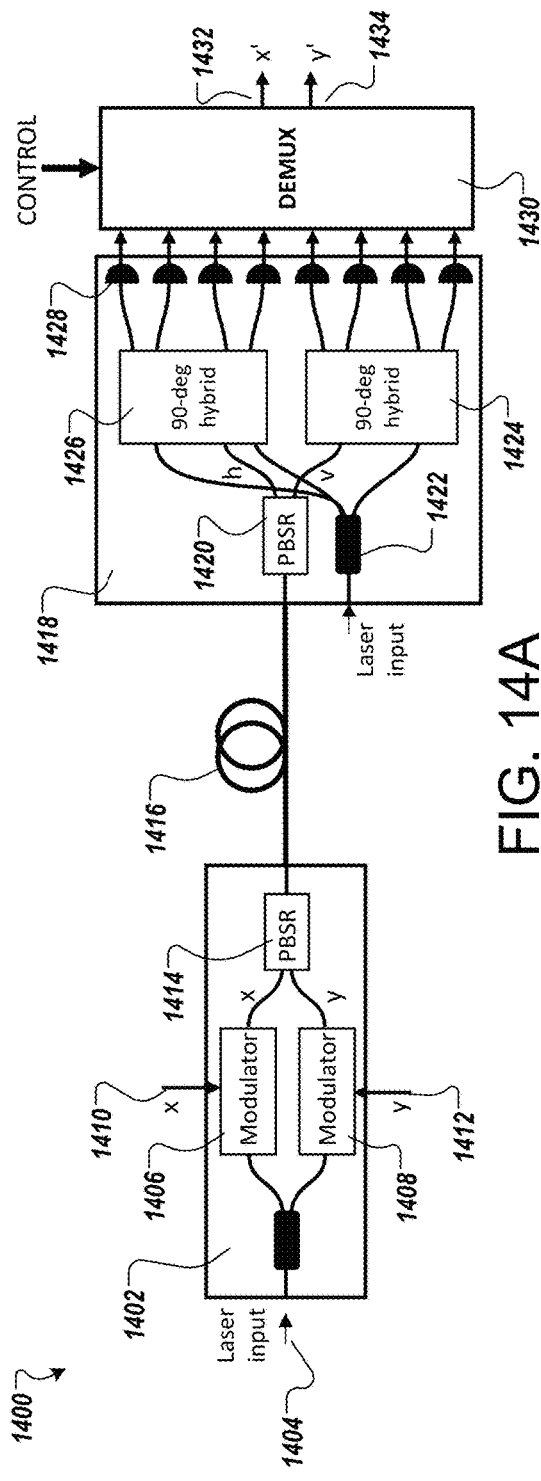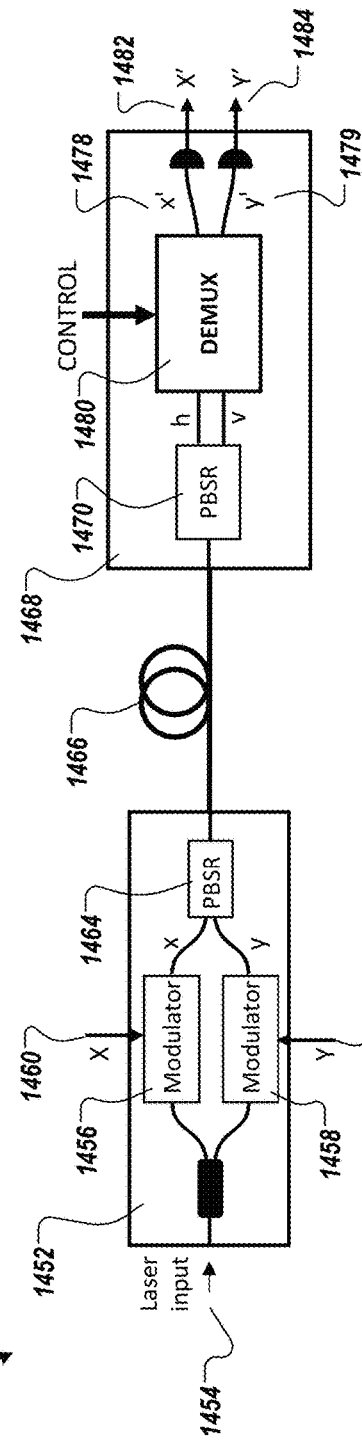

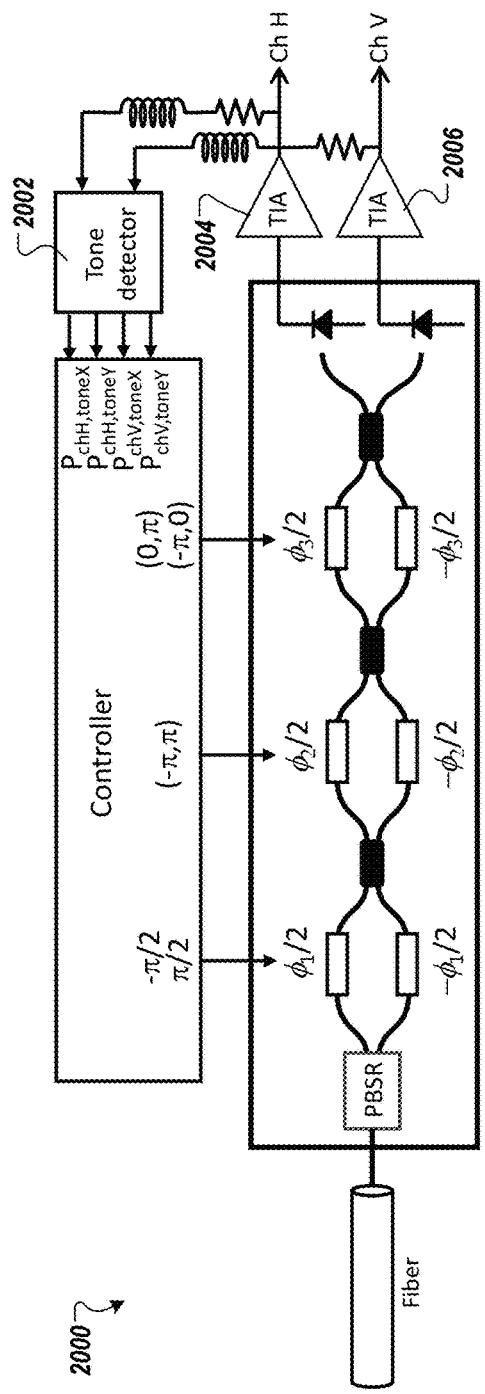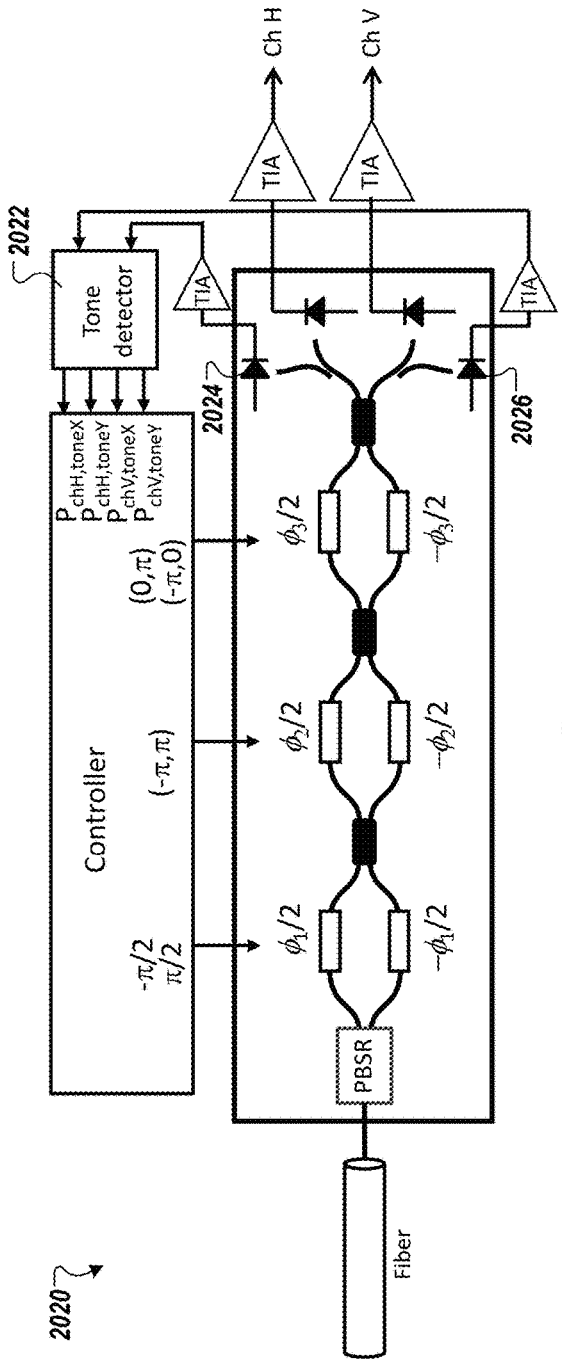
FIG. 20A
FIG. 20B

OPTICAL MULTIPLE-INPUT-MULTIPLE-OUTPUT (MIMO) RECEIVER USING STOKES VECTOR MEASUREMENTS

TECHNICAL FIELD

The present disclosure generally relates to optical receivers and demultiplexers.

BACKGROUND

In optical communication systems, multiplexing techniques (such as polarization-division multiplexing (PDM)) can increase communication capacity and/or photon efficiency by multiplexing different signals over different channels (e.g., different polarization modes on the same carrier frequency) for simultaneous transmission through a single fiber. However, a challenge of using PDM is that the polarization modes tend to undergo random and unpredictable rotations and losses as they propagate through an optical communication system, for example due to stress in the glass fiber (bending and twisting), ambient temperature changes, or other non-idealities in the communication system. This results in the different signals in the polarization modes becoming mixed among each other when they are received. In such scenarios, the signals must be unmixed at the receiver through multiple-input—multiple-output (MIMO) demultiplexing.

SUMMARY

Implementations of the present disclosure are generally directed to optical multiple-input-multiple-output (MIMO) demultiplexers that perform demultiplexing of optical signals based on measured Stokes parameters.

One general aspect includes an optical multiple-input-multiple-output (MIMO) receiver including: an input port configured to receive input light; a Stokes measurement apparatus configured to generate measurements of Stokes parameters; an optical MIMO demultiplexer configured to generate a plurality of demultiplexed output light signals based on (i) the input light and (ii) the measurements of the Stokes parameters generated by the Stokes measurement apparatus; and a plurality of output ports configured to output the plurality of demultiplexed output light signals generated by the optical MIMO demultiplexer. In particular, an analog bandwidth at which the Stokes measurement apparatus is configured to measure the Stokes parameters is smaller than an analog bandwidth of the demultiplexed output light signals.

Implementations may include one or more of the following features. The optical MIMO receiver where the Stokes measurement apparatus includes a plurality of balanced photodiode pairs. The optical MIMO receiver where the plurality of balanced photodiode pairs are configured with reception bandwidths that are smaller than an analog bandwidth of the demultiplexed output light signals. The optical MIMO receiver where the Stokes measurement apparatus is integrated on the same substrate as the optical MIMO demultiplexer. The optical MIMO receiver where the Stokes measurement apparatus and the optical MIMO demultiplexer share a polarization beam-splitter/rotator (PBSR). The optical MIMO receiver where the optical MIMO demultiplexer is configured to receive an electrical signal from the Stokes measurement apparatus. The optical MIMO receiver where a bandwidth of the electrical signal received from the Stokes measurement apparatus is smaller than an analog bandwidth of the demultiplexed output light signals. The optical MIMO receiver where the Stokes measurement apparatus is configured to measure the Stokes parameters from an optical input of the optical MIMO demultiplexer or from an optical output of the optical MIMO demultiplexer. The optical MIMO receiver where the Stokes measurement apparatus is configured to provide the measurements of the Stokes parameters to the optical MIMO demultiplexer in a feedforward structure or in a feedback structure. The optical MIMO receiver further including an electrical filter configured to detect the presence of a marker tone on the input light. Implementations of the described techniques may include hardware, a method or process, or computer software on a computer-accessible medium.

One general aspect includes an optical multiple-input-multiple-output (MIMO) receiver including: an input port configured to receive input light; a Stokes measurement apparatus configured to generate measurements of Stokes parameters; an optical MIMO demultiplexer configured to generate a plurality of demultiplexed output light signals based on (i) the input light and (ii) the measurements of the Stokes parameters generated by the Stokes measurement apparatus; and a plurality of output ports configured to output the plurality of demultiplexed output light signals generated by the optical MIMO demultiplexer. In particular, the Stokes measurement apparatus is connected to the optical MIMO demultiplexer in a parallel arrangement.

Implementations may include one or more of the following features. The optical MIMO receiver where the optical MIMO demultiplexer is further configured to receive the measurements of the Stokes parameters via an electrical signal from the Stokes measurement apparatus. The optical MIMO receiver where the Stokes measurement apparatus is connected to optical taps that are connected to inputs of the optical MIMO demultiplexer or to outputs of the optical MIMO demultiplexer. The optical MIMO receiver where the Stokes measurement apparatus includes: two optical inputs that are tapped from the inputs or the outputs of the optical MIMO demultiplexer and at least three electrical outputs configured to output the measurements of the Stokes parameters or a set of linear combinations of the Stokes parameters such that the Stokes parameters can be calculated from the set of parameters. The optical MIMO receiver where the at least three electrical outputs of the Stokes measurement apparatus are connected to a processing apparatus configured to control the optical MIMO demultiplexer. The optical MIMO receiver where the Stokes measurement apparatus further includes two 1×2 optical couplers connected to a first balanced photodiode pair and to an optical hybrid, where the optical hybrid is further connected to a second balanced photodiode pair and to a third balanced photodiode pair, where the first balanced photodiode pair is configured to output a measurement of a first Stokes parameter through a first electrical output, where the second balanced photodiode pair is configured to output a measurement of a second Stokes parameter through a second electrical output, and where the third balanced photodiode pair is configured to output a measurement of a third Stokes parameter through a third electrical output. The optical MIMO receiver where the first balanced photodiode pair, the second balanced photodiode pair, and the third balanced photodiode pair are configured with reception analog bandwidths that are smaller than a signal bandwidth that is demultiplexed by the optical MIMO demultiplexer. The optical MIMO receiver where each 1×2 optical coupler is a tap coupler with the tap ratio between 0.1% and 25%. Implementations of the described techniques may include hardware, a method or process, or computer software on a computer-accessible medium. It is noted that a 2×2 coupler with one input port unused is one possible embodiment of a 1×2 coupler.

One general aspect includes a method of performing optical multiple-input-multiple-output (MIMO) demultiplexing, the method including: receiving input light through an input port; generating measurements of Stokes parameters; performing adaptive optical MIMO demultiplexing on the input light to generate a plurality of demultiplexed output light signals, where the adaptive optical MIMO demultiplexing is controlled based on the measurements of the Stokes parameters; and outputting the plurality of demultiplexed output light signals through output ports. In particular, a first analog bandwidth at which the Stokes parameters are measured is smaller than a second analog bandwidth of the demultiplexed optical signals.

Implementations may include one or more of the following features. The method where the adaptive optical MIMO demultiplexing is performed based on the measurements of the Stokes parameters that are provided as feedforward control or as feedback control. The method further including splitting the input light into a first input light and a second input light of different polarizations, and where the adaptive optical MIMO demultiplexing includes performing a plurality of stages of optical phase-shifting to apply relative phase shifts between the first input light and the second input light, based on the measurements of the Stokes parameters. The method where the plurality of stages of optical phase-shifting consists of exactly 3 stages of optical phase-shifting including a first optical phase shifting stage, followed by a second optical phase shifting stage, followed by a third optical phase shifting stage, and where the second optical phase shifting stage and the third optical phase shifting stage apply relative phase shifts that depend on the measurements of the Stokes parameters. The method where performing the adaptive optical MIMO demultiplexing includes: determining analytical solutions for amounts of the optical phase shifts that are applied by the second optical phase shifting stage and the third optical phase shifting stage, based on the measurements of the Stokes parameters. The method where the adaptive optical MIMO demultiplexing is performed using non-iterative control based on the measurements of the Stokes parameters. The method further including splitting the input light into first input light and second input light of different polarizations, and where performing the adaptive optical MIMO demultiplexing further includes applying a relative attenuation between the first input light and the second input light, where an amount of the relative attenuation is controlled using a progressive search algorithm based on the measurements of the Stokes parameters. The method where the input light includes a first input light and a second input light, and where performing the adaptive optical MIMO demultiplexing includes: detecting a first marker signal from the first input light, where the first marker signal was placed on a first data stream at a transmitter; detecting a second marker signal from the second input light, where the second marker signal corresponds to a second data stream; and determining that the first input light and the second input light carry the first data stream and the second data stream, respectively, based on detecting the first marker signal and the second marker signal. The method where performing the adaptive optical MIMO demultiplexing includes: determining an average value $\langle S_3 \rangle$ of Stokes parameter $S_3=2\mathrm{Im}(e_X \cdot e_Y^*)$, where $e_X$ and $e_Y$ denote optical fields on the polarizations of the first input light and second input light; determining whether $\langle S_3 \rangle = \pm 1$; and based on a determination that $\langle S_3 \rangle = \pm 1$, re-determining an analytical solution for the amount of the optical phase shift that is applied by the second optical phase shifting stage to avoid $\langle S_3 \rangle = \pm 1$. The method where the measurements of the Stokes parameters are generated based on light from optical taps that are connected to inputs of the optical MIMO demultiplexer or to outputs of the optical MIMO demultiplexer. Implementations of the described techniques may include hardware, a method or process, or computer software on a computer-accessible medium.

One general aspect includes an optical multiple-input-multiple-output (MIMO) receiver including: a polarization splitter/rotator; a series of couplers and phase shifters connected to outputs of the polarization splitter/rotator; a first optical tap connected to a first output of the series of couplers and phase shifters; a second optical tap connected to a second output of the series of couplers and phase shifters; a first photodiode connected to the first output, after the first optical tap; a second photodiode connected to the second output, after the second optical tap; a first 1×2 coupler connected to the first optical tap; a second 1×2 coupler connected to the second optical tap; a first balanced photodiode connected to both a first output of the first 1×2 coupler and to a first output of the second 1×2 coupler; an optical hybrid connected to both a second output of the first 1×2 coupler and to a second output of the second 1×2 coupler, where the optical hybrid is a 20-degree to 160-degree optical hybrid; and a second balanced photodiode and a third balanced photodiode connected to outputs of the optical hybrid. Other embodiments of this aspect include corresponding computer systems, apparatus, and computer programs recorded on one or more computer storage devices, each configured to perform the actions of the methods.

One general aspect includes an optical multiple-input-multiple-output (MIMO) receiver including: a polarization splitter/rotator; a first optical tap connected to a first output of the polarization splitter/rotator; a second optical tap connected to a second output of the polarization splitter/rotator; a series of couplers and phase shifters connected to both the first output and to the second output of the polarization splitter/rotator, after the first optical tap and the second optical tap; a first 1×2 coupler connected to the first optical tap; a second 1×2 coupler connected to the second optical tap; a first balanced photodiode connected to both a first output of the first 1×2 coupler and to a first output of the second 1×2 coupler; an optical hybrid connected to both a second output of the first 1×2 coupler and to a second output of the second 1×2 coupler, wherein the optical hybrid is a 20-degree to 160-degree optical hybrid; and a second balanced photodiode and a third balanced photodiode connected to outputs of the optical hybrid. Other embodiments of this aspect include corresponding computer systems, apparatus, and computer programs recorded on one or more computer storage devices, each configured to perform the actions of the methods.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 6A and 6B illustrate examples of a received Stokes space constellation and received signal intensity, representing a received optical waveform which has been affected by propagation through a medium;

FIGS. 14A and 14B illustrate examples of dual-polarization communication systems that utilize coherent detection and IMDD;

FIGS. 19, 20A, and 20B illustrate examples of receiver structures for detecting pilot tones and measuring error in received pilot tones;

DETAILED DESCRIPTION

Implementations of the present disclosure are directed to an optical receiver that uses measured Stokes parameters as feedback or feedforward information to perform adaptive MIMO demultiplexing of optical signals. In some implementations, a Stokes parameter measurement apparatus and a MIMO demultiplexer are arranged in a configuration that can achieve various technical benefits. For example, in some scenarios, adaptive MIMO demultiplexing of optical signals can be performed using Stokes parameters which are measured with a lower bandwidth than that of the signals. In some scenarios, the MIMO demultiplexer can use control feedback in the form of Stokes parameter measurements which are provided with a bandwidth which is smaller than the signal bandwidth.

Figure 5:
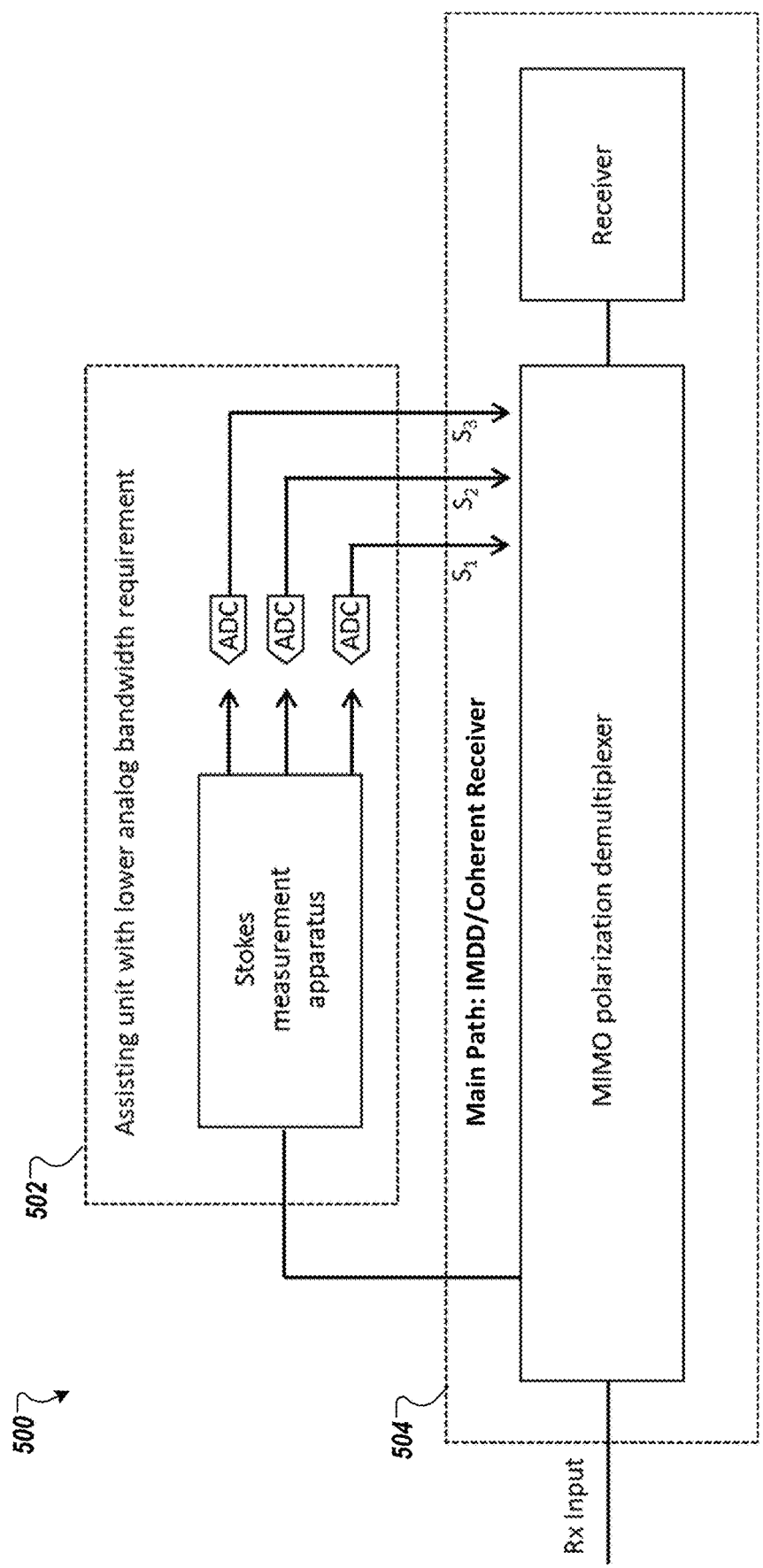
FIG. 5 illustrates an example of a parallel configuration of a Stokes measurement apparatus and MIMO demultiplexer, according to implementations of the present disclosure.

In some implementations, the optical receiver uses a structure in which a Stokes parameter measurement apparatus is arranged in parallel to a MIMO demultiplexer. The Stokes parameter measurement apparatus can be connected in parallel to either the inputs or outputs of the MIMO demultiplexer. An example of such a structure is shown in FIG. 5, in which a Stokes measurement apparatus 502, which measures Stokes parameters from optical signals, is implemented in parallel to an intensity-modulation direct-detection (IMDD)/coherent receiver 504 which performs demultiplexing of optical signals. Such a parallel configuration can enable the Stokes measurement apparatus 502 to extract Stokes parameters from the received optical waveform by using components that require a bandwidth which is less than that of the optical receiver. This can help reduce Stokes measurement apparatus hardware and complexity requirements. Details of FIG. 5 will be described further below.

Implementations of the present disclosure can be used in a variety of technical fields. For example, implementations can be used in fiber-optic communication systems, such as for both direct detection and coherent fiber transmission links. In some scenarios, implementations can be used to perform adaptive polarization demultiplexing in an optical receiver. For example, implementations of the present disclosure can be used in an optical polarization demultiplexer based on optical signal processing and optical to electrical conversion. In some implementations, Stokes parameters extracted from received optical waveforms can be used to derive demultiplexer settings, such as by progressive search algorithms or by direct calculation without relying on progressive search algorithms. In some other scenarios, implementations can be used to perform adaptive polarization controlling in an optical receiver. For example, implementations of the present disclosure can be used in a single polarization optical receiver to stabilize the incidence state of light. Also, pilot tones or other identifying waveforms may be added to the received optical waveforms at the transmitter to improve Stokes parameter measurement and/or remove signal ambiguity.

Fiber-optic communication system signaling generally fall into two categories, direct detection (DD) techniques and coherent detection techniques. Direct detection techniques are typically used for low complexity and short distance applications while coherent detection techniques prevalent in high capacity and long distance applications. Direct detection systems, such as an intensity modulation with direct detection (IM-DD) system, exploit only optical intensity to carry information which can lead to a lower spectral efficiency, but with the benefit of simpler transmitter and receiver design. Coherent detection systems can exploit the entire optical field to carry information and can double the data rate, but at the expense of complex multi-input multi-output (MIMO) digital signal processing (DSP) algorithms to perform reception and demultiplexing.

The discussion below will focus on MIMO systems that modulate information on multiple different polarizations of light, for example by utilizing each polarization as a separate data channel. However, the described features and concepts can be adapted for other types of MIMO systems, such as using multiple spatial modes in a multi-mode fiber as separate data channels.

It is advantageous to construct the polarization MIMO demultiplexer and Stokes measurement apparatus in integrated optics, such as silicon photonics. In general, such a structure requires splitting the incoming light into two polarization portions and adjusting the polarizations of the portions such that they are the same polarization in the integrated optical circuit so they can be interfered and/or photodetected.

Stokes Vector Representation of Optical Waveforms

The state of polarization (SOP) of an optical wave can be represented by the Stokes parameters, which are three real signed values, with units of optical power. The Stokes parameters can be represented in vector form by the Stokes vector $\hat{S}$ $$\hat{s} = \begin{bmatrix} S_1 \\ S_2 \\ S_3 \end{bmatrix} = \begin{bmatrix} |e_X|^2 - |e_Y|^2 \\ 2\,\mathrm{Re}(e_X e_Y^*) \\ 2\,\mathrm{Im}(e_X e_Y^*) \end{bmatrix} \quad \text{Eq. 1}$$

where $e_X$ and $e_Y$ denote the optical field (harmonic picture) in X and Y polarizations, Re(•) and Im(•) the real and imaginary part of a complex number, and (•)* the complex conjugate. For a normalized wave, there are only two independent Stokes parameter magnitudes, because the Stokes vector falls on a sphere, however all three Stokes parameters are required because of sign ambiguity to locate a point on the sphere.

Figure 1A:
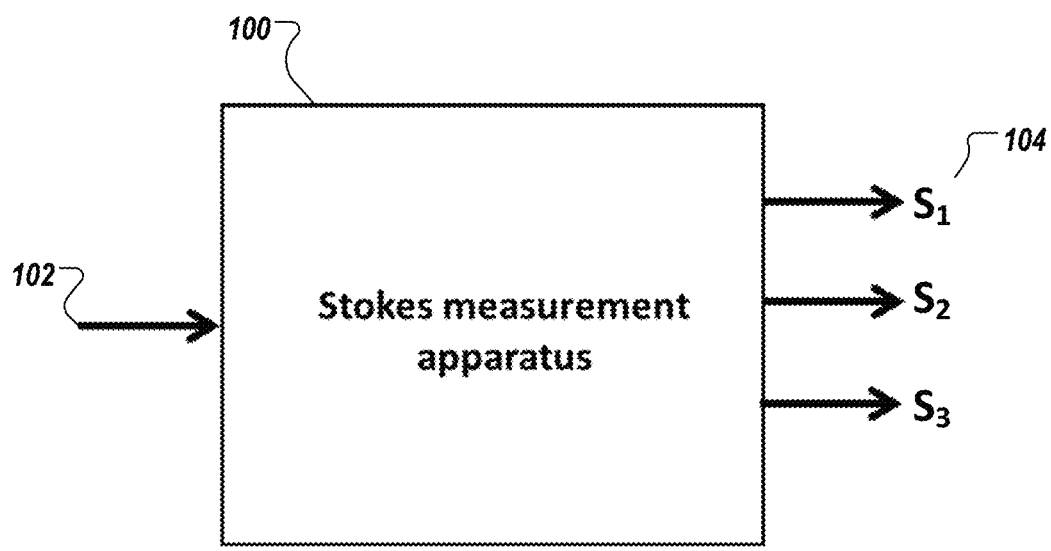
FIG. 1A illustrates a general example of a Stokes measurement apparatus.

A Stokes measurement apparatus is an apparatus that measures the Stokes parameters of an input optical signal. FIG. 1A illustrates a general example of a Stokes measurement apparatus. In this example, input light 102, which consists of optical fields $e_X$ and $e_Y$ on X and Y polarizations, is received and processed according to Equation 1, above, to yield Stokes parameters 104, such as $(S_1, S_2, S_3)$. In some representations, the Stokes parameters can include a fourth, but not independent, parameter, $S_0 = \sqrt{S_1^2 + S_2^2 + S_3^2}$. However, without loss of generality, this disclosure will refer to the 3-dimensional Stokes vector representation of Equation 1, with the fourth parameter $S_0$ serving as a scaling factor for the Stokes vector.

Figure 1B:
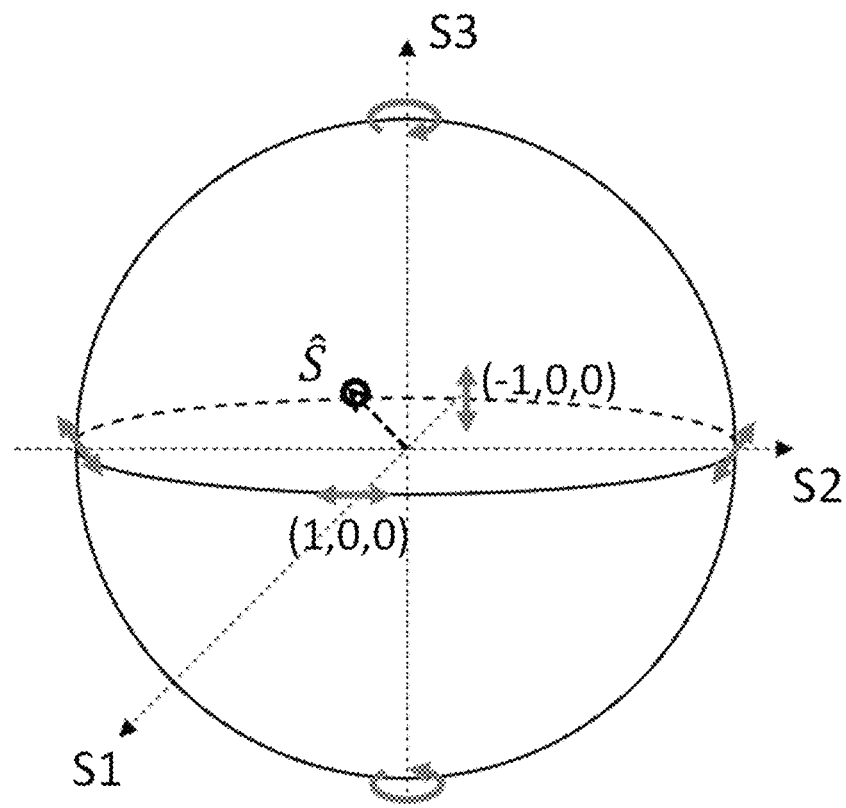
FIG. 1B illustrates an example of a Stokes vector which is mathematically represented on a Poincare sphere.

FIG. 1B illustrates an example of a Stokes vector which is mathematically represented on a Poincare sphere. Such a representation can help to effectively model and analyze polarization evolvement as an optical waveform propagates through different media, such as fiber-optic components. For example, linear horizontal polarized light can be represented by the point at coordinates (1,0,0) on the sphere, while linear vertical polarization can be represented by the point (−1,0, 0).

Figure 2A:
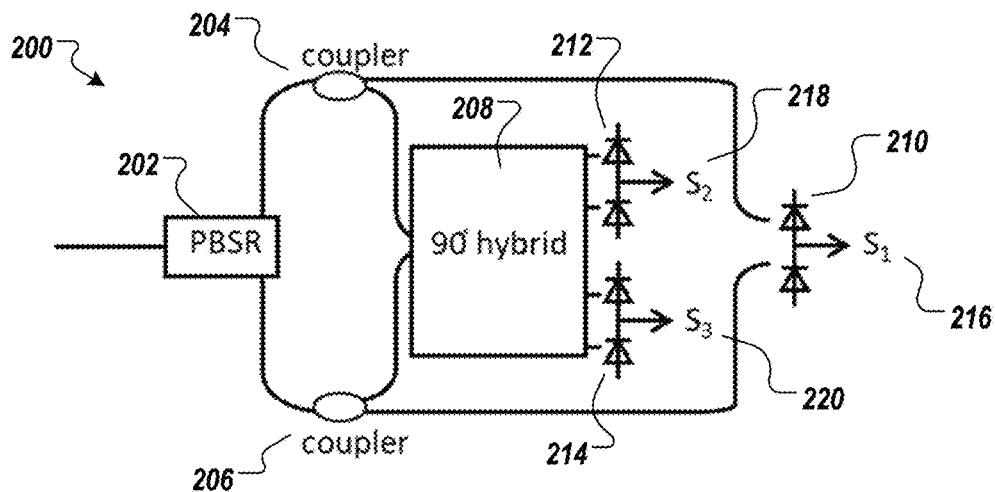
FIGS. 2A, 2B, and 2C illustrate examples of different apparatuses that can measure Stokes parameters of an optical signal.
Figure 2B:
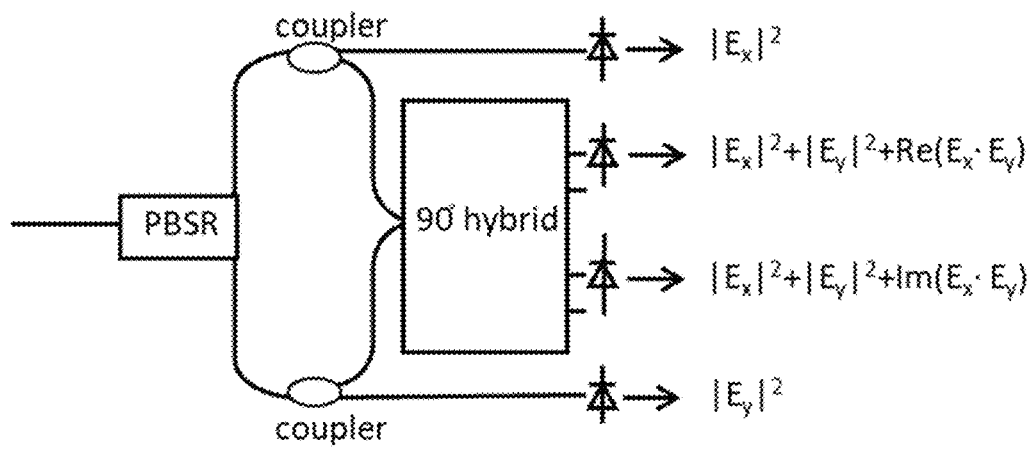
Figure 2C:
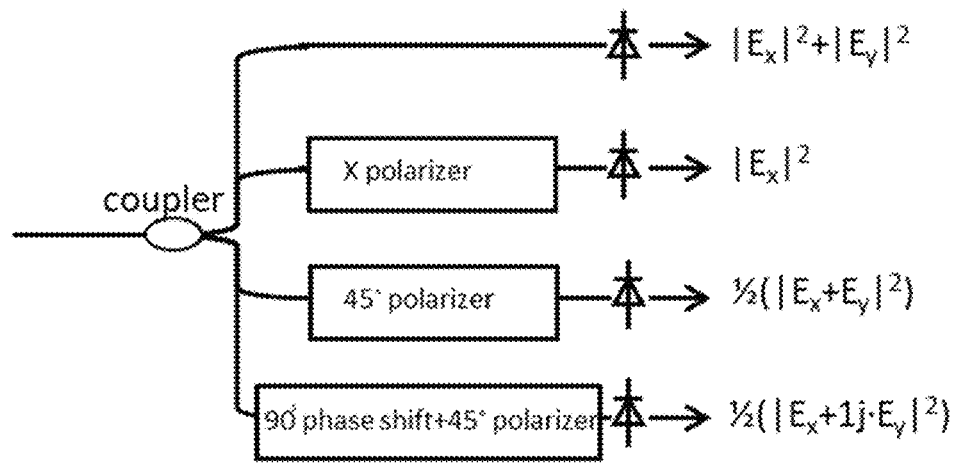

FIGS. 2A, 2B, and 2C illustrate examples of different apparatuses that can measure the Stokes parameters of an optical signal. In general, the Stokes parameters $(S_1, S_2, S_3)$ can be extracted from an optical waveform using a variety of techniques. The example of FIG. 2A uses an optical hybrid and 3 balanced photodetectors. The examples of FIGS. 2B and 2C use a single-end photodiode implementation. However, implementations of the present disclosure are not limited to any particular Stokes measurement apparatus structure, and in general, any suitable structure can be used to extract the Stokes parameters $(S_1, S_2, S_3)$ from an optical waveform.

In the example of FIG. 2A, two 1×2 optical couplers 204 and 206 are connected to an optical hybrid 208 and to a first balanced photodiode pair 210. The optical hybrid 208 can be a 90-degree optical hybrid, or more generally, a 20 to 160-degree optical hybrid. The optical hybrid 208 is further connected to a second balanced photodiode pair 212 and to a third balanced photodiode pair 214. The first balanced photodiode pair 210 is configured to output a measurement of a first Stokes parameter $S_1$ through a first electrical output 216. Similarly, the second balanced photodiode pair 212 is configured to output a measurement of a second Stokes parameter $S_2$ through a second electrical output 218, and the third balanced photodiode pair 214 is configured to output a measurement of a third Stokes parameter $S_3$ through a third electrical output 220.

In some implementations, each 1×2 optical coupler 204 and 206 is a tap coupler with a tap ratio between 0.1% and 25%. In some scenarios, a 1×2 coupler can be implemented as a 2×2 coupler with an input port that is unused.

We define a Stokes measurement apparatus as a collection of elements that measures at least three photodetected signals and a math operation can be performed on these signals to extract the three Stokes parameters. This generally requires a polarization splitter and rotator (PBSR) that separates the incoming signal into two polarization portions and at least two interferences with different phases between two the portions.

Figure 3:
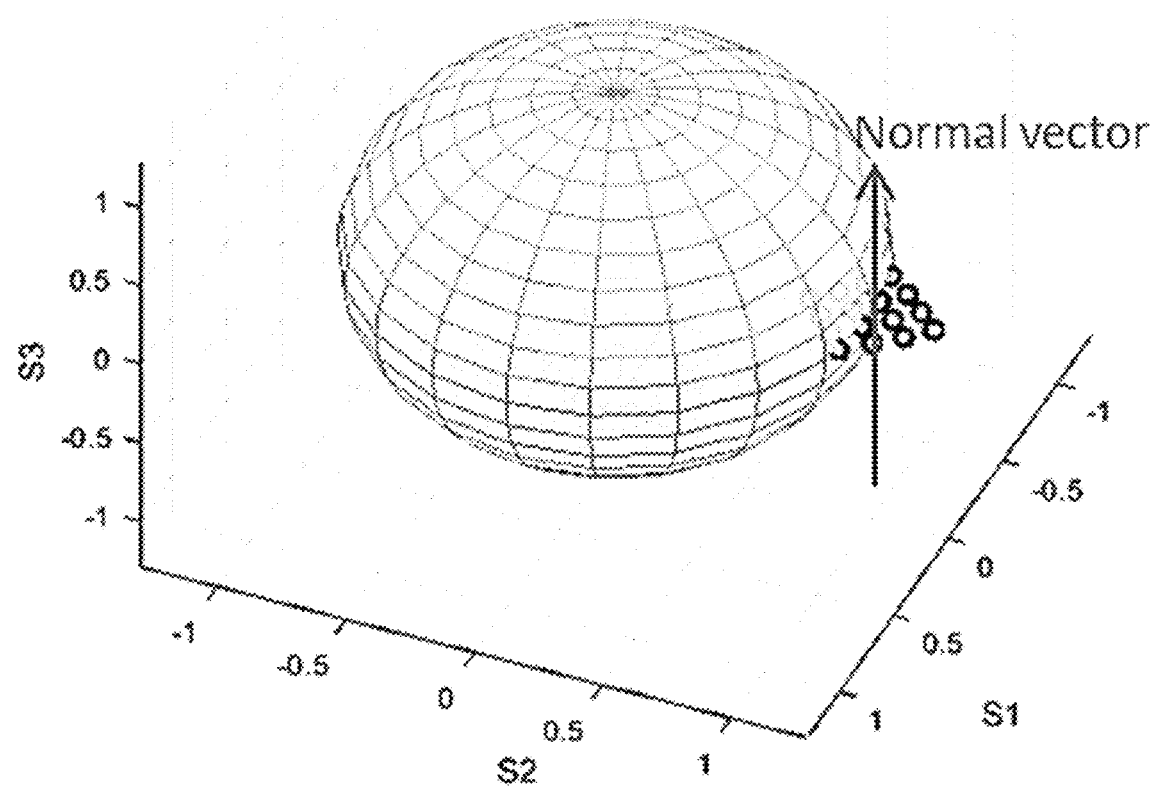
FIG. 3 illustrates an example of a Stokes-space representation of data which is modulated on an optical waveform.

FIG. 3 illustrates an example of a Stokes-space representation of data which is modulated on an optical waveform. Different points in the constellation represent different possible data values which are modulated on the optical waveform.

In particular, FIG. 3 shows an example of a Stokes-space signal constellation for a DP IM-DD system with a small extinction ratio. For DP IM-DD systems, since the data is carried by optical intensity and there is a direct current (DC) component (due to $e_X$ and $e_Y$ being real positive numbers), the constellation of the transmitted data before entering optical fiber, unperturbed by distortions, is located anywhere on the $S_3=0$ plane with $\langle S_1 \rangle=0$ and $\langle S_2 \rangle=1$, where $\langle \cdot \rangle$ denotes numerical average. Specifically, the example of FIG. 3 shows a dual polarization (DP) pulse amplitude modulated (PAM)-4 signal constellation, which is a cluster of 16 data points located on the $S_3=0$ plane centered at the (0,1,0) point. The constellation could in reality be anywhere on the (-,-,0) plane. For convenience, the normal vector of the constellation plane is taken as a characteristic vector of a DP-PAM4 signal, as shown in FIG. 3, which is the normal vector (0,0,1).

By mapping a data stream to a corresponding constellation in Stokes space, the data can be fully characterized by the Stokes parameter representation of the optical waveform. Moreover, the polarization evolution of an optical waveform propagating through a medium (e.g., via fiber transmission) can be represented as a 3-dimensional rotation of the data constellation in Stokes space. Such a rotation can be mathematically expressed as a chain of Stokes space matrix transformations, as shown in Equation 2, below.

$$\hat{S}_{RX} = \Pi_i T_{Rot,i} T_{Ret,i} \hat{S}_{TX} \qquad \text{Eq. 2}$$

where $\hat{S}_{RX}$ denotes the received data constellation in Stokes space after transmission through a medium (e.g., fiber). The matrices $T_{Rot,i}$ and $T_{Ret,i}$ represent a rotator matrix and a retarder matrix, and are defined by:

$$T_{Rot,i} = \begin{bmatrix} \cos(\theta_i) & -\sin(\theta_i) & 0 \\ \sin(\theta_i) & \cos(\theta_i) & 0 \\ 0 & 0 & 1 \end{bmatrix} \text{ and}$$

$$T_{Ret,i} = \begin{bmatrix} 1 & 0 & 0 \\ 0 & \cos(\varphi_i) & -\sin(\varphi_i) \\ 0 & \sin(\varphi_i) & \cos(\varphi_i) \end{bmatrix}$$

where $\theta_i$ is the rotation angle in fiber stage i, and $\varphi_i$ is the retard phase in fiber stage i. Thus, Equation 2 represents the evolution of a data constellation as an optical waveform propagates through a medium (e.g., a fiber link). To demodulate such data upon reception, the receiver can use the inverse matrix of the rotator/retarder matrix chain, which can be expressed as Equation 3, below.

$$M = (\Pi_i T_{Rot,i} T_{Ret,i})^{-1} \qquad \text{Eq. 3}$$

Equation 3 characterizes the operation of polarization demultiplexing and enables a MIMO receiver to recover data from an optical waveform which has undergone random rotations and retardations through a medium.

Serial Configuration of Stokes Measurement Apparatus and MIMO Demultiplexer

Figure 4:
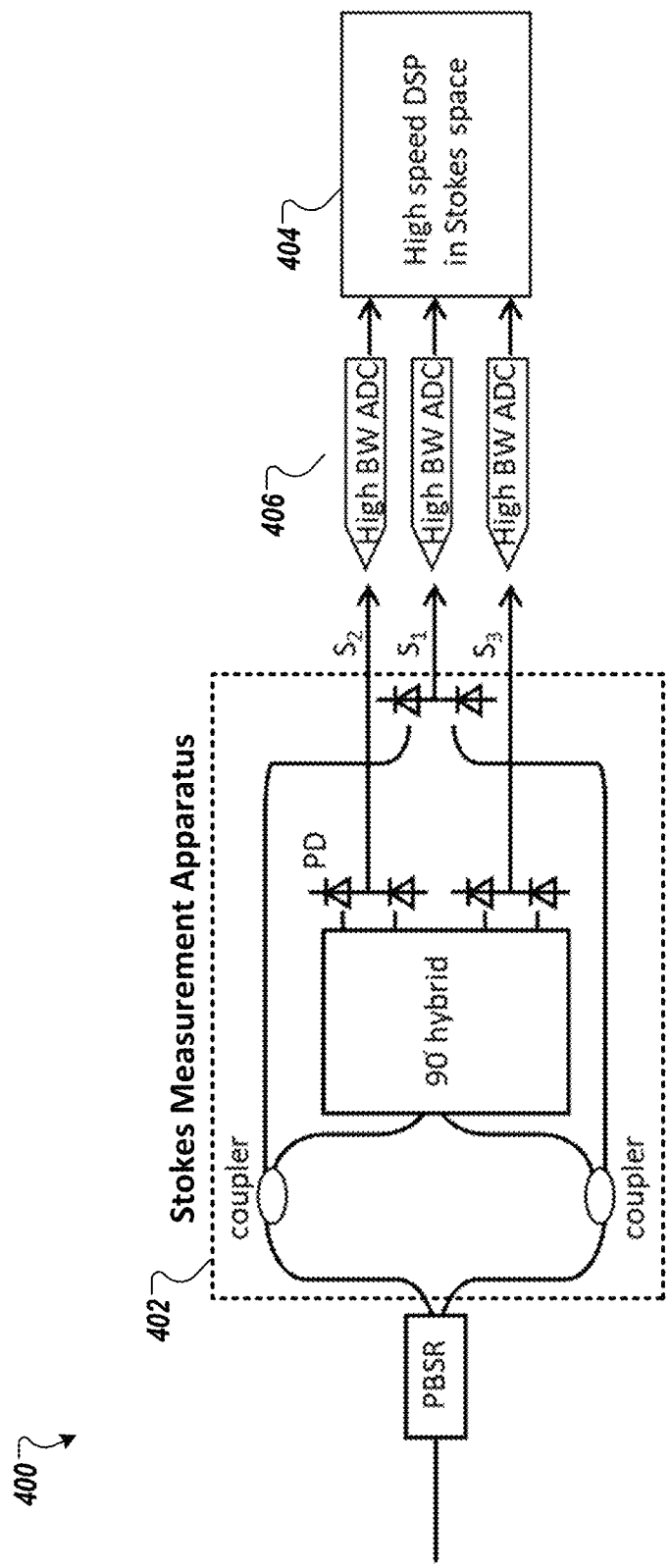
FIG. 4 illustrates an example MIMO demultiplexer in which a Stokes measurement apparatus operates at the signal rate, referred to herein as a serial configuration.

FIG. 4 illustrates an example MIMO demultiplexer in which a Stokes measurement apparatus is used at the signal rate, referred to herein as a serial configuration. In this example, Stokes measurement apparatus 402 extracts Stokes parameters from input light at the signal rate, and then the Stokes parameters are converted from analog to digital and the polarization signals are demultiplexed digitally by demultiplexer 404. For example, the demultiplexer 404 can implement the demultiplexing operation represented by Equation 3 using a suitable digital signal processing (DSP) algorithm.

However, the serial configuration of FIG. 4 suffers from numerous challenges. For example, the serial configuration generally requires large analog electrical bandwidths for both the Stokes measurement apparatus 402 (e.g., a high-bandwidth photodiode (PD) in the Stokes measurement apparatus) as well as for the analog-to-digital-converters (ADCs) 406 for reception of the Stokes constellation. In particular, due to the serial configuration, the required analog electrical bandwidths of the Stokes measurement apparatus 402 and ADCs 406 need to be comparable to the received data rate in order to ensure good transmission performance. For example, a 106 Gbps PAM4 transmission system requires beyond 40 GHz of analog electrical bandwidth. Also, measurement of three high-speed signals is required.

Compounding this challenge, in order to ensure high-speed data throughput, the demultiplexer 404 runs at the symbol rate to implement the demultiplexing operations (e.g., the matrix operations of Equation 3). As a result, the serial configuration of FIG. 4 can be very complicated and expensive.

Additionally, since Stokes reception is essentially a non-linear operation of $e_X$ and $e_Y$ (as shown by Equation 1, above), the Stokes measurement apparatus 402 and ADCs 406 usually require even larger analog electrical bandwidth to effectively extract sufficient Stokes information from the received optical waveform. Moreover, in the demultiplexer 404, the DSP performs calculations in Stokes space sample-by-sample and converts the Stokes space representations back to Jones space for demodulation, which also significant increase complexity as compared to a conventional linear receiver. Therefore, the numerous challenges described above for a serial configuration typically hinder the implementation of a Stokes-based demultiplexer in practical systems.

As such, because the serial configuration shown in FIG. 4 requires these complex Stokes space operations to operate directly on the data signals, the Stokes measurement apparatus 402 and demultiplexer 404 in the serial configuration of FIG. 4 must be implemented with very high-speed electronics and DSP that can match the bandwidth of data signals in optical communication systems, typically on the order of GHz.

By contrast, a parallel configuration will be described with reference to FIGS. 5 to 13, below, which does not suffer from such constraints. As described below, implementations of this disclosure that are described with reference to FIGS. 5 to 13 essentially decouple the operations of the Stokes measurement apparatus from the operations of demultiplexing the data-carrying optical signals. As such, the Stokes measurement apparatus can implement lower-speed electronics operating at a lower bandwidth, just enough to track fluctuations of polarizations in optical signals, but without having to match the speed required to demodulate the actual data in those optical signals.

As mentioned, in typical links, the time scale of changes in polarization of optical signals that propagate through transmission channels is much slower than the date rate of the optical signals themselves. For example, in shorter-range communication such as in local-area networks (e.g., data centers), fluctuations in polarization occur much less frequently, e.g., on the order of kHz or MHz. For longer-range communication, such as long-haul fibers, the fluctuations in polarization may occur more frequently, but still lower than the GHz of bandwidth typically needed to transmit data. Therefore, implementations of this disclosure that are described with reference to FIGS. 5 to 13, below, enable implementation of a Stokes measurement apparatus with significantly lower complexity, power consumption, and cost, while still enabling accurate tracking of polarization fluctuation for demultiplexing of high-speed data signals.

Parallel Configuration of Stokes Measurement Apparatus and MIMO Demultiplexer FIG. 5 illustrates an example of a parallel configuration of a Stokes measurement apparatus and MIMO demultiplexer, according to implementations of the present disclosure. In this example, Stokes measurement apparatus 502 is arranged in parallel with linear receiver 504. The linear receiver 504 can perform MIMO demultiplexing (e.g., optical MIMO demultiplexing), with the assistance of Stokes parameter measurements provided by the Stokes measurement apparatus 502. In some implementations, the Stokes measurement apparatus 502 can be integrated on the same substrate or chip as the linear receiver 504 (MIMO demultiplexer).

The parallel structure of FIG. 5 can provide various advantages as compared to a serial configuration. For example, the parallel structure can reduce hardware requirements for Stokes measurement apparatus 502 by implementing the Stokes measurement apparatus 502 as an assisting unit for the linear receiver 504. For example, in some implementations, the Stokes measurement apparatus 502 only needs to operate with enough bandwidth to track the evolution of polarization in Stokes space, rather than having to match the much larger bandwidth of data that is demultiplexed by the linear receiver 504. As shown in FIG. 5, the main demultiplexing path can be performed by the linear receiver 504 in Jones space to extract optical intensity (IMDD system) or optical field (coherent detection system) in a linear manner. In this sense, the analog bandwidth requirement of the photodetection in the linear receiver 504 in the main path can be the same as a conventional linear receiver. In parallel to this, the Stokes measurement apparatus 502 can calculate $(S_1, S_2, S_3)$ in a relatively slower manner. In particular, the Stokes measurement apparatus 502 can simply extract polarization variation information, without having to perform data demodulation. In many scenarios, polarization changes in a much slower manner (e.g., typically on the order of kHz) as compared to data rates, and therefore the hardware requirements for the Stokes measurement apparatus 502 can be much lower than that of the linear receiver 504 in the main demultiplexing path. Specifically, the analog bandwidth of the Stokes measurement apparatus 502 can be reduced dramatically, down to the level of kHz or MHz. As an example, referring back to the example Stokes measurement apparatus 200 in FIG. 2A, in some implementations, the first balanced photodiode pair 210, the second first balanced photodiode pair 212, and the third balanced photodiode pair 214 are configured with reception analog bandwidths that are smaller than a signal bandwidth that is demultiplexed by the optical MIMO demultiplexer.

Thus, the output of Stokes measurement apparatus 502 can be a signal with significantly lower bandwidth than the data stream that is demultiplexed by linear receiver 504. For example, the output of Stokes measurement apparatus 502 can include just enough information to sufficiently represent the dynamic variations in polarization of the received optical waveform, but without having to include the full information necessary to perform data demodulation. For example, in some scenarios, an approximately MHz-level analog bandwidth for the output of Stokes measurement apparatus 502 is typically sufficient to meet the needs of most practical applications in a cost-efficient manner. However, implementations of the present disclosure are not limited to a particular bandwidth for Stokes measurement apparatus 502.

As such, according to implementations of the present disclosure, optical demultiplexing of MIMO signals in received light can be performed in Jones space, while utilizing Stokes-space measurements of polarization changes in the received light. Since a Stokes space representation and Jones space representation of light are linked by Equation 1, above, the two can be converted to each other, for example using DSP. In implementations of the parallel structure disclosed herein, considering that Stokes space measurements of polarization changes are updated in a relatively slow manner as compared to the speed of demultiplexing, it is unnecessary to convert the Stokes-space measurements back to Jones space sample-by-sample. Instead, in some implementations, a slower block-by-block operation in Jones space can be performed with much less cost. This can be a useful feature, for example, especially in a feedforward structure to direct DSP operations more efficiently.

FIGS. 6A and 6B illustrate examples of a received Stokes space constellation and received signal intensity, representing a received optical waveform which has been affected by propagation through a medium. The polarization dynamics through an optical medium, such as a fiber channel, can be described by a geometry evolution in Stokes space, resulting from the rotations and retardations previously described in regards to Equation 2. For example, in the case of a DP-PAM4 signal, a transmitted constellation as was shown in the example of FIG. 3 can undergo various rotations and retardations, resulting in a received constellation as shown in the example of FIG. 6A. The received constellation of FIG. 6A is characterized by a plane with its normal vector tangential to the Poincare sphere. Different link conditions can affect an optical waveform in different ways, and result in different received constellations, as shown by planes in different colors in FIG. 6A. The graphs in FIG. 6B show the received signal intensity on each of two polarizations, showing the distorted received waveforms.

Upon extracting Stokes parameters from a received waveform (e.g., using Stokes measurement apparatus 502 of FIG. 5), a demultiplexer (e.g., as implemented in linear receiver 504 of FIG. 5) can use the extracted Stoke parameters to perform adaptive polarization demultiplexing of the received optical waveform. The demultiplexing operation can be visualized in Stokes space, described below.

Figure 7A:
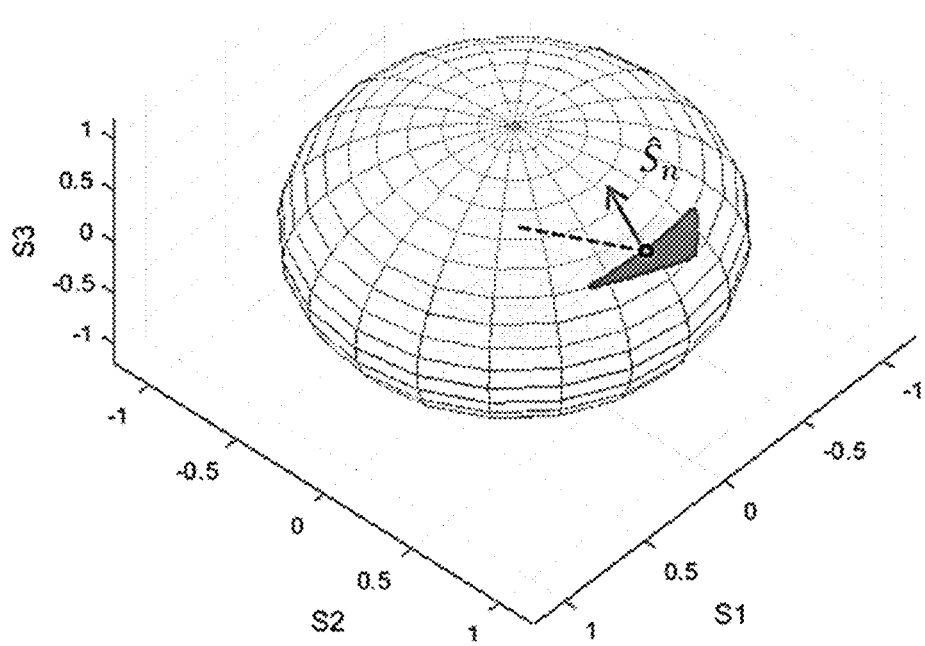
FIGS. 7A and 7B illustrate examples of a demultiplexed Stokes space constellation and demultiplexed signal intensity.
Figure 7B:
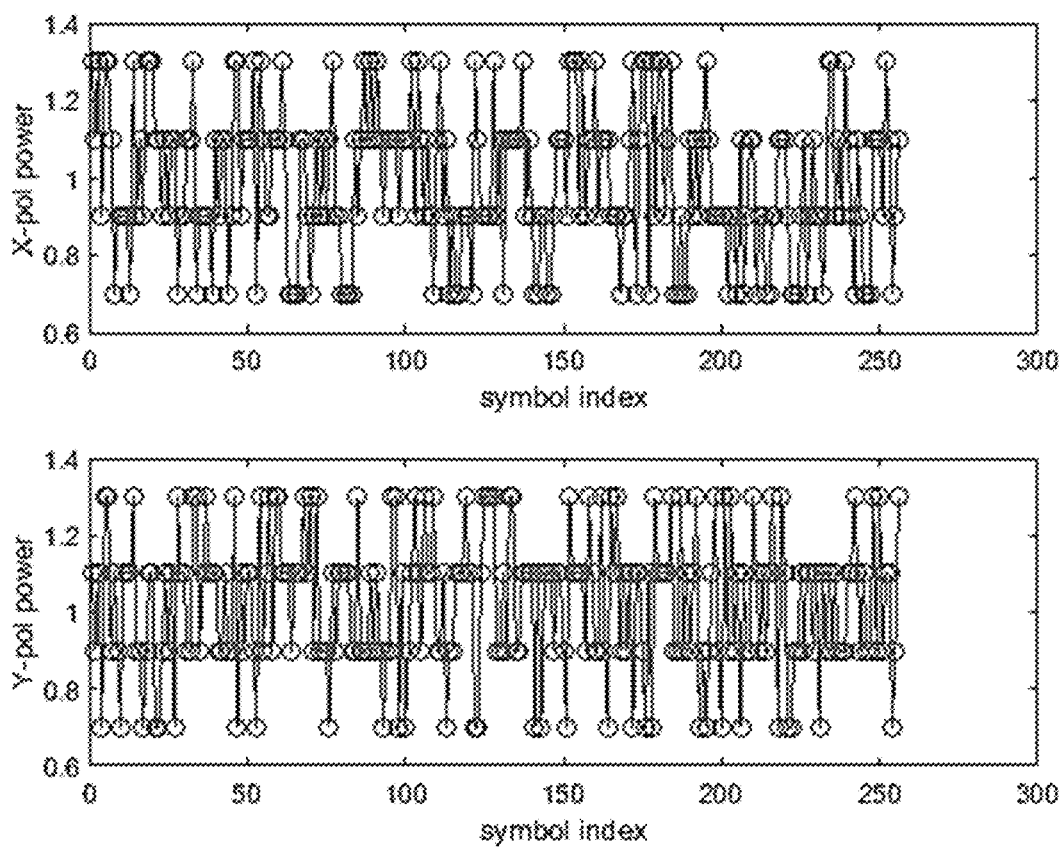

FIGS. 7A and 7B illustrate examples of a demultiplexed Stokes space constellation and demultiplexed signal intensity. In order to perform polarization demultiplexing, the operations of a demultiplexer can be visualized as movement of the received constellation plane on the Poincare sphere. The objective of the demultiplexer can thus be represented as achieving a destination state in which the normal vector of the constellation falls onto the S1=0 plane as shown in the example of FIG. 7A. Specific details of controlling the demultiplexer to achieve this desired destination state is provided further below. The demultiplexed signal intensity on each of the two polarizations is shown in the example of FIG. 7B, which shows more discernable modulation patterns.

The Stokes parameters (e.g., in $(S_1, S_2, S_3)$ format) can be extracted either from the input of the demultiplexer (in a feedforward configuration) or from the output of the demultiplexer (in a feedback configuration). Both configurations are described next.

Figure 8A:
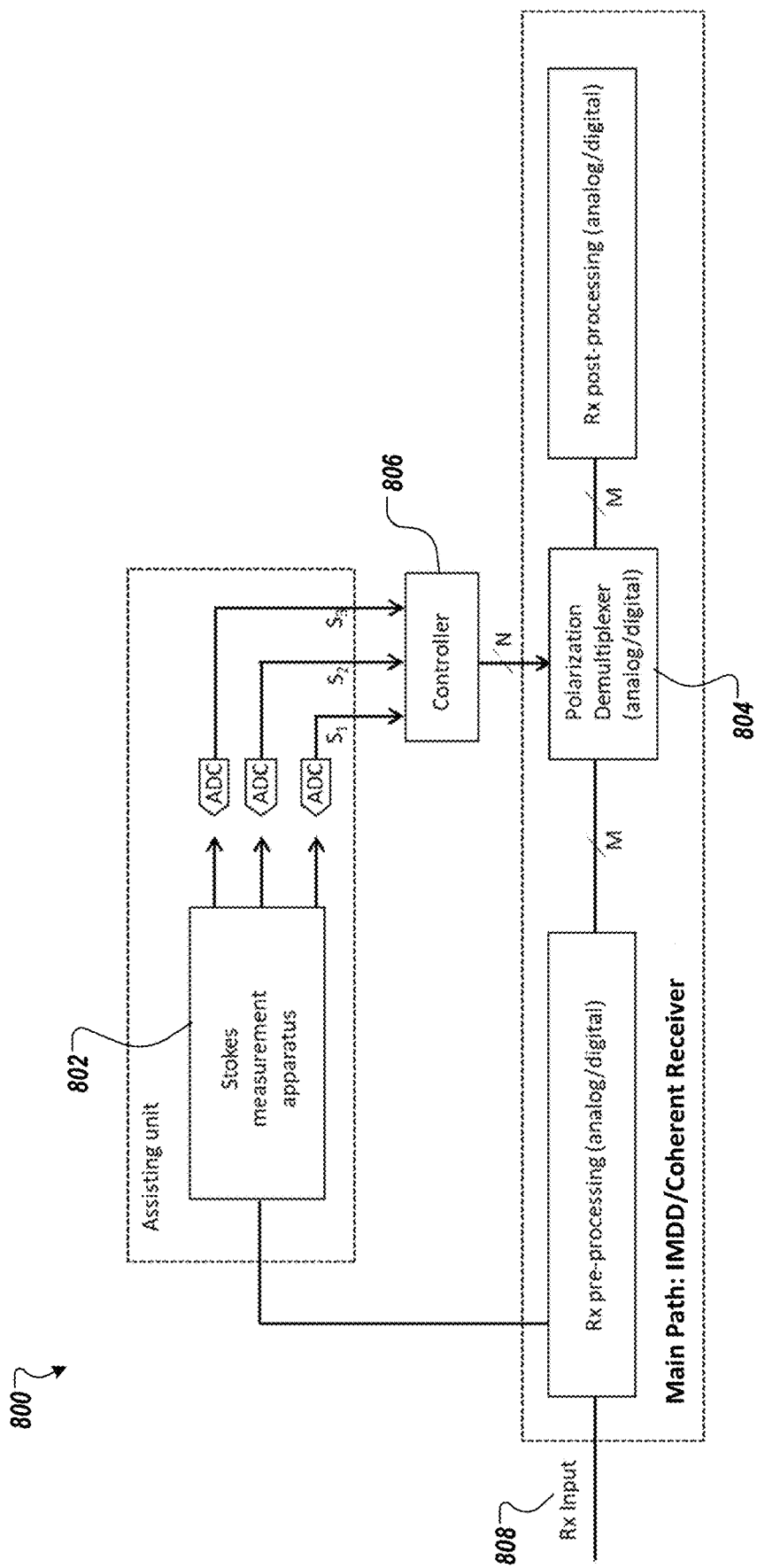
FIG. 8A illustrates an example of a feedforward arrangement of a Stokes measurement apparatus and an optical MIMO demultiplexer.

FIG. 8A illustrates an example of a feedforward structure in which polarization information extracted by Stokes measurement apparatus 802 is fed forward to MIMO demultiplexer 804 in the main path of the receiver, to help perform MIMO processing. For example, in receiver 800, Stokes measurement apparatus 802 extracts Stokes information from an input of MIMO demultiplexer 804, and the extracted Stokes information is fed forward to a controller 806 of the MIMO demultiplexer 804 to assist in performing MIMO demultiplexing of received optical signals 808. The controller 806 can be implemented as part of MIMO demultiplexer 804 or as a separate component.

Figure 8B:
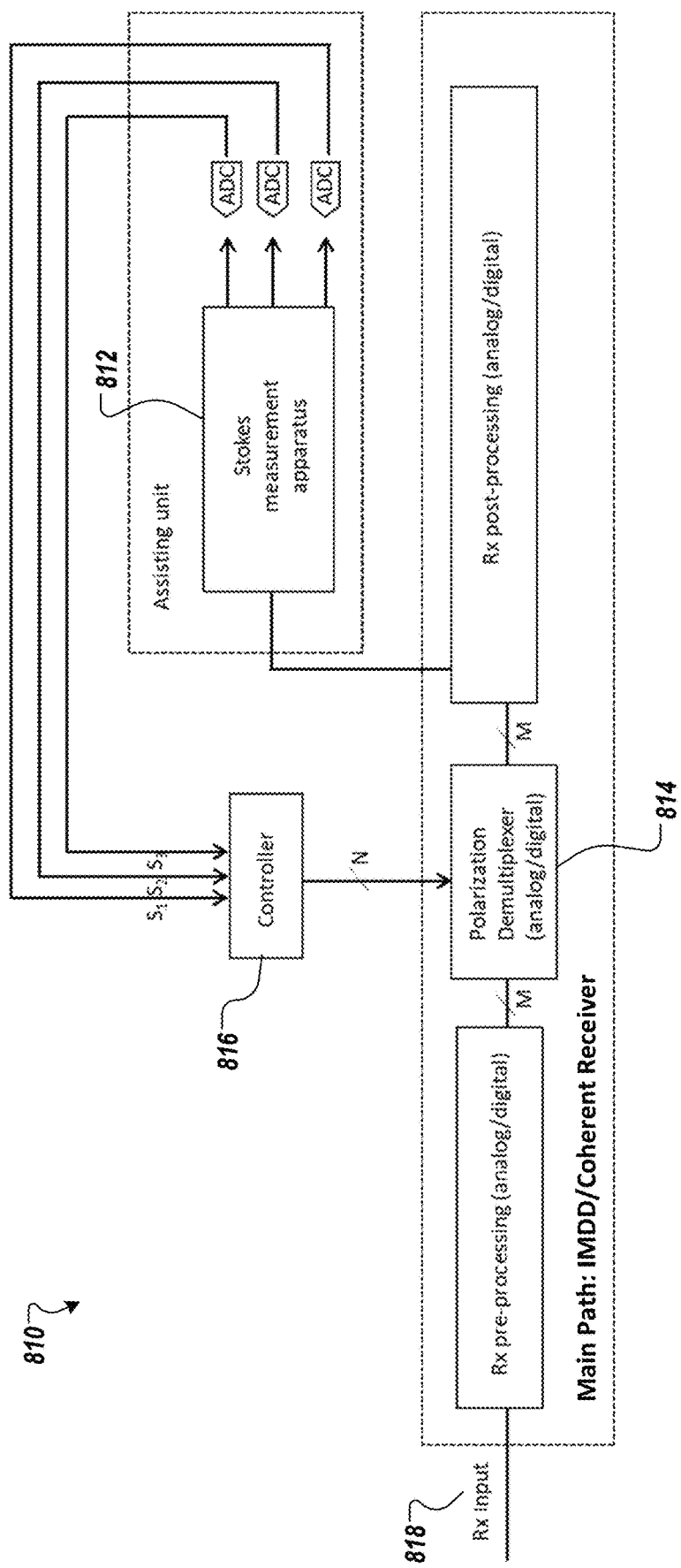
FIG. 8B illustrates an example of a feedback arrangement of a Stokes measurement apparatus and an optical MIMO demultiplexer.

FIG. 8B illustrates an example of a feedback structure in which polarization information extracted by Stokes measurement apparatus 812 is fed backwards to MIMO demultiplexer 814 in the main path of the receiver. For example, in receiver 810, Stokes measurement apparatus 812 extracts Stokes information from an output of MIMO demultiplexer 814, and the extracted Stokes information is fed backwards to a controller 816 of the MIMO demultiplexer 814 to assist in performing MIMO demultiplexing of received optical signals 818. The controller 816 can be implemented as part of MIMO demultiplexer 814 or as a separate component.

In both scenarios of FIGS. 8A and 8B, the polarization control unit in the MIMO demultiplexer (e.g., MIMO demultiplexer 804 or 814) can be based on integrated optics, free space bulk devices, or a fiber component. However, implementations of the present disclosure are not limited to a specific implementation of MIMO demultiplexers. Moreover, implementations of the present disclosure can be implemented in either a feedforward structure or a feedback structure.

Stokes Vector Assisted Analog Polarization Demultiplexer for IM-DD Systems

Figure 9:
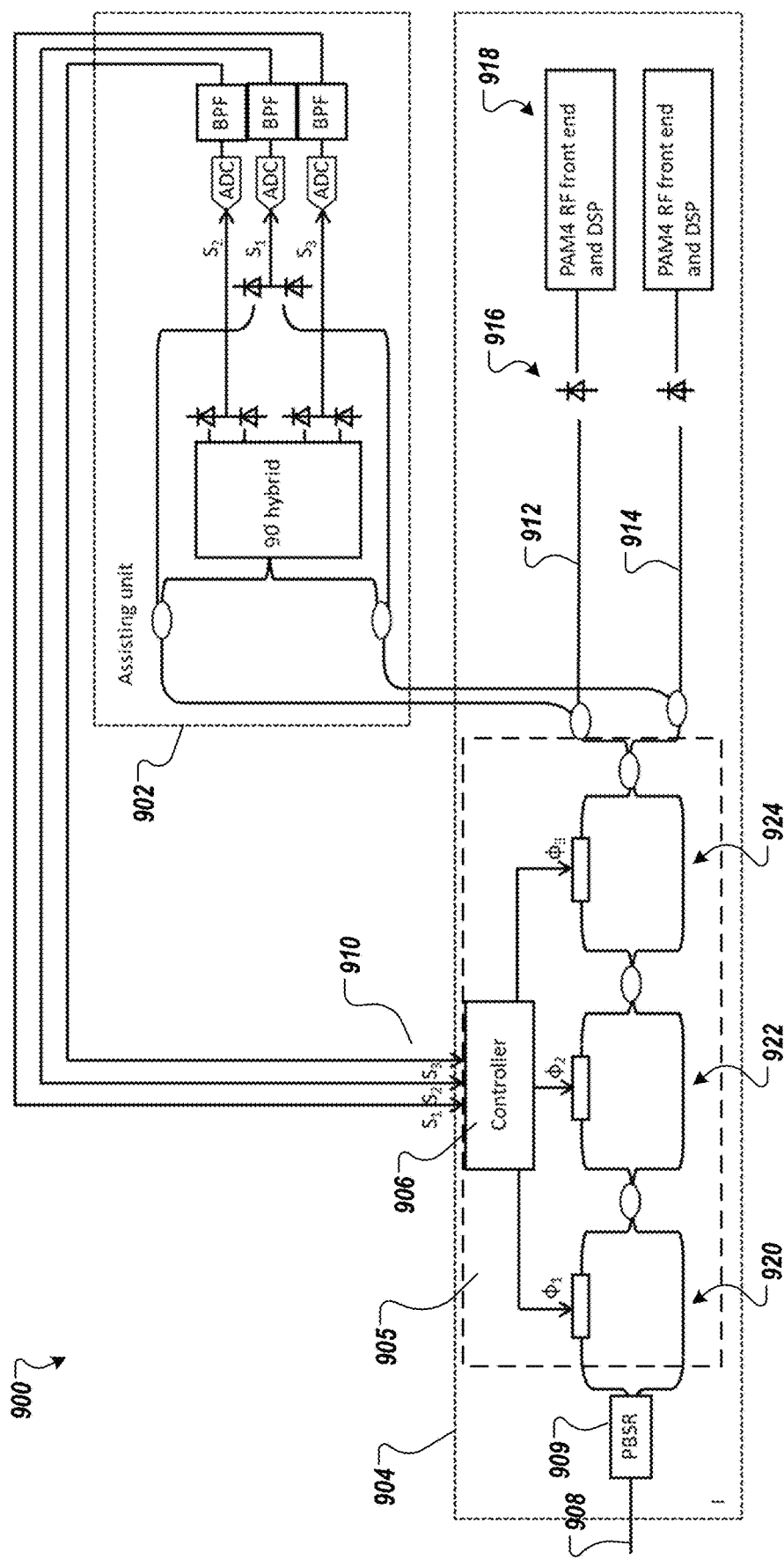
FIG. 9 illustrates an example of Stokes vector assisted optical polarization MIMO demultiplexing for an intensity-modulated-direct-detection (IM-DD) system.

FIG. 9 illustrates an example of Stokes vector assisted optical polarization MIMO demultiplexing for an IM-DD system, according to implementations of the present disclosure.

In the example optical receiver 900 of FIG. 9, Stokes measurement apparatus 902 is implemented based on integrated optical hybrid and balanced PD to extract Stokes parameters ($S_1, S_2, S_3$) from an optical waveform, as was described with reference to FIG. 2A. However, other implementations of Stokes measurement apparatus 902 can be used, such as those of FIGS. 2B and 2C. The extracted Stokes parameters ($S_1, S_2, S_3$) are provided as an electrical signal 910 to a main path which is implemented by an IMDD receiver 904. In particular, the electrical signal 910 can be provided to a controller 906 of an integrated MIMO polarization demultiplexer 905 in a feedback manner. In some implementations, the bandwidth of the electrical signal 910 received from the Stokes measurement apparatus 902 is smaller than an analog bandwidth of the demultiplexed output light signals that are output from the output ports 912 and 914 of the MIMO polarization demultiplexer 905. Although the example of FIG. 9 shows a feedback structure in which the Stokes measurement apparatus 902 measures the Stokes parameters ($S_1, S_2, S_3$) from an optical output of the MIMO demultiplexer 905, in some implementations a feedforward structure can be implemented in which the Stokes measurement apparatus 902 measures the Stokes parameters ($S_1, S_2, S_3$) from an optical input of the optical MIMO demultiplexer 905.

In the example of FIG. 9, the controller 906 controls the integrated MIMO polarization demultiplexer 905 to perform optical polarization MIMO demultiplexing on the input light that is received through input port 908 to generate two demultiplexed output light signals that are output through output ports 912 and 914. The demultiplexed output light signals that are output through output ports 912 and 914 are then detected by photodiodes 916 to yield electrical signals which are processed by receiver circuitry 918, which can perform demodulation and various digital signal processing (DSP) operations to recover the transmitted data.

In some implementations, the Stokes measurement apparatus 902 and the MIMO polarization demultiplexer 905 share a polarization beam-splitter rotator (PBSR) 909 which splits the input light into two transmission paths. In this example, the integrated MIMO polarization demultiplexer 905 implements a 3-stage optical polarization MIMO demultiplexing structure that adaptively performs 3-stage relative phase shifting of light in the two transmission paths. Details of the 3-stage optical polarization MIMO demultiplexing structure will be described further below with reference to FIGS. 16 to 24. Each of the 3 stages (920, 922, and 924) has two optical transmission paths (e.g., an upper transmission path and a lower transmission path in FIG. 9), with one phase shifter implemented in one of the optical transmission paths (or with two phase shifters implemented in push-pull configuration in both optical transmission paths) and a 2×2 coupler that combines the two optical transmission paths for the next stage. In each stage, the phase shifter controls the relative phase difference between the two optical transmission paths in that stage. Thus, the values of the three phase differences (denoted $\phi_1$, $\phi_2$ or $\phi_3$ in FIG. 9) in the three stages are applied by the corresponding phase shifter in each stage. The phase shifters can be implemented using thermo-optic (thermo-optic phase shifter, TOPS), electro-optic (electro-optic phase shifter, EOPS), or other types of phase shifters. Further details of the 3-stage phase shifting MIMO polarization demultiplexer are provided below with reference to FIGS. 16 to 24.

The three phase shifters of FIG. 9 are controlled by controller 906, which determines how much phase shift ($\phi_1$, $\phi_2$, $\phi_3$) to apply in the three phase shifting stages. In some implementations, the first phase shifter value, $\phi_1$, is a digital control, being either $-\pi/2$ or $\pi/2$. The second and third phase shifter values, $\phi_2$, and $\phi_3$, can be analog controls. The operation of the controller 906 can take two factors into account: (1) fast calculating the second and third phase shifts, $\phi_2$ and $\phi_3$, based on measured Stokes parameters 910 extracted by Stokes measurement apparatus 902 from the optical outputs (912 and 914) of the demultiplexer 905, and (2) continuous demultiplexing when one of phase shifters reaches the end of its range, the so-called "endless" property of demultiplexing as described with reference to FIGS. 16 to 24 below.

Figure 10B:
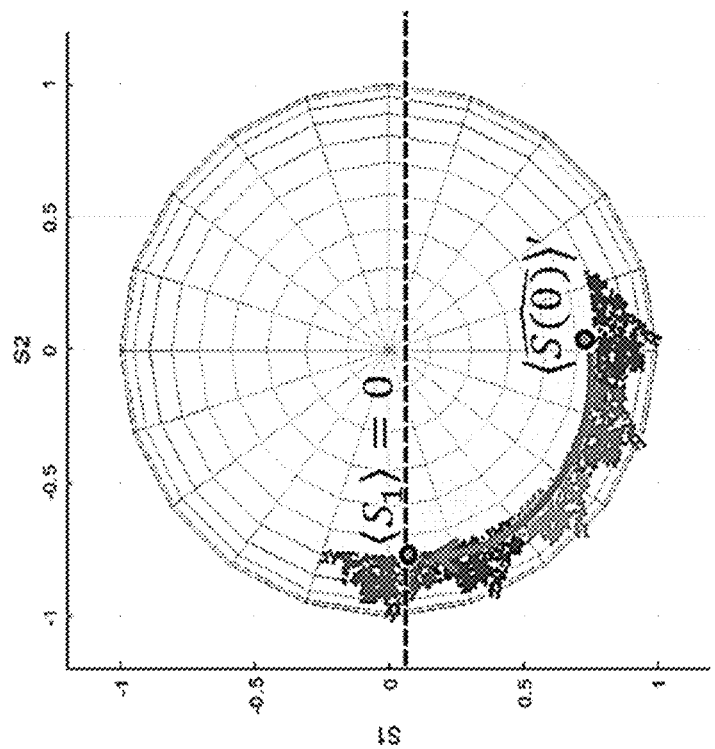
FIG. 10B illustrates an example of a Stokes-space representation of a third phase shift value $\phi_3$ which makes $\langle S_2 \rangle = 0$.
Figure 10A:
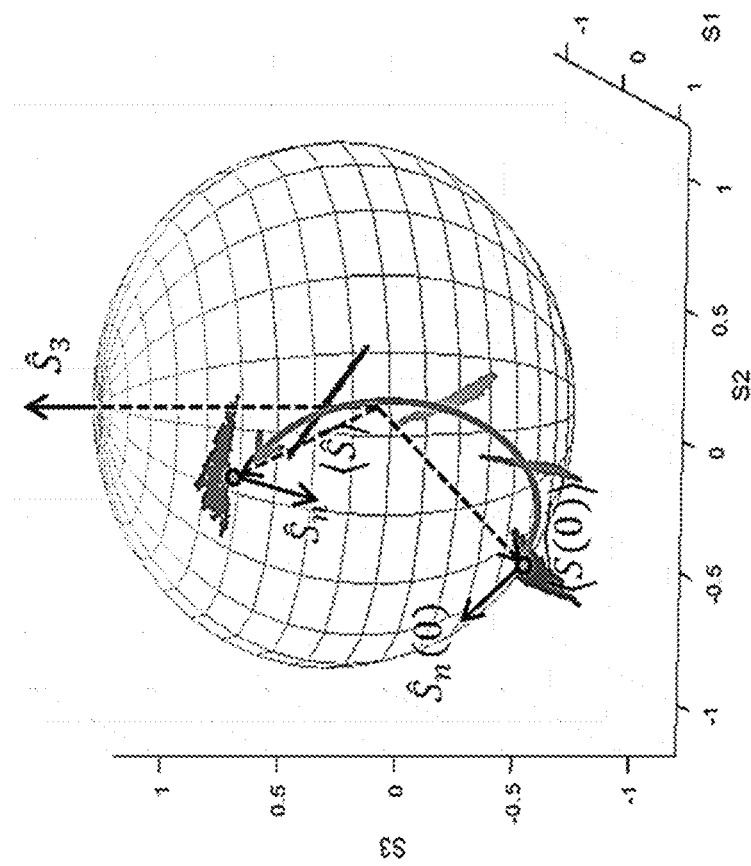
FIG. 10A illustrates an example of a Stokes-space representation of a second phase shift $\phi_2$ which makes the three vectors $\hat{S}_n$, $\langle \hat{S} \rangle$, and $\hat{S}_3$ to be coplanar in Stokes space.

As a solution of factor (1), the second phase shift $\phi_2$ is calculated so as to make the three vectors $\hat{S}_n$, $\langle \hat{S} \rangle$, and $\hat{S}_3$ to be coplanar in Stokes space, as shown in the example of FIG. 10A. The analytical expression of the coplanar condition is given by Equation 4:

$$\hat{S}_n \cdot (\langle \hat{S} \rangle \times \hat{S}_3) = 0 \qquad \text{Eq. 4}$$

where $$\hat{S}_n = T' \times \hat{S}_n(0)$$

$$\langle \hat{S} \rangle = T \times \langle \overline{S(0)} \rangle$$

where $\hat{S}_n(0)$ and $\langle \overline{S(0)} \rangle$ are the initial values of $\hat{S}_n$ and $\langle \hat{S} \rangle$. And rotation matrix T and T' are denoted by $$T = R_{S3}^{-1} \times R_{S1} \times R_{S3}$$

$$T' = D^{-1} \times R_{S3}^{-1} \times R_{S1} \times R_{S3} \times D$$

$$D = \begin{bmatrix} 1 & 0 & 0 & -\langle S_1(0) \rangle \\ 0 & 1 & 0 & -\langle S_2(0) \rangle \\ 0 & 0 & 1 & -\langle S_3(0) \rangle \\ 0 & 0 & 0 & 1 \end{bmatrix}$$

$$R_{S3} = \begin{bmatrix} \cos(\phi_3(0)) & -\sin(\phi_3(0)) & 0 & 0 \\ \sin(\phi_3(0)) & \cos(\phi_3(0)) & 0 & 0 \\ 0 & 0 & 1 & 0 \\ 0 & 0 & 0 & 1 \end{bmatrix}$$

$$R_{S1} = \begin{bmatrix} 1 & 0 & 0 & 0 \\ 0 & \cos(\phi_2) & -\sin(\phi_2) & 0 \\ 0 & \sin(\phi_2) & \cos(\phi_2) & 0 \\ 0 & 0 & 0 & 1 \end{bmatrix}$$

As a result of Equation 4, the desired second phase shift value, $\phi_{2,opt}$, is determined by:

$$f(\sin(\phi_{2,opt}), \cos(\phi_{2,opt})) = 0 \quad \text{Eq. 5}$$

where f(•) is a linear function with known parameters of $S_1(0)$, $S_2(0)$, $S_3(0)$, and $\phi_3(0)$ In some implementations, the solution $\phi_{2,opt}$ of Equation 5 can be implemented by a pre-calculated look-up table (LUT), or can be implemented using fast analytical approximation techniques.

Next, the third phase shift value $\phi_3$ is calculated to make $\langle S_1 \rangle = 0$, as shown in the example of FIG. 10B. The desired third phase shifter value, $\phi_{3,opt}$, can be determined by:

$$\cos(\phi_{3,opt}) \cdot \langle S_2(0) \rangle' - \sin(\phi_{3,opt}) \cdot \langle S_1(0) \rangle' = 0 \quad \text{Eq. 6}$$

where $S_1(0)'$ and $S_2(0)'$ are initial Stokes vector elements after the second phase shift $\phi_2$ adjustment.

Therefore, by solving Equation 5 and Equation 6, the demultiplexer output can meet the demultiplexing condition as was described with reference to FIG. 7A. In some implementations, solving the desired second and third phase values $\phi_{2,opt}$ and $\phi_{3,opt}$ analytically can provide a significant advantage because the Stokes parameters only need to be acquired once, which can greatly simplify the demultiplexing process and accelerate tracking speed. In some implementations, a progressive search algorithm can be used to solve for the desired second and third phase values $\phi_{2,opt}$ and $\phi_{3,opt}$, but in some scenarios this can require multiple acquisitions of the Stokes parameters which could result in more complexity and slow down tracking speed.

Due to the cyclical and periodic nature of phase, Equation 5 and Equation 6 have multiple solutions. For the second phase shift, the desired value $\phi_{2,opt}$ has a solution period of $2\pi$. For the third phase shift, the desired value $\phi_{3,opt}$ has a solution period of $\pi$. Taking into account the factor of endless demultiplexing control (factor 2 discussed above), the desired value of the second phase shift, $\phi'_{2,opt}$, can be selected from the multiple solutions, being limited in a practical operation range of $['1 \pi, \pi]$. The desired value of the third phase shift, $\phi'_{3,opt}$, can be selected from the multiple solutions, being limited in the operation range of $[-\pi, 0]$ when the first phase shift value is $\phi_1 = \pi/2$ and in the operation range of $[0, \pi]$ when $\phi_1 = -\pi/2$. Further details of endless demultiplexing control are discussed with reference to FIGS. 16 to 24, below.

In some implementations, the bandwidth of the Stokes measurement apparatus (e.g., Stokes measurement apparatus 902 in FIG. 9) can be configured by balancing the Stokes vector signal-to-noise-ratio (SNR) and hardware complexity. For example, to increase Stokes vector SNR and/or avoid ambiguity, an overhead or a pilot tone can be included in the data stream to enhance low frequency strength, as discussed with reference to FIGS. 18A to 20B, below. In some implementations, a radio-frequency (RF) bandpass filter (BPF) can be implemented as shown in FIG. 9 to select a particular signal band and to filter out noise. However, implementations of the present disclosure are not limited to implementing an overhead, a pilot tone, or a bandpass filter. In some implementations, any one or more (or none) of an overhead, a pilot tone, and/or bandpass filter schemes can be used.

Stokes-Based Demultiplexing in the Presence of Polarization Dependent Loss (PDL)

In addition to polarization drift, other non-idealities in an optical communication system can degrade performance, such as polarization dependent loss (PDL), which amplifies or attenuates different polarization modes differently. PDL can be induced in a fiber transmission link, in a fiber coupling, or in components (e.g., a PBSR) of the receiver. In the presence of PDL, the rotator and retarder matrices $T_{Rot,i}$ and $T_{Ret,i}$ are no longer unitary, resulting in an asymmetric constellation plane. In this case, demultiplexing with phase shift controls alone may be insufficient to fully separate the signals which have been mixed in the two polarization modes of light. Instead, a combination of optical phase shifters and optical attenuators can be implemented in the demultiplexer, for example by using a variable optical attenuator (VOA). Additional details of PDL and using VOAs to counteract PDL are discussed with reference to FIGS. 16 to 24, further below.

Figure 11:
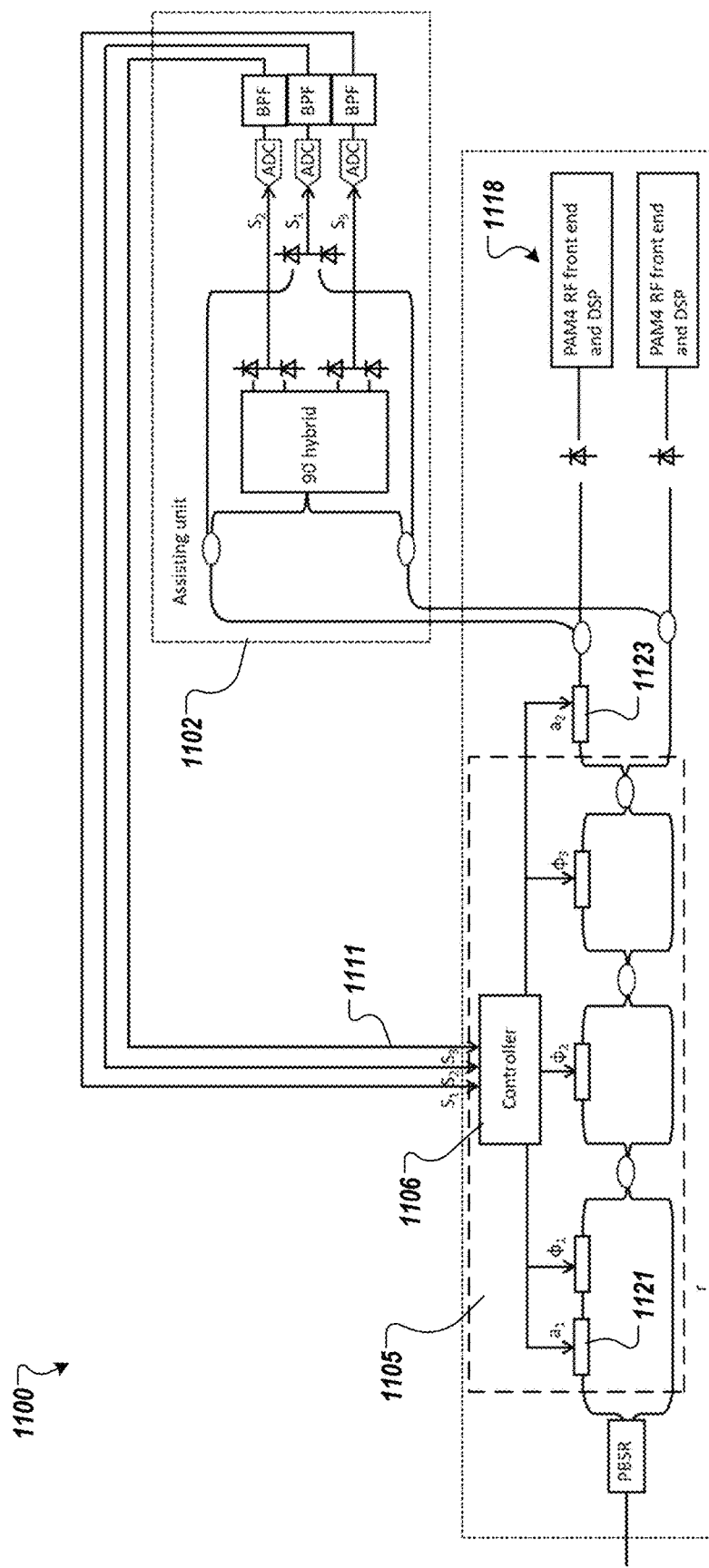
FIG. 11 illustrates an example of Stokes vector-assisted analog polarization demultiplexing with adaptively controlled variable optical attenuators (VOAs)

FIG. 11 illustrates an example of Stokes vector-assisted analog polarization demultiplexing for an IM-DD system, which incorporates adaptively controlled VOAs to compensate for PDL, according to implementations of the present disclosure.

In example optical receiver 1100 of FIG. 11, Stokes measurement apparatus 1102 is implemented in a manner similar to that shown in FIG. 9 and generates Stokes parameters $(S_1, S_2, S_3)$, while demultiplexer 1105 implements three stages of phase shift control with controller 1106, similar to the example of FIG. 9. Detailed descriptions of the Stokes measurement apparatus 1102 and MIMO demultiplexer 1105 are therefore similar to those of FIG. 9.

In addition, demultiplexer 1105 also implements optical attenuation controls using VOAs 1121 and 1123 which apply optical attenuation values (a1, a2) to optical transmission paths at different parts of the demultiplexer 1105. Although the example of FIG. 11 shows two VOAs, in general, a greater number of VOAs may be used in some implementations, for example four VOAs with two additional VOAs in the second and third phase-shifting stages of the demultiplexer 1105. Different VOAs can be implemented to counteract different causes of PDL. In the example of FIG. 11, the VOA 1121 (applying attenuation a1) counteracts PDL in the receiver (PDL that occurred after transmission), and VOA 1123 (applying attenuation a2) counteracts PDL in the transmitter (PDL that occurred before transmission). In some implementations, additional VOAs, such as VOAs implemented in the second and third phase-shifting stages of the demultiplexer 1105, can counteract PDL that occur in light during transmission through the fiber link. In scenarios where PDL in the transmitter and/or receiver is not likely to change significantly over time, the corresponding VOA 1121 (applying attenuation a1) and/or VOA 1123 (applying attenuation a2) may not need dynamic tracking control, and instead may be configured to have a constant value, for example in a set-and-forget mode, or in a mode that is only occasionally updated.

In the example of FIG. 11, controller 1106 can control the VOAs 1121 and 1123. In this example, a single controller 1106 controls the VOAs as well as control the phase-shifting stages (e.g., the single controller 1106 implements both functions). However, in some implementations, separate controllers can be implemented to control the phase-shifting stages and the VOAs. For example, one of more such controllers may be implemented by at least one processor executing instructions stored on at least one memory. In addition, controller 11106 can be implemented as part of MIMO demultiplexer 1105 or as a separate component.

The attenuation values a1 and a2 of VOAs 1121 and 1123 can be controlled by controller 1106 using an optimization or pseudo-optimization process, designed to reduce or minimize measured error in feedback. In some implementations, a progressive searching algorithm can be used to find desired values of a1 and a2, either before or after the analytical solutions of the second-stage and third-stage phase shift values $\phi_2$ and $\phi_3$ discussed with reference to FIG. 9, above. The feedback signal 1111 (e.g., measured error) that is used to drive the controller 1106 can be obtained either from Stokes measurement apparatus 1102 (the Stokes measurement branch) or from the received data that is demultiplexed by MIMO demultiplexer 1105 (the main demultiplexing branch). If the feedback signal 1111 is drawn from Stokes measurement apparatus 1102, then in some implementations, linear polarization crosstalk (correlation coefficient between X and Y) or constellation geometry distortion can be used as the feedback signal 1111, as an example. If the feedback signal 1111 is drawn from the data branch, such as from receiver circuitry 1118 (which performs demodulation and other DSP operations to recover the transmitted data), then the linear polarization crosstalk or bit error rate (BER) can be used as the feedback signal 1111, as an example. In general, for a given feedback signal 1111 (e.g., measured error), the controller 1106 adapts the attenuation values a1 and a2 of VOAs 1121 and 1123 to drive the error function towards a desired value, so as to mitigate the influence of PDL. Additional details of PDL and using VOAs to counteract PDL, for general error functions, are discussed with reference to FIGS. 16 to 24, below.

Techniques to Mitigate Ambiguity and Singularity of Stokes Demultiplexing

Figure 12A:
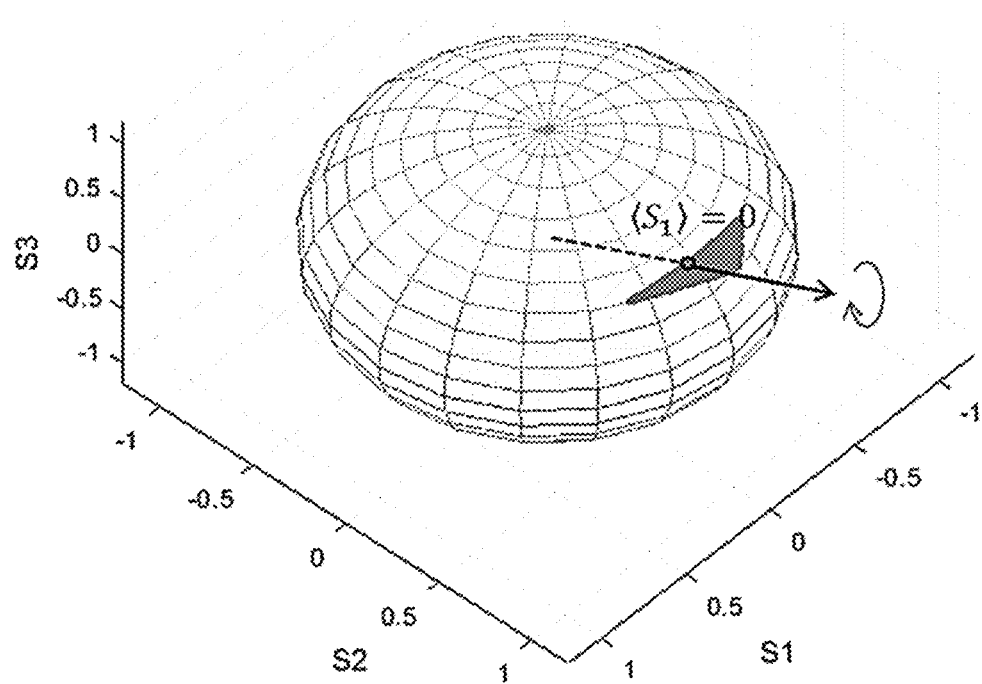
FIG. 12A illustrates an example of polarity ambiguity in optical MIMO demultiplexing.
Figure 12B:
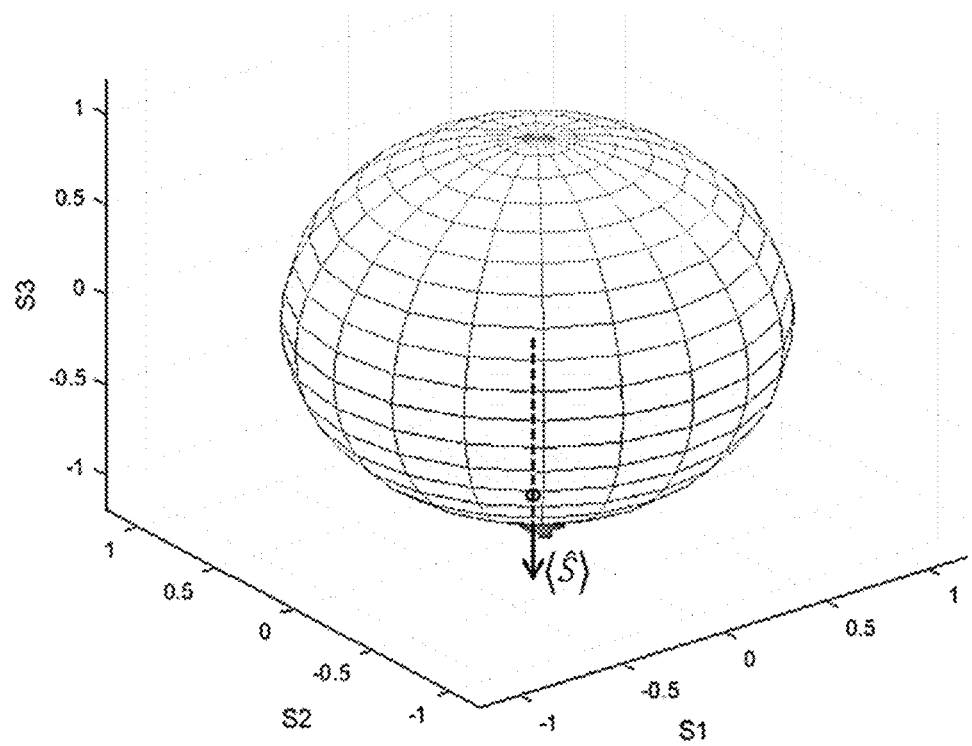
FIG. 12B illustrates an example of singularity in optical MIMO demultiplexing.

In implementations where the demultiplexing operation uses the objective of $\langle S_1 \rangle = 0$ to control the third-stage phase shift value $\phi_3$, there is possibility that the demultiplexed signal may have polarity ambiguity and singularity. As shown in the example of FIG. 12A, polarity ambiguity results from 180° flipping of the constellation plane about the $\langle \hat{S} \rangle$ axis, leading to a physical swapping between the two data streams in the two polarization states of the optical waveform. As shown in the example of FIG. 12B, singularity happens when the $\langle \hat{S} \rangle$ vector overlaps with $\hat{S}_3$ (at either the north pole or the south pole of the Poincare sphere). In this case, no matter how much the third-stage phase shift value $\phi_3$ changes, the objective of $\langle S_1 \rangle = 0$ is always satisfied. This can lead to significant polarization crosstalk and, worse yet, result in constellations all being in the $S_1 = 0$ plane, so that two data streams in the two polarization states will yield identical outputs.

To mitigate such ambiguity, in some implementations, identifiers on two polarizations (e.g., on the two data streams carried by the two polarizations) can be used. For example, one possible identifier is to add a marker signal (e.g., a dither tone) on each data stream. For example, two different marker signals (e.g., frequency tones) can be applied in the transmitter to differentiate the two polarizations of light. Example implementations of using such frequency pilot tones are described with reference to FIGS. 18A to 20B, further below. By detecting the two different marker signals in the Stokes measurement apparatus, the two polarizations can be distinguished, so that ambiguity can be avoided.

To mitigate singularity, in some implementations, an additional constraint can be added after optimization of the second-stage phase shift value $\phi_2$ to enable determination of whether $\langle \hat{S} \rangle$ is at the north pole or at the south pole of the Poincare sphere. For example, this can be implemented by calculating $\langle S_3 \rangle$. If it is determined that $\langle S_3 \rangle = \pm 1$, then the second-stage phase shift value $\phi_2$ is re-optimized to avoid this particular state. As such, singularity can be effectively eliminated.

Figure 13:
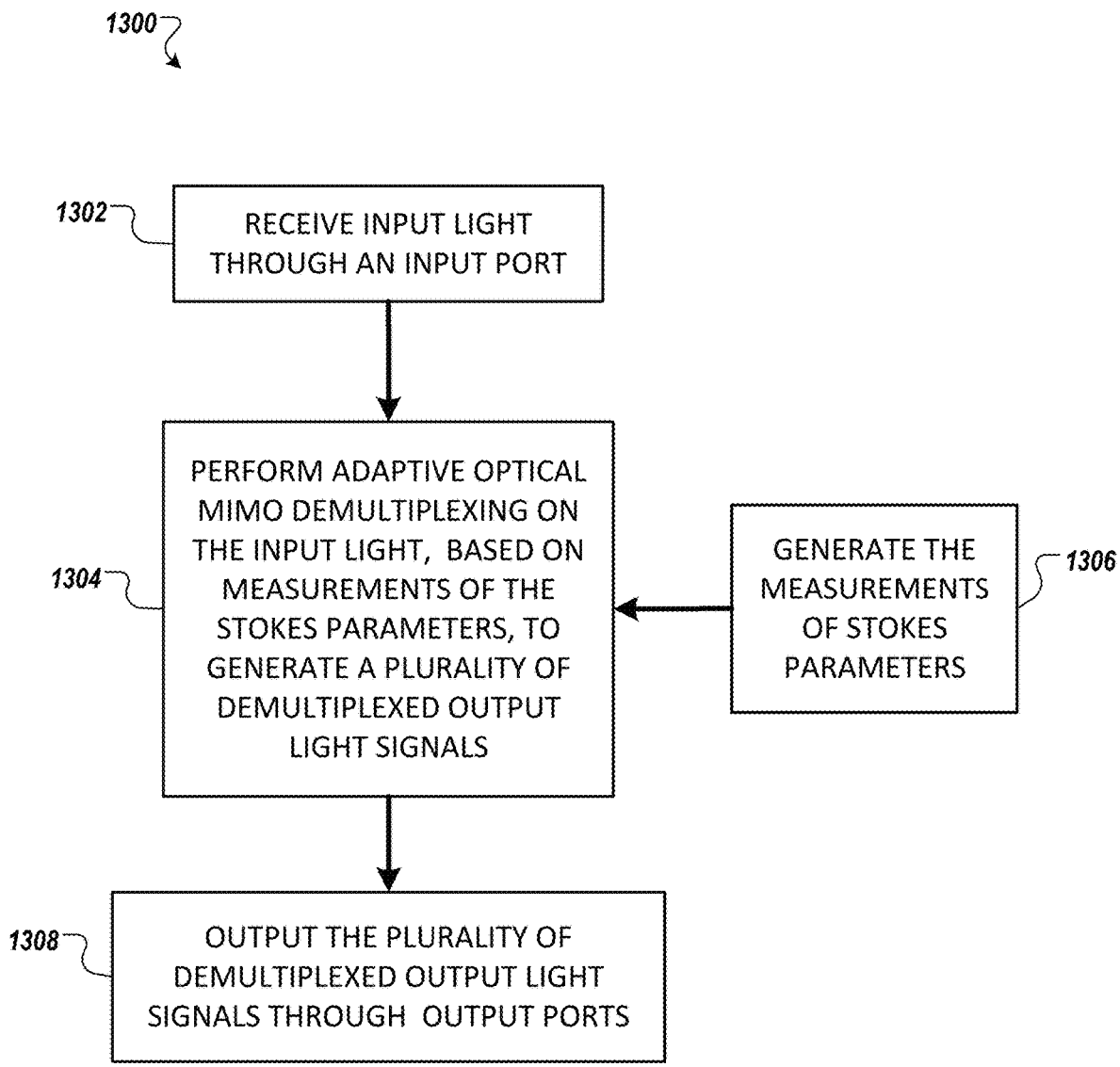
FIG. 13 is a flow chart illustrating an example of controlling an optical polarization demultiplexer based on Stokes parameter measurements, according to implementations of the present disclosure.

FIG. 13 is a flow chart illustrating an example method 1300 of controlling an optical polarization demultiplexer based on Stokes parameter measurements, according to implementations of the present disclosure. For purposes of illustration, the description of method 1300 will be provided with reference to the optical receiver 900 of FIG. 9.

In step 1302, input light is received through an input port (e.g., input port 908 of FIG. 9). In step 1304, adaptive optical MIMO demultiplexing is performed on the input light to generate a plurality of demultiplexed output light signals, where the adaptive optical MIMO demultiplexing is controlled based on measurements of the Stokes parameters generated in step 1306. For example, the Stokes parameters can be provided as feedforward control or as feedback control. In particular, in step 1306, the measurements of the Stokes parameters can be generated by processing the input light (e.g., in a feedforward manner) or by processing the demultiplexed output light signals from the outputs of the MIMO demultiplexer (e.g., in a feedback manner). The measurements of the Stokes parameters can be performed, for example, according to the descriptions of FIGS. 1A to 3, above.

In step 1304, the adaptive optical MIMO demultiplexing can be performed, for example, as described with reference to FIGS. 5 to 12B, above, by splitting the input light into a first input light signal and a second input light signal of different polarizations, and using a plurality of stages (e.g., 3 stages) of optical phase-shifting to apply relative phase shifts between the first input light signal and the second input light signal, based on the measurements of the Stokes parameters generated by the Stokes measurement apparatus. In such implementations, as described with reference to FIGS. 5 to 12B, above, the MIMO demultiplexing can be performed using non-iterative control, for example by using analytical solutions to determine the amounts of optical phase shifts that are applied by the second optical phase shifting stage and the third optical phase shifting stage, based on the measurements of the Stokes parameters. Moreover, in some implementations, to compensate for PDL, a relative attenuation can be applied between the first input light signal and the second input light signal, as described with reference to FIG. 11, above.

In step 1308, the plurality of demultiplexed output light signals are output through output ports (e.g., output ports 912 and 914).

Multi-stage Optical Polarization MIMO Demultiplexers

In the following, additional details are provided of adaptive optical polarization MIMO demultiplexers that can be used in implementations of the present disclosure. Such multiplexers can be used, for example, to implement MIMO demultiplexers described in the above implementations (e.g., in linear receiver 502 of FIG. 5, MIMO demultiplexers 804 and 814 of FIGS. 8A and 8B, MIMO demultiplexer 905 of FIG. 9, and MIMO demultiplexer 1105 of FIG. 11). For example, the optical polarization MIMO demultiplexers described below can be used with a Stokes measurement apparatus as described above, to perform adaptive optical MIMO demultiplexing of input light based on Stokes parameter measurements provided by the Stokes measurement apparatus arranged in a feedforward or feedback configuration. Details of how such Stokes parameter measurements are used to assist optical MIMO demultiplexing were described above (e.g., with reference to FIGS. 1 to 13), and will not be repeated below.

Furthermore, while examples of multi-stage optical polarization MIMO demultiplexers are described below for an IMDD system, in general, the Stokes-based demultiplexing techniques described with reference to FIGS. 1A to 13, above, are applicable to both IMDD and coherent systems, and to more general optical MIMO demultiplexing techniques.

The multi-stage optical polarization MIMO demultiplexers described below can achieve significantly improved efficiency and speed with lower rates of data loss. This is accomplished by implementations which enable an "endless" property of adaptive demultiplexing without requiring any resets of interruptions of data reception. In some implementations, this is achieved by an adaptive three-stage phase-shifting demultiplexer structure in which the first stage phase-shifter is controlled to apply a binary value, and the second and third stages of phase-shifting are controlled to operate over finite ranges (e.g., continuous ranges) of phase shifting values. The control of the three stages of phase-shifting are coordinated to adapt to random and unpredictable rotations and losses in received polarization, without requiring any resets of the phase-shifting that would interrupt signal reception, a property referred to as an "endless" operation of the demultiplexer.

In general, multi-polarization detection is challenging, because polarization states tend to drift as an optical waveform travels through a communication system (e.g., due to randomly changing birefringence in fiber transmission lines). Over a long-distance system, these random drifts of polarization can accumulate progressively without limit. In an optical communication system which uses polarization division multiplexing (PDM) to transmit different signals over the two polarization modes of light, the random and unknown polarization drifting creates challenges for a receiver to accurately detect the proper orientation of the two polarization modes, resulting in the different signals becoming mixed at the receiver (sometimes referred to as "cross-talk"). Hence, even though a signal is transmitted in one polarization mode, the signal may actually be received in both polarization modes at the receiver. In addition to polarization drift, other non-idealities in an optical communication system may degrade performance, such as polarization dependent loss (PDL), which amplifies or attenuates different polarization modes differently.

To compensate for polarization drift and other non-idealities, a multi-polarization receiver must do constant, adaptive MIMO demultiplexing to separate and unmix the signals that are transmitted in the two polarization modes. Such MIMO multiplexing may be performed either in the optical domain using optical phase shifters or in the electronic domain by digital signal processing (DSP). Optical MIMO demultiplexing provides various advantages over DSP-based MIMO demultiplexing. For example, optical demultiplexing can reduce power consumption, complexity, and sensitivity to the symbol rate. By contrast, DSP-based demultiplexing typically requires higher power consumption, and can become prohibitively complex for high symbol-rate or large mode-number systems.

Furthermore, optical polarization demultiplexing can be used in conjunction with intensity modulation and direct detection (IMDD) transmission formats (in which information is transmitted only in the magnitude squared of the optical electric field), such as pulse amplitude modulation (PAM). This is because optical demultiplexing can be performed using optical elements that separate the two polarization modes of light, before photodetection is performed on the light. By contrast, DSP-based polarization demultiplexing cannot be used in conjunction with IMDD because the nonlinearity of optical direct detection in IMDD results in a loss of information, which cannot be recovered by DSP techniques alone. Instead, DSP-based demultiplexing typically requires coherent reception. In such systems, the two polarization modes of light are first separated by coherent detection, and then the full field of each polarization is detected, allowing the DSP to perform processing on the signals received in the two polarization modes. An example of this distinction is described with reference to FIGS. 14A and 14B, below.

FIGS. 14A and 14B illustrate examples of dual-polarization communication systems 1400 and 1450 that utilize coherent detection and intensity-modulated-direct-detection (IMDD), respectively. The transmitters (1402 and 1452) implement polarization division multiplexing by first splitting a laser input light (1404 and 1454) into two optical transmission paths that lead to two modulators, a first modulator (1406 and 1456) and a second modulator (1408 and 1458). The first modulator (1406 and 1456) modulates the light in one optical transmission path with a first data stream x or X (1410 and 1460) and the second modulator (1408 and 1428) modulates the light in other optical transmission path with a second data stream y or Y (1412 and 1462). In the coherent case, x and y are complex numbers representing the optical field, whereas in the IMDD case, X and Y are real numbers representing the optical power. Throughout this disclosure, lower-case letters represent complex numbers (field) and upper-case letters represent real numbers (power). The two modulated optical waveforms, one modulated by x (X) and the other modulated by y (Y), are combined in a polarization beam splitter and rotator (PBSR) (1414 and 1464), which converts one of the optical waveforms into an orthogonal polarization. After the PBSR, the two optical waveforms carrying x (X) and y (Y) co-exist in the same optical transmission path but have orthogonal polarizations.

This dual-polarized (DP) optical waveform travels through a fiber link (1416 and 1466). As the DP waveform travels through the fiber, various unknown and varying birefringence and twists in the fiber can cause changes in the polarizations of the two waveforms. If the fiber link (1416 and 1466) does not have significant polarization-dependent loss (PDL), then the two polarizations remain orthogonal. For example, x (X) may evolve from a linear horizontal polarization to a right-hand circular polarization, which means that y (Y) evolves from a linear vertical polarization to a left-hand circular polarization. However, in the presence of PDL, the orthogonality of the polarizations in the DP optical waveform will degrade, which will complicate the demultiplexing of x (X) and y (Y).

At the receiver (1418 and 1468), the DP waveform enters a PBSR (1420 and 1470) which splits the DP waveform into two waveforms, h and v, which have orthogonal polarizations. Due to the non-idealities in the optical communication system, the outputs of the PBSR, h and v, are each a linear and orthogonal combination of x and y (more precisely, the received signals will be noisy versions of x and y due to additive noise in the system, but we will assume a noiseless scenario for the purposes of this discussion). In particular, h is a linear combination of x and y, and similarly v is a linear combination of x and y. For example, h=(x−y)/sqrt(2) and v=(x+y)/sqrt(2). The purpose of MIMO demultiplexing is to extract the original signals x and y from the received h and v. This can be done via DSP-based demultiplexing (e.g., using demultiplexer 1430 in FIG. 14A for coherent detection) or via optical demultiplexing (e.g., using demultiplexer 1480 in FIG. 14B for direct detection/IMDD).

In the coherent case of FIG. 14A, there is a local oscillator (LO) laser (1422) with which h and v are interfered, in two optical hybrids (1424 and 1426). The output waveforms from the hybrids 1424 and 1426 are photodetected by photodetectors 1428 and the resulting electrical signals are fed into MIMO demultiplexer 1430 which performs demultiplexing to separate signals x' (1432) and y' (1434), for example using MIMO signal processing. As such, in the example of coherent reception in FIG. 14A, since both the magnitude and phase of the optical field are detected by the receiver 1418, MIMO demultiplexing must be done by the demultiplexer 1430 after detection by the photodetectors 1428.

By contrast, in the example of IMDD reception in FIG. 14B, the receiver 1468 detects the optical power. This nonlinearity results in a loss of information, which means that in an IMDD system, MIMO demultiplexing must be done in optics, before photodetection. This is because the optical phase information is lost in the photodetection in the IMDD case, so it is impossible to always recover x and y no matter how much electrical signal processing is done. In the example of FIG. 14B, h and v are each a linear and orthogonal combination of x and y. Therefore, there can be a fundamental loss of information if h and v are detected directly using IMDD without first demultiplexing. However, if h and v are optically demultiplexed into x' (1478) and y' (1479) before photodetection to yield electrical signal outputs X' (1482) and Y' (1484), then there is no loss of information.

For two orthogonal states of polarization, a PDM optical communication system can be represented as a 2×2 Multi-Input-Multi-Output (MIMO) channel. Thus, the optical transmission can be modeled as a 2×2 matrix, F. The matrix F is a transfer function describing polarization effects and chromatic dispersion of the communication from transmitter to receiver. For example, the matrix F can model the effects of the fiber that connects a transmitter and receiver, as well as the effects of the optical components in the transmitter and receiver themselves. For purposes of this disclosure, the matrix F will be referred to as a "channel matrix F" with the understanding that the "channel" can represent various effects of the optical communication system, such as the fiber transmission line and components of the transmitter and/or receiver.

$$\begin{bmatrix} h \\ v \end{bmatrix} = F \begin{bmatrix} x \\ y \end{bmatrix}$$

To estimate the original signals x and y from the received signals h and v, an optical demultiplexer D is applied at the receiver, to generate estimates x' and y':

$$\begin{bmatrix} x' \\ y' \end{bmatrix} = DF \begin{bmatrix} x \\ y \end{bmatrix}$$

Then, as long as x'=ax and y'=bx (where "a" and "b" are complex constants), then the receiver will have successfully demultiplexed the polarizations.

Consider the simpler case of a lossless system (where the optical channel matrix F is unitary), which is approximately the case in most short fiber-optic links. In such scenarios, fiber loss is negligible, especially fiber polarization-dependent loss (PDL). The channel matrix F can then be characterized by four real numbers. Since the receiver only needs to achieve x'=ax and y'=bx for successful demultiplexing, the demultiplexing matrix D can be characterized by two real numbers. Thus, for a lossless scenario, the four real numbers of the channel matrix F can be expressed as only two, independently-controlled real parameters which should be compensated by the demultiplexing matrix D.

Thus, for a unitary system (lossless scenario), the optical demultiplexer (i.e., the matrix D above) requires a theoretical minimum of at least two phase control signals to reverse the effects of the channel matrix F and demultiplex. An example of a 2-stage demultiplexer is describe with reference to FIG. 15, below. However, using just two phase control signals in a demultiplexer has a problem in that the demultiplexing requires an infinite range of phase shifts to achieve the "endless" property, and is therefore not feasible using practical phase shifters. Instead, practical phase shifters have a finite limit on the range of phase shift. Therefore, while demultiplexing optical signals that have travelled through randomly changing phase distortions in a fiber, a phase shifter in a 2-stage demultiplexer will eventually reach an end of its practical range and must be "reset" which can cause interruptions and/or delays in the reception of data. An example of this problem is discussed below with reference to FIG. 15.

Figure 15:
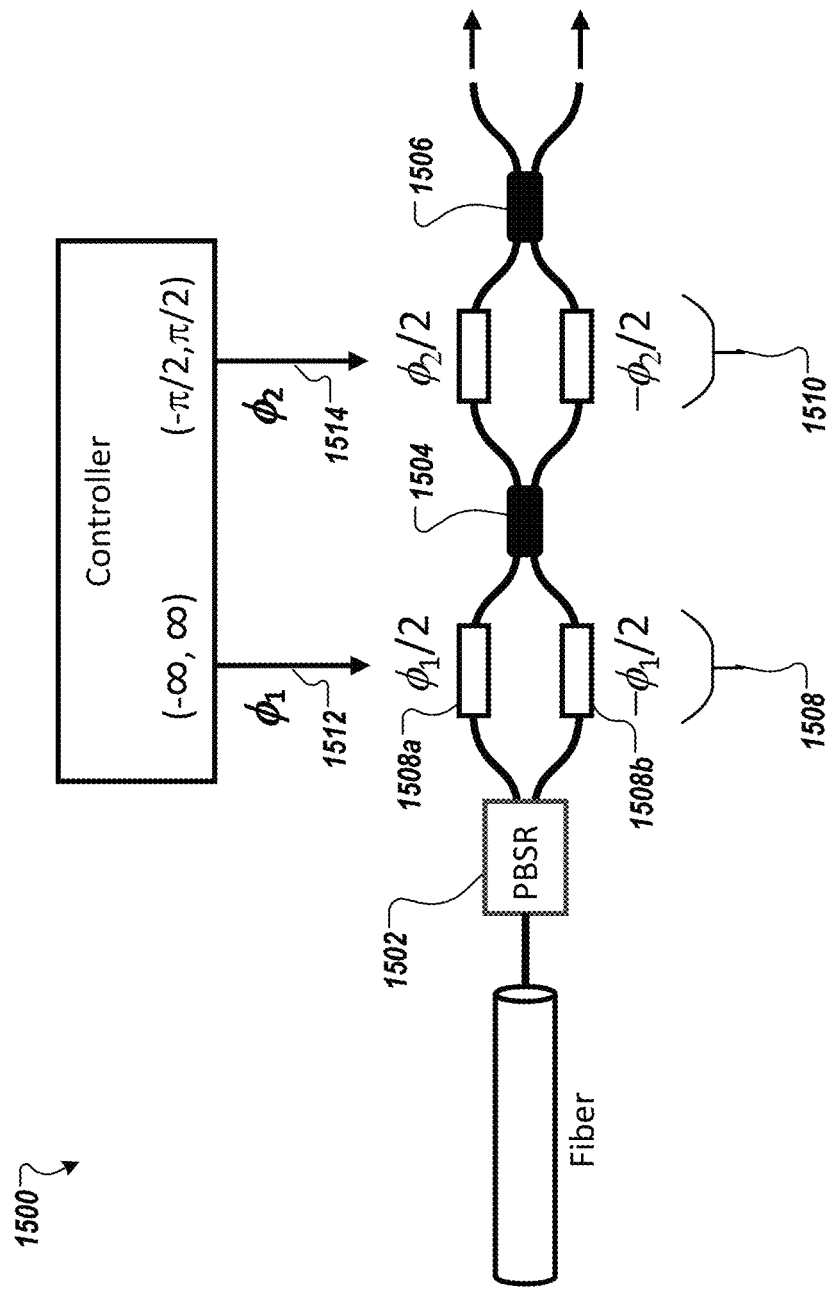
FIG. 15 illustrates an example of an optical polarization demultiplexer with two phase-shift control signals.

FIG. 15 illustrates an example optical polarization demultiplexer 1500 with two control signals. Demultiplexer 1500 consists of a polarization splitter and rotator (PBSR) 1502, two 50/50 couplers 1504 and 1506, and two phase shifters 1508 and 1510 (e.g., differential phase shifters). The two phase shifters 1508 and 1510 are controlled by separate control signals $\varphi_1$ (1512) and $\varphi_2$ (1514). In the example of FIG. 15, each of the phase shifters 1508 and 1510 is a differential phase shifter. For example, phase shifter 1508 is implemented as an interferometer with two individual phase shifting elements (1508a and 1508b) that adjust the optical phase in one direction in one arm of the interferometer and adjusts the optical phase in the opposite direction in the other arm. A similar structure is shown for phase shifter 1510. Alternatively, in some implementations, each of the phase shifters 1508 and 1510 can be implemented as a non-differential phase shifter with just one phase shifting element in a single arm. The differential implementations shown in FIG. 15 has several advantages over a non-differential implementations. For example, the differential implementation has an advantage of requiring a smaller range per phase shifter. Furthermore, for a thermo-optic phase shifter, a differential phase shifter has half the worst-case power consumption as compared to a single phase shifter, and also has the benefit of constant total power consumption, which mitigates thermal transients. For purposes of this disclosure, a differential phase shifter (e.g., phase shifter 1508) is considered as one phase shifter, with the understanding that it is implemented with two phase shifters (e.g., phase shifting elements 1508a and 1508b) but one control signal (e.g., $\varphi_1$, 1512).

With this structure, the demultiplexer 1500 can be represented as a matrix D (using the Mueller notation for polarization).

$$D = \begin{bmatrix} j\sin\frac{\phi_2}{2} & j\cos\frac{\phi_2}{2} \\ j\cos\frac{\phi_2}{2} & -j\sin\frac{\phi_2}{2} \end{bmatrix} \begin{bmatrix} e^{\frac{j\phi_1}{2}} & 0 \\ 0 & e^{\frac{-j\phi_1}{2}} \end{bmatrix}$$

However, as mentioned above, a major issue with the configuration of demultiplexer 1500 in FIG. 15 is that the demultiplexing requires an infinite range of phase shifts for $\varphi_1$ (1512) in order to achieve the "endless" property. In practical systems, this means that as the demultiplexer 1500 demultiplexes signals received through a randomly changing fiber, the phase shift control $\varphi_1$ (1512) will eventually reach an end of its practical range. For example, if the phase shifters 1508 and 1510 are implemented as thermo-optic phase shifters, then there is a practical limit on the amount of input current. If the randomly drifting phase caused by the channel F requires that $\varphi_1$ continuously increase, then at some point, due to the input limitations on $\varphi_1$, the phase shifter 1508 must be reduced by $2\pi$ (so-called "reset"). However, during this reset, the reception of signals must be interrupted, resulting in possible loss of data and a potentially significant error burst in high-rate communications.

To address this problem, a demultiplexer can implement more than two stages of phase shifters. However, a greater number of phase shifting stages (for the lossless scenario using a unitary demultiplexer) increases the algorithmic and control complexity and reduces the speed of controlling the numerous phase shifting variables. Furthermore, it can be difficult to guarantee that the phase-shifting control does not get "trapped" in a particular state during its operation (and being unable to exit the trapped state without a phase shifter exceeding its limits), for an arbitrary input. In addition, higher-complexity control systems may face increased risk of converging to a local state which is not a desirable (e.g., suboptimal) multiplexing operation. Because of this complexity and uncertainty, designing dual-polarized IMDD systems can be challenging.

Furthermore, if polarization dependent loss (PDL) is present, then this can compound the challenges. PDL refers to two orthogonal polarizations being attenuated differently, resulting in a non-unitary channel matrix F. Although PDL is sometimes negligible in fibers, PDL can be significant in discrete devices such as amplifiers and wavelength division multiplexers. Designing non-unitary optical demultiplexers is challenging. In general, a non-unitary demultiplexer can be characterized by four real numbers, with the theoretical minimum control set consisting of two optical phase shifters and two optical attenuators.

Implementations are disclosed herein that achieve an "endless" property of optical MIMO polarization demultiplexing using just three stages of finite-range phase shifting, for the lossless scenario of no PDL, an example of which is described with reference to FIG. 16, below. In addition, for the scenario of PDL, implementations are disclosed herein that achieves the "endless" property using just three stages of finite-range phase shifting and two stages of optical attenuation, an example of which is described with reference to FIG. 17, below.

Figure 16:
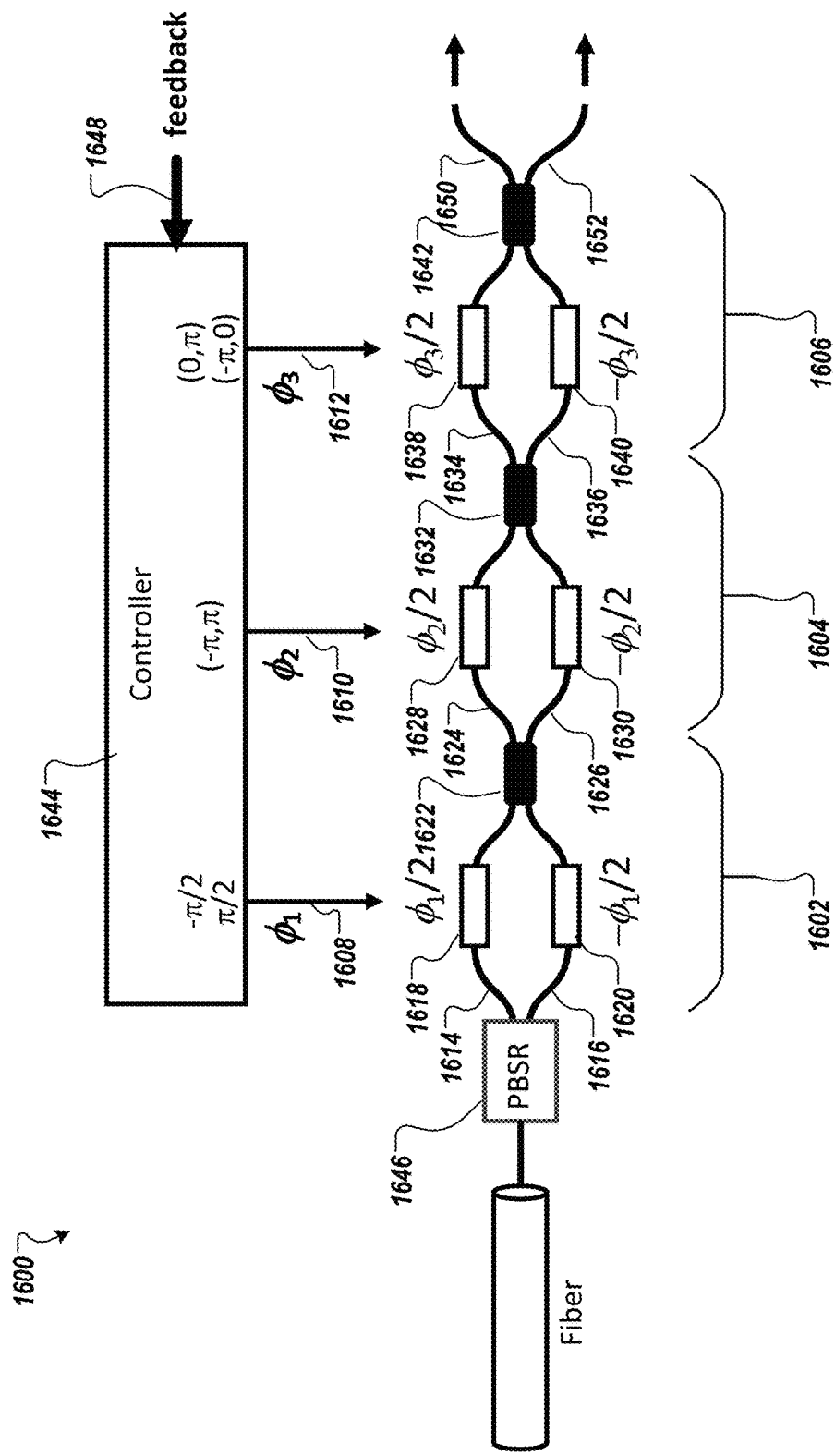
FIG. 16 illustrates an example of an optical polarization demultiplexer with three phase-shift control signals, according to implementations of the present disclosure.

FIG. 16 illustrates an example optical polarization demultiplexer 1600 according to implementations of the present disclosure. The demultiplexer 1600 can be implemented as part of a direct detection receiver (e.g., receiver 1468 in FIG. 14B). In some implementations, demultiplexer 1600 is implemented via integrated photonics which can reduce cost compared to bulk optics.

The demultiplexer 1600 includes three stages (1602, 1604, and 1606) of phase shifting. Each stage is controlled by a phase shift control signal. For example, the first stage 1602 is controlled by a first control signal 1608, the second stage 1604 is controlled by a second control signal 1610, and the third stage 1606 is controlled by a third control signal 1612. Each control signal controls the amount of phase shift that is implemented in the respective phase shifting stage.

In the example of FIG. 16, each stage has a phase shifter and a 2×2 coupler that operate on a pair of optical transmission paths. For example, the first stage 1602 has pair of transmission paths 1614 and 1616, optical phase shifting elements 1618 and 1620 (together forming a differential phase shifter), and a 2×2 coupler 1622. Similarly, the second stage 1604 has a pair of transmission paths 1624 and 1626, optical phase shifting elements 1628 and 1630 (together forming a differential phase shifter), and a 2×2 coupler 1632. Finally, the third stage 1606 has a pair of transmission paths 1634 and 1636, optical phase shifting elements 1638 and 1640 (together forming a differential phase shifter), and a 2×2 coupler 1642.

Although the example of FIG. 16 shows differential implementations of phase shifters, some implementations may use non-differential implementations with just one optical phase shifting element (in one transmission path) in a stage. Throughout this disclosure, the phase difference between the two optical transmission paths (in a stage) is referred to simply as "$\varphi$," regardless of whether the phase shift is implemented by a differential phase shifter (i.e., each phase shifting element in the differential pair designed to shift by +/−$\varphi$/2, as shown in the example of FIG. 16) or implemented by a non-differential phase shifter (which shifts the phase of light in just one transmission path by an amount +/−$\varphi$ relative to light in the other transmission path). As such, the term "phase shifter" can apply to a differential phase shifter or to a non-differential phase shifter.

The phase shifters can be thermo-optic (thermo-optic phase shifter, TOPS), electro-optic (electro-optic phase shifter, EOPS), or other types. The TOPS generally have the slowest response time but can be sped up by covering with metal and/or shortening the distance to the heat sink. The power consumption of the TOPS can be reduced by having the optical transmission path pass through the heated region multiple times. The EOPS can operate on, for example, current injection, carrier depletion, or the Pockels effect. Each phase shifter could consist of multiple sections, such as a section with a phase shifter type that has a fast response time but more power consumption and a section with a phase shifter type that has a slow response time but reduced power consumption.

The 2×2 couplers can be, for example, implemented by directional couplers, multi-mode interference couplers, or adiabatic couplers.

As mentioned above, the three stages (1602, 1604, 1606) of demultiplexer 1600 are controlled within specific ranges or values of operations in a coordinated manner, so as to ensure that the demultiplexer 1600 can achieve an "endless" property of demultiplexing without requiring a reset of any of the phase shifters. In particular, in the example of FIG. 16, the first control signal $\varphi_1$ for the first stage 1602 is digital, with a value of either $-\pi/2$ or $+\pi/2$. The second control signal $\varphi_2$ for the second stage 1604 can be analog or digital, operating over a continuous or discrete set of values between $-\pi$ and $+\pi$. The third control signal $\varphi_3$ for the third stage 1606 can be analog or digital, operating over a continuous or discrete set of values within a range that depends on the first control signal $\varphi_1$, namely operating between 0 and $+\pi$ when $\varphi_1$ is $-\pi/2$ and operating between $-\pi$ and 0 when $\varphi_1$ is $+\pi/2$.

During operation of the demultiplexer 1600, light that has traveled through a fiber first enters the splitter, such as PBSR 1646, which splits the input light into the two optical transmission paths 1614 and 1616. The PBSR splits the input light into two polarizations and rotates one of the polarizations so that both outputs of the PBSR are in the same polarization. Thus, although path 1614 contains light that was in one polarization when it entered the PBSR and path 1616 contains light that was in the orthogonal polarization when it entered the PBSR, once in paths 1614 and 1616, the light in both paths 1614 and 1616 are in the same polarization. Although the example of FIG. 16 shows the splitter implemented by PBSR 1646, other types of splitters can be used, including passive photonic integrated devices such as a polarization splitting grating coupler (PSGC).

The split input light enters the two optical transmission paths 1614 and 1616 of the first stage 1602, and undergo relative phase shifts through phase shifting elements 1618 and 1620, such that light in one optical transmission path is phase-shifted by an amount $\varphi_1$ relative to light in the other optical transmission path. The amount of this relative phase shift $\varphi_1$ is controlled by the control signal 1608. The phase-shifted light in the two optical transmission paths then enter a 2×2 coupler 1622 which combines the relative phase-shifted light. This process repeats through the second stage 1604 and the third stage 1606, undergoing different phase shifts controlled by control signals $\varphi_2$ (1610) and $\varphi_3$ (1612).

A controller 1644 controls the amount of relative phase shift in the three stages 1602, 1604, and 1606 via the control signals 1608, 1610, and 1612. In scenarios of closed-loop feedback, this control can be based on feedback information 1648. For example, in implementations where the controller receives feedback from a Stokes measurement apparatus (as described with reference to FIGS. 1A to 13, above), the feedback 1648 can be measurements of Stokes parameters, in which case the controller 1644 can implement the control techniques that were described with reference to FIG. 9, above, to adjust control signals 1608, 1610, and 1612. In other implementations, progressive search techniques can be used by the controller 1644 for controlling signals 1608, 1610, and 1612, which will be described with reference to FIGS. 21 to 23, below. Although FIG. 16 shows the controller 1644 as part of the demultiplexer 1600, in some implementations, the controller 1644 may be implemented separately in a receiver (as another component in receiver 1468 of FIG. 14B).

As discussed above, demultiplexer 1600 compensates for random birefringence changes which rotate the polarizations of light, caused by distortions introduced by the optical communication system. In addition to compensating for phase shifts, a demultiplexer can also be designed to compensate for other non-idealities, such as polarization dependent loss (PDL). While PDL may be negligible in most short fiber-optic links, as the length of the fiber increases, PDL can have a more substantial impact on proper reception of the optical signals.

In scenarios of polarization dependent loss (PDL), the amount of loss experienced in each of the two polarization modes of light may be different, e.g., the loss in the transverse magnetic (TM) mode may be greater/smaller than the loss in transverse electric (TE) mode. This results in a channel matrix F which is non-unitary. In this case, demultiplexing with phase shift controls alone may be insufficient to fully separate the signals which have been mixed in the two polarization modes of light. Instead, a combination of optical phase shifters and optical attenuators are implemented in the demultiplexer, as described with reference to FIG. 17, below. In general, PDL may be caused by the fiber line itself, or by other elements of the communication system, such as fiber connectors, isolators, amplifiers, splitters, fiber couplers, or PBSRs.

Figure 17:
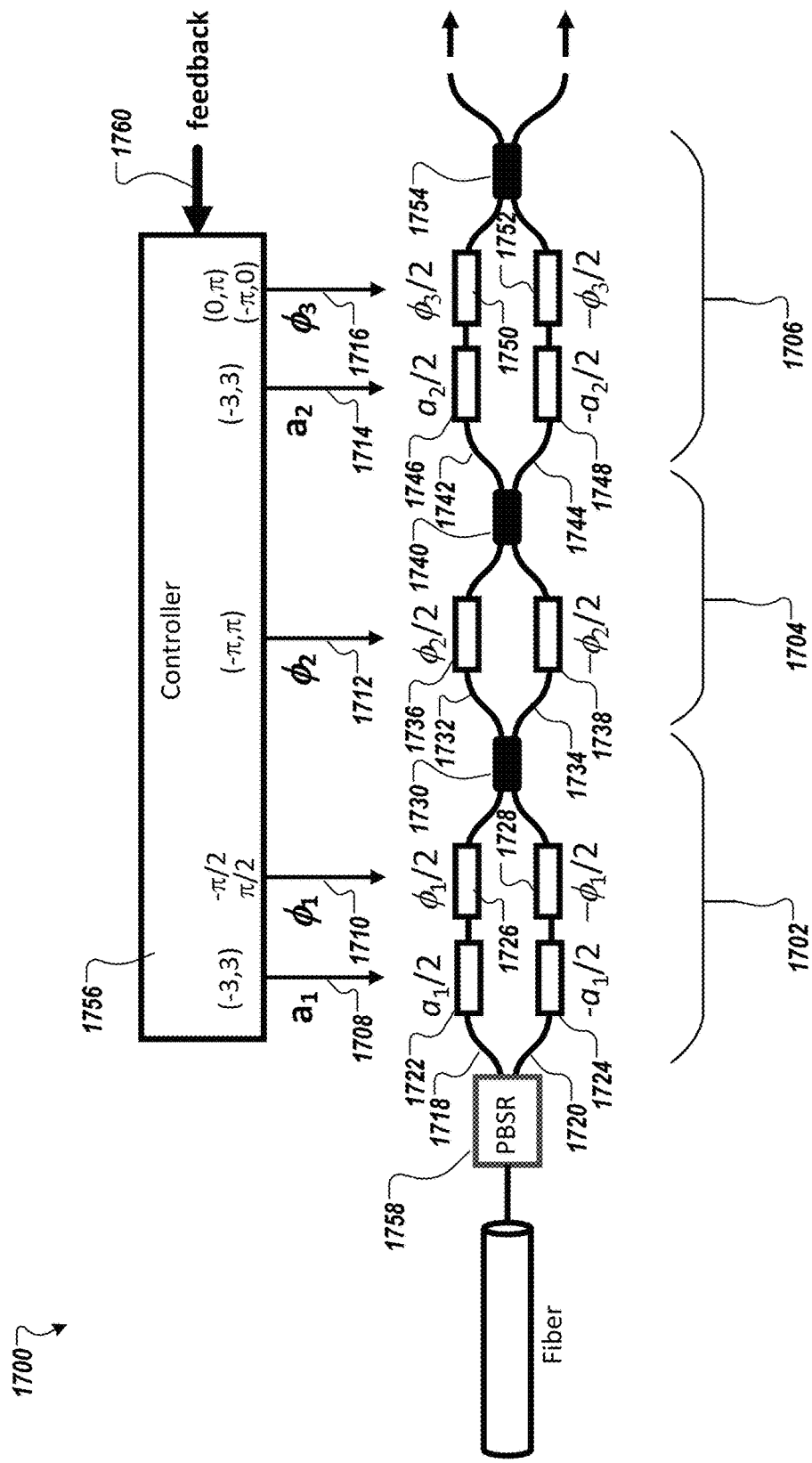
FIG. 17 illustrates an example of an optical polarization demultiplexer with three phase-shift control signals and two VOA control signals, according to implementations of the present disclosure.

FIG. 17 illustrates an example optical polarization demultiplexer 1700 according to implementations of the present disclosure. The demultiplexer 1700 can be implemented as part of a direct detection receiver (e.g., receiver 1468 in FIG. 14B). In some implementations, demultiplexer 1700 is implemented via integrated photonics which can reduce cost compared to bulk optics. The demultiplexer 1700 provides both relative attenuation control and relative phase shift control between the two polarization modes of light, to compensate for PDL in the received optical waveform.

Demultiplexer 1700 includes three stages (1702, 1704, and 1706) of relative phase shift control and/or optical attenuation control. Each stage is controlled by one or more control signals. For example, the first stage 1702 is controlled by a first attenuation control signal 1708 and a first phase shift control signal 1710. The second stage 1704 is controlled by a second phase shift control signal 1712. The third stage 1706 is controlled by a second attenuation control signal 1714 and a third phase shift control signal 1716. Each control signal controls the amount of phase shift or optical attenuation that is implemented in the respective stage.

In the example of FIG. 17, the first stage 1702 has first and second optical transmission paths 1718 and 1720, first and second optical attenuators 1722 and 1724 (together forming a differential attenuator), first and second phase shifting elements 1726 and 1728 (together forming a differential phase shifter), and a 2×2 coupler 1730. The second stage 1704 has first and second optical transmission paths 1732 and 1734, first and second phase shifting elements 1736 and 1738 (together forming a differential phase shifter), and a 2×2 coupler 1740. Finally, the third stage 1706 has first and second optical transmission paths 1742 and 1744, first and second optical attenuators 1746 and 1748 (together forming a differential attenuator), first and second phase shifting elements 1750 and 1752 (together forming a differential phase shifter), and a 2×2 coupler 1754.

Although the example of FIG. 17 shows differential implementations of the optical attenuators and optical phase shifters, some implementations may use non-differential implementations with just one optical attenuator (in one optical transmission path) and one phase shifting element (in one optical transmission path) in a stage. Throughout this disclosure, the relative optical attenuation between the two optical transmission paths is referred to simply as "a," regardless of whether the attenuation is implemented by a differential attenuator (i.e., each attenuator in the differential pair designed to attenuate light by $+/-a/2$, as shown in the example of FIG. 17) or implemented by a single optical attenuator (which attenuates light in just one optical transmission path by an amount +/− a relative to light in the other optical transmission path). The attenuation "a" for an optical attenuator represents any suitable measure of attenuation, such as exponential loss where the actual effect on transmission of light is exponential in "a" (e.g., the field is multiplied by $\exp\{-a/2\}$ when passing through an optical attenuator marked a/2, just as the field is multiplied by $\exp\{-i\phi/2\}$ when passing through a phase shifter marked $\phi/2$.).

Similarly, the relative phase difference between the two optical transmission paths is referred to simply as "$\phi$," regardless of whether the relative phase shift is implemented by a differential phase shifter (i.e., each phase shifting element in the differential pair designed to shift by $+/-\phi/2$, as shown in the example of FIG. 3) or implemented by a non-differential phase shifter (which shifts the phase of light in just one optical transmission path by an amount $+/-\phi$ relative to light in the other optical transmission path).

As mentioned above, the three stages of demultiplexer 1700 are controlled within specific ranges or values of operations in a coordinated way, so as to ensure that the demultiplexer 1700 can achieve an "endless" property of demultiplexing without requiring a reset of any of the phase shifters. For the phase shift control, in the example of FIG. 17, the first phase shift control signal $\varphi_1$ (1710) for the first stage 1702 is digital, with a value of either $-\pi/2$ or $+\pi/2$. The second phase shift control signal $\varphi_2$ (1712) for the second stage 1704 can be analog or digital, operating over a continuous or discrete set of values between $-\pi$ and $+\pi$. The third phase shift control signal $\varphi_3$ (1716) for the third stage 1706 can be analog or digital, operating over a continuous or discrete set of values within a range that depends on the first control signal $\varphi_1$ (1710), namely operating between 0 and $+\pi$ when $\varphi_1$ is $\pi/2$ and operating between $-\pi$ and 0 when $\varphi_1$ is $+\pi/2$. For the attenuation control, each of the first attenuation control signal $a_1$ (1708) and the second attenuation control signal $a_2$ (1714) operate over a continuous or discrete set of values within a range. For example, the range may be (−3, +3). As another example, the range may be (−1, +1). As yet another example, the range may be (−0.6, +0.6), corresponding to approximately −5.2 dB to +5.2 dB. Other suitable ranges may be used.

During operation of the demultiplexer 1700, light that has traveled through a fiber first enters the splitter, such as PBSR 1758, which splits the input light into the two optical transmission paths 1718 and 1720. Although the example of FIG. 17 shows the splitter implemented by PBSR 1758, other types of splitters can be used, including passive photonic integrated devices such as a polarization splitting grating coupler (PSGC). The split input light enters the two optical transmission paths 1718 and 1720 of the first stage 1702, and undergo relative attenuation through optical attenuators 1722 and 1724 such that light in one optical transmission path is attenuated relative to light in the other optical transmission path. The amount of this relative attenuation a1 is controlled by the attenuation control signal 1708.

The relatively-attenuated light in the two optical transmission paths then undergo relative phase shifts through phase shifting elements 1726 and 1728 (forming a differential phase shifter), such that the phase of light in one optical transmission path is shifted relative to the phase of light in the other optical transmission path. The amount of this relative phase shift $\varphi_1$ is controlled by the control signal 1710. The phase-shifted light in the two optical transmission paths then enter a 2×2 coupler 1730 which combine the relative phase-shifted light. This process continues through the second stage 1704 and the third stage 1706, so that the two polarizations of light undergo relative phase shifts and/or relative attenuations controlled by phase control signals 1712 and 1716 and the attenuation control signal 1714.

A controller 1756 controls the amount of relative attenuation and relative phase shift the different stages 1702, 1704, and 1706 via the control signals 1708, 1710, 1712, 1714, and 1716. By controlling both the relative attenuation and the relative phase shift between the two polarizations of light, demultiplexer 1700 is able to compensate for both random phase shifts as well as PDL (non-unitary channel matrix F). In scenarios of closed-loop feedback, this control can be based on feedback information 1760 which can be, for example, a measurement of an error in the received signal. For example, in implementations where the controller receives feedback from a Stokes measurement apparatus (as described with reference to FIGS. 1A to 13, above), the feedback 1760 can be based on measurements of Stokes parameters, such as linear polarization crosstalk (correlation coefficient between X and Y) or constellation geometry distortion. The specific algorithms that are used by the controller 1756 for controlling and coordinating the control signals 1708, 1710, 1712, 1714, and 1716 will be described with reference to FIGS. 21 to 23, below. Although FIG. 17 shows the controller 1756 as part of the demultiplexer 1700, in some implementations, the controller 1756 may be implemented separately in a receiver (as another component in receiver 1468 of FIG. 14B).

In general, the control (e.g., by controller 1644 in FIG. 16 or 1756 in FIG. 17) is designed to reduce the amount of crosstalk between signals that are received in the two polarization modes of an optical waveform. In the scenario of feedback control, the controller can adapt the controls based on feedback information (e.g., feedback 1648 in FIG. 16 and feedback 1760 in FIG. 17). The feedback information may include, for example, a measurement of errors in the received waveform. The controller can be designed to adapt the control signals to reduce the measured error. The measurement of errors can be implemented in various ways. As an example, the measurement of error can reflect the amount of crosstalk between signals in the two polarization modes of light.

To measure of the amount of crosstalk, in some implementations, the communication system may utilize reference signals (e.g., pilot tones or pilot signals) which are transmitted in addition to the signals carrying information. The reference signals have waveform properties which are known to both the transmitter and receiver, and allow the receiver to estimate and compensate for the random effects of the communication channel.

Figure 18A:
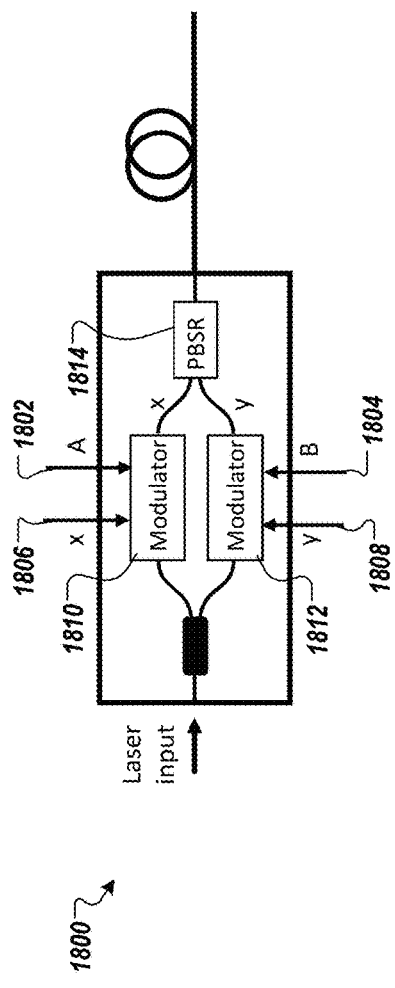
FIGS. 18A and 18B illustrate examples of transmitters configured to transmit reference signals (e.g., pilot tones)
Figure 18B:
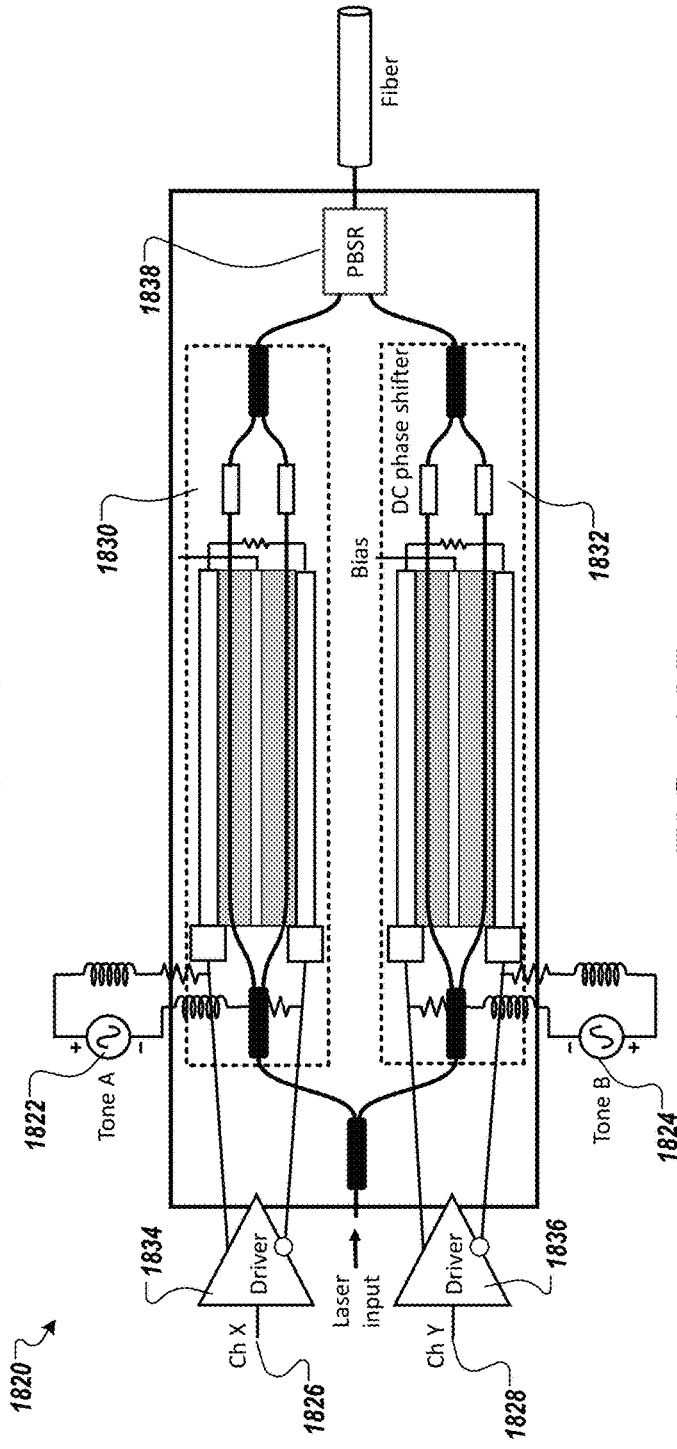

FIGS. 18A and 18B illustrate examples of transmitters 1800 and 1820 configured to transmit reference signals (e.g., pilot tones), according to implementations of the present disclosure. Transmitter 1800 of FIG. 18A transmits pilot tones 1802 (A) and 1804 (B) in respective optical polarization modes the laser input. In some implementations, pilot tones 1802 and 1804 are low-frequency tones, and can have different tone frequencies for the two polarizations. For example, the first pilot tone 1802 can be transmitted at a 1-MHz frequency, and the second pilot tone 1804 can be transmitted at a 2-MHz frequency. The modulation depths of the pilot tones 1802 and 1804 are a fraction of the signal average power, for example, the modulation depth of the pilot tones 1802 and 1804 can be 2% of the signal average power.

In the example of FIG. 18A, the pilot tones 1802 (A) and 1804 (B) are added to the electronic signals 1806 (X) and 1808 (Y), respectively, prior to modulating the laser input in each waveguide. For example, the pilot tones 1802 (A) and 1804 (B) can be applied by adding the tones digitally to digital-to-analog converter (DAC) outputs. Alternatively, the pilot tones 1802 (A) and 1804 (B) can be applied by adding them in an analog manner to the input of drivers of modulators 1810 and 1812, or internal to the drivers of modulators 1810 and 1812, or to the output of the drivers of modulators 1810 and 1812.

FIG. 18B illustrates an example transmitter 1820 showing further details of the modulation and pilot tones. In this example, pilot tones 1822 (A) and 1824 (B) are applied by adding them to the modulation signals 1826 (X) and 1828 (Y), respectively, in an analog manner at the output of drivers 1834 and 1836 of modulators 1830 and 1832, respectively. In the example of FIG. 18B, the modulators 1830 and 1832 are shown implemented as Mach-Zehnder interferometer (MZI) modulators, but other suitable optical modulators may be used.

Thus, in transmitters 1800 and 1820 of FIGS. 18A and 18B, the pilot tones A and B are added to the input signals X and Y, respectively, and combined in the PBSR 1814 and 1838 for transmission over the fiber. In particular, pilot tone A and signal X are transmitted in one polarization mode of light, while pilot tone B and signal Y are transmitted in the other polarization mode of light. The combined optical PDM waveform propagates through the communication system towards the receiver, during which time various non-idealities in the system cause random and unpredictable rotational drifting of the two polarizations modes, as well as polarization-dependent loss (PDL). These non-idealities affect both the pilot tone and the signal that propagate in each polarization mode. Since the pilot tones (A and B) are known, the receiver can measure the deviation (or error) of the received pilot tones as compared to the original pilot tones (A and B), and this provides the receiver with an estimate of the error in the signals X and Y themselves. Then, based on error estimates, the receiver is able to compensate for polarization drift and PDL, and more accurately recover the signals X and Y.

Examples of receiver structures for detecting pilot tones and measuring error in received pilot tones are discussed with reference to FIGS. 19, 20A, and 20B, below. Examples of using such error measurements in feedback control of relative phase shifts and/or relative attenuation are discussed with reference to FIGS. 22 and 23, below.

Figure 19:
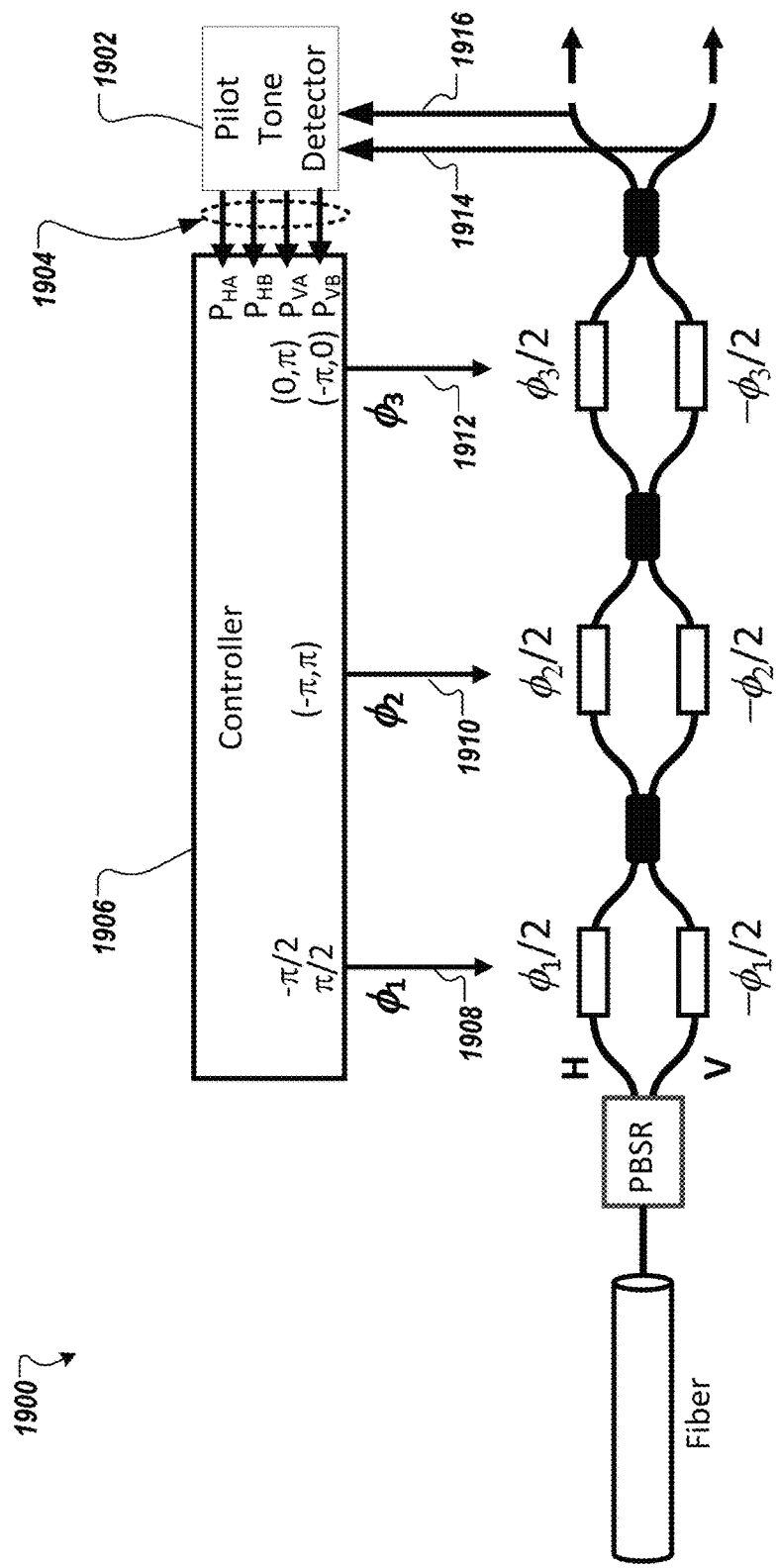

FIG. 19 illustrates an example demultiplexer 1900 configured to receive pilot tones to generate feedback information, according to implementations of the present disclosure. At the receiver 1900, the received waveforms 1914 and 1916 in the two polarizations of received light processed by a pilot tone detector 1902 to detect the power of the received pilot tones in each polarization mode 1914 and 1916. The pilot tone detector 1902 then provides one or more pilot tone measurements 1904 to the controller 1906 as feedback information (e.g., as feedback 1648 in FIG. 16 and feedback 1760 in FIG. 17). The controller 1906 uses these pilot tone measurements 1904 to adapt the control signals (1908, 1910, 1912) which apply relative phase shifts and/or relative attenuations to the received optical signal.

Although FIG. 19 shows the controller 1906 and pilot tone detector 1902 as part of the demultiplexer 1900, in some implementations, the controller 1906 and/or pilot tone detector 1902 can be implemented separately in a receiver (as another component in receiver 1468 of FIG. 14B).

Furthermore, although FIG. 19 shows controller 1906 and pilot tone detector 1902 as separate modules, in some implementations, the controller 1906 and pilot tone detector 1902 may be implemented by integrated circuitry without being separated into distinct modules. Furthermore, although the example of FIG. 19 shows a scenario of only adapting relative phase shifts via control signals 1908, 1910, and 1912 (e.g., as in the demultiplexer 1600 of FIG. 16), these techniques can also be applied to adapt both relative phase shifts and relative attenuation (e.g., as in the demultiplexer 1700 of FIG. 17).

In example of FIG. 19, it is assumed that a first pilot tone (A) was transmitted in a first polarization mode (referred to as X), while a second pilot tone (B) was transmitted in a second polarization mode (referred to as Y). At the receiver, it is desired that the received polarization modes (H and V) satisfy H=X and V=Y. However, as the optical waveform travels through a communication system, the two polarizations modes carrying the two pilot tones (A and B) can undergo random and unpredictable rotations, due to polarization drifting and PDL. Therefore, upon receiving these randomly rotated polarization modes, when the demultiplexer 1900 attempts to detect the pilot tones A and B, the demultiplexer 1900 could actually detect a cross-mixture of the pilot tones A and B in each polarization modes H and V.

To estimate the impact of this cross-mixing, the receiver can detect the power of each pilot tone (A and B) in each of the two polarization modes (H and V). For example, in FIG. 19, the pilot tone detector 1902 can detects four different quantities: the power of tone A in polarization mode H (referred to as $P_{HA}$), the power of tone B in polarization mode H (referred to as $P_{HB}$) and power of tone A in polarization mode V (referred to as $P_{VA}$), and the power of tone B in polarization mode V (referred to as $P_{VB}$). Among these four quantities, $P_{HB}$ and $P_{VA}$ represent the amount of cross-talk between the pilot tones A and B in the two polarization modes H and V.

The controller 1910 then calculates an error signal based on these received pilot tone components, to estimate the amount of cross-talk between the two polarization modes that have been induced by non-idealities in the communication system. For example, in some implementations, the error can be calculated as:

$$e = \sqrt{\frac{P_{HB}}{P_{HA}} + \frac{P_{VA}}{P_{VB}}}$$

However, other measures of error can be used to estimate the amount of cross-talk between the pilot tones (A and B) in the two polarization modes (H and V). In general, the measure of error should increase with increasing values of $P_{HB}$ and/or $P_{VA}$. The measure of error provides an estimate of how well the controller 1906 is adapting the control signals (e.g., 1908, 1910, and 1912) to adjust the relative phase shift and/or relative attenuation between the two polarization modes H and V, to compensate for random polarization drifts and PDL. Thus, the controller 1906 can use this error measurement in a feedback control loop to dynamically adjust the control signals (e.g., 1908, 1910, and 1912) to further reduce the error. Details of example feedback algorithms are described with reference to FIGS. 22 and 23, below.

The pilot tones A and B can be detected from the received waveform at various points in the receiving process, examples of which are described with reference to FIG. 20A and FIG. 20B, below.

FIGS. 20A and 20B illustrate examples of different implementations of demultiplexers configured to receive and process pilot tones, according to implementations of the present disclosure. Specifically, FIGS. 20A and 20B illustrate examples of detecting the pilot tones (A and B) at different points in the receiving process. As discussed above, the power of each pilot tone A and B in each of the two polarization modes (H and V) should be detected. In the example demultiplexer 2000 of FIG. 20A, pilot tones (A and B) are detected from the received waveform at the output of a transimpedance amplifier (TIA) 2004 and TIA 2006. Alternatively, as shown in the example demultiplexer 2020 of FIG. 20B, pilot tones (A and B) are detected from the received waveform in the optical domain, specifically at the output of separate photodiodes 2024 and 2026 which are coupled to the received optical signals via optical couplers.

In both examples of FIGS. 20A and 20B, the various received powers of the pilot tone components can be detected, for example, by using Fourier transform techniques, such as multiplying the received signal by a sine and/or cosine at the pilot tone frequency, and summing the result or filtering the result with a narrowband electrical filter.

Next, examples of using error measurements in feedback control of relative phase shifts and/or relative attenuation are discussed with reference to FIGS. 21 to 23. The control system acts to minimize the error that is measured in the received optical waveform. When the error is minimized, then each of the PDM signals is received in a respective polarization mode (e.g., signal X is received in polarization mode H and signal Y is received in polarization mode V) with minimal crosstalk.

Figure 21:
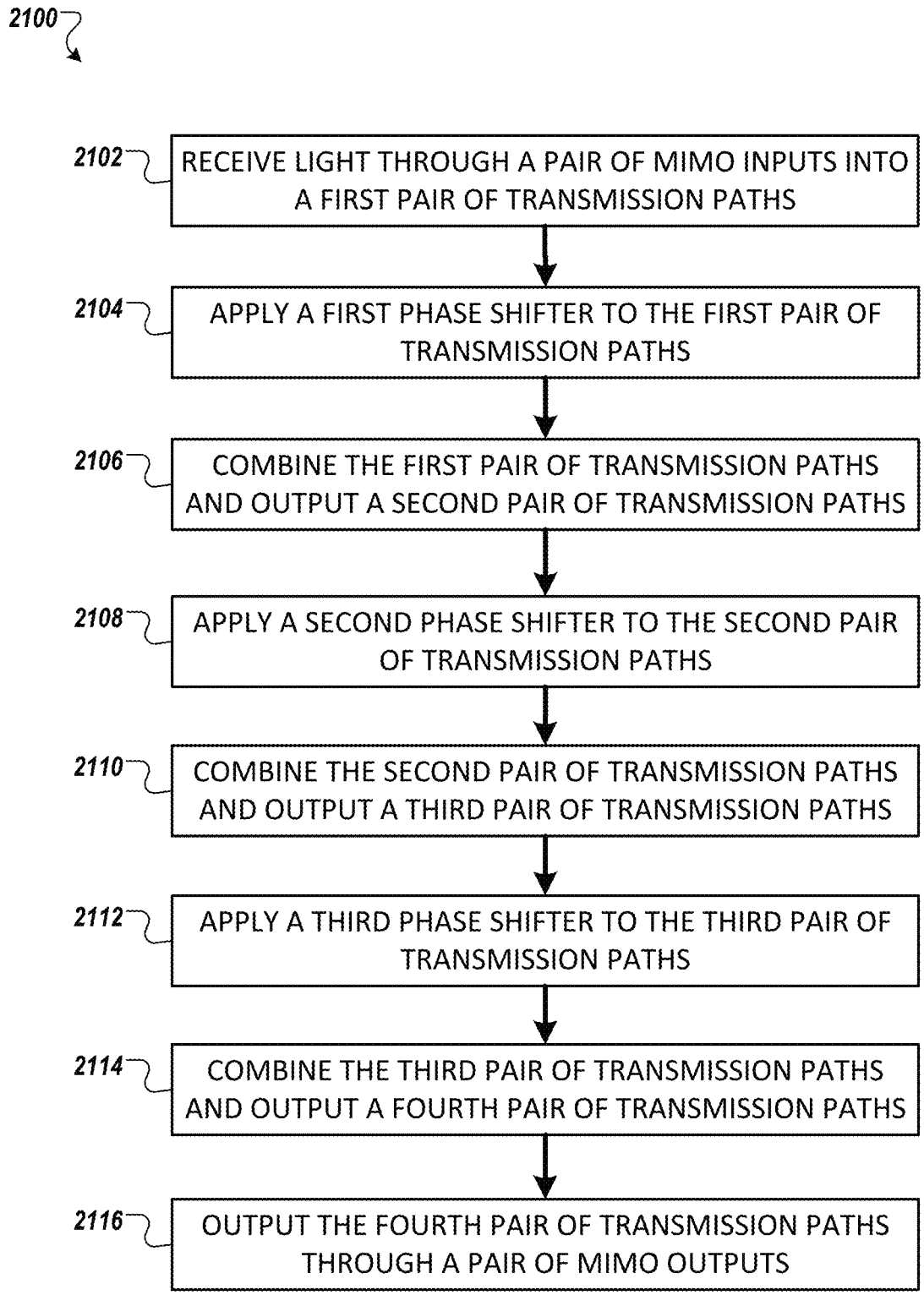
FIG. 21 is a flow chart illustrating an example of controlling an optical polarization demultiplexer, according to implementations of the present disclosure.

FIG. 21 is a flow chart illustrating an example method 2100 of controlling an optical polarization demultiplexer, according to implementations of the present disclosure. The method 2100 can be used to control relative phase shifts in demultiplexer, such as demultiplexer 1600 of FIG. 16.

In step 2102, light is received through a pair of MIMO inputs into a first pair of optical transmission paths (e.g., 1614, 1616 of FIG. 16). In step 2104, a first optical phase shifter (e.g., the differential phase shifter formed by 1618 and 1620 of FIG. 16) is controlled to apply a first relative phase shift between the first pair of optical transmission paths (e.g., 1614, 1616 of FIG. 16). In some implementations, the first optical phase shifter can be controlled in a binary manner, for example with values $(c+\pi/2)$ and $(c-\pi/2)$, where "c" is a real number reflecting an offset. This control can be based on feedback information (e.g., using pilot tones).

In step 2106, the first pair of optical transmission paths (e.g., 1614, 1616 of FIG. 16) is combined with a first 2×2 optical coupler (e.g., 1622 of FIG. 16) to output a second pair of optical transmission paths (e.g., 1624, 1626 of FIG. 16).

In step 2108, a second optical phase shifter (e.g., the differential phase shifter formed by 1628 and 1630 of FIG. 16) is controlled to apply a second relative phase shift between the second pair of optical transmission paths (e.g., 1624, 1626 of FIG. 16). In some implementations, the second optical phase shifter can be controlled within a finite range of values that includes $-n\pi$ and $+n\pi$, where "n" is an integer. For example, this can be by analog operation within a range $(-n\pi, +n\pi)$. This control can be based on feedback information (e.g., using pilot tones).

In step 2110, the second pair of optical transmission paths (e.g., 1624, 1626 of FIG. 16) is combined with a second 2×2 optical coupler (e.g., 1632 of FIG. 16) to output a third pair of optical transmission paths (e.g., 1634, 1636 of FIG. 16).

In step 2112, a third optical phase shifter (e.g., the differential phase shifter formed by 1638 and 1640 of FIG. 16) is controlled to apply a third relative phase shift between the third pair of optical transmission paths (e.g., 1634, 1636 of FIG. 16). In some implementations, the third optical phase shifter can be controlled within a finite range that depends on the value of the first relative phase shift. For example, as described above, the third optical phase shifter can be controlled to operate between 0 and $+n\pi$ if the first relative phase shift is equal to $(c-\pi/2)$, and to operate between $-n\pi$ and 0 if the first relative phase shift is equal to $(c+\pi/2)$, where "n" is an integer. This can be done by analog operation within the ranges $(0, +n\pi)$ and $(-n\pi, 0)$. This control can be based on feedback information (e.g., using pilot tones).

In step 2114, the third pair of optical transmission paths (e.g., 1634, 1636 of FIG. 16) is combined with a third 2×2 optical coupler (e.g., 1642 of FIG. 16) to output a fourth pair of optical transmission paths (350, 352). In step 2116, the fourth pair of optical transmission paths (e.g., 1650, 1652) is then output through a pair of MIMO outputs.

Although the example method 2100 in FIG. 21 shows a specific ordering of steps, one or more of these steps can be performed in a different order. For example, the control of the first, second, and third optical phase shifters can be performed in a different order. A specific example of controlling and coordinating the three phase shifters is described with reference to FIG. 22.

Figure 22:
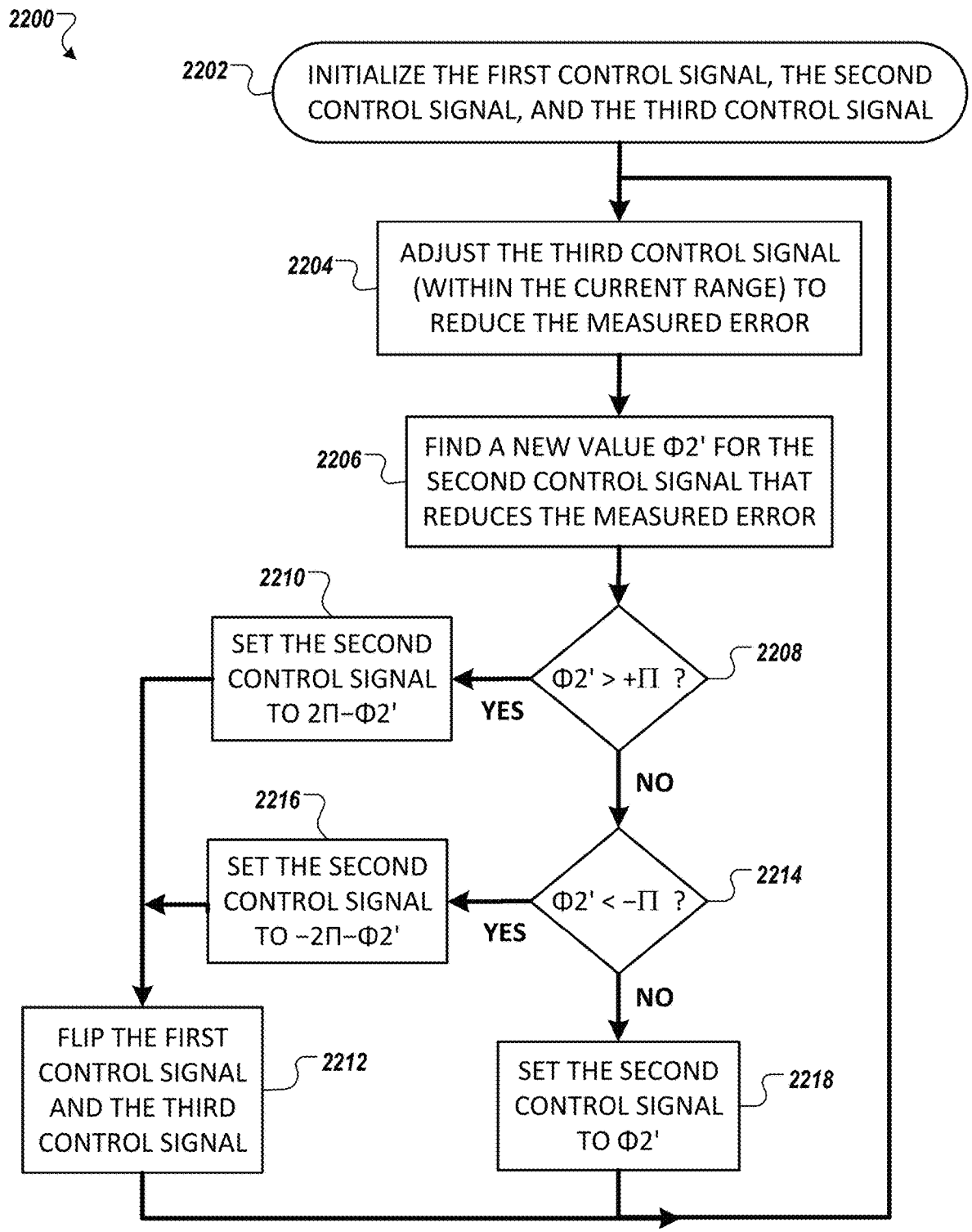
FIG. 22 is a flow chart illustrating an example of controlling relative phase shift values in an optical polarization demultiplexer, according to implementations of the present disclosure.

FIG. 22 is a flow chart illustrating an example method 2200 of controlling relative phase shift values in an optical polarization demultiplexer, according to implementations of the present disclosure. The method 2200 shows a particular way of coordinating the first, second, and third phase shifters to achieve an "endless" property of optical MIMO polarization demultiplexing using just the three stages of finite-range phase shifting (for the lossless scenario of no PDL). For purposes of illustration, the description of method 2200 will be provided with reference to demultiplexer 1600 of FIG. 16.

The method 2200 is an iterative process that adapts the relative phase shift control signals 1608, 1610, and 1612 to gradually reduce the measured feedback error (e.g., feedback 1648 in FIG. 16, or feedback 1904 in FIG. 19). For example, in implementations where the controller receives feedback from a Stokes measurement apparatus (as described with reference to FIGS. 1A to 13, above), the feedback 1648 can be based on measurements of Stoke parameters, such as linear polarization crosstalk (correlation coefficient between X and Y) or constellation geometry distortion.

In step 2202, at the beginning of the iterations, the demultiplexer initializes the relative phase shift values of the three control signals 1608, 1610, and 1612. For example, in some implementations, the first control signal $\varphi_1$ (1608) is a binary (digital) value, initially set to either $-\pi/2$ or $+\pi/2$. The second control signal $\varphi_2$ (1610) is a continuous (analog) or discrete (digital) value, initially set to a value somewhere between $-\pi$ and $+\pi$. The third control signal $\varphi_3$ (1612) is also a continuous (analog) or discrete (digital) value, and is either set to a value somewhere between 0 and $+\pi$ if the first control signal $\varphi_1$ (1608) was set to $-\pi/2$, and otherwise the third control signal $\varphi_3$ (1612) is set to a value somewhere between $-\pi$ and 0 if the first control signal $\varphi_1$ (1608) was set to $+\pi/2$. This relationship between the third control signal $\varphi_3$ (1612) and the first control signal $\varphi_1$ (1608) is maintained throughout the control process of method 2200.

In step 2204, the third control signal $\varphi_3$ (1612) is adjusted (within its current range) to reduce the measured error in the feedback (e.g., feedback 1648 of FIG. 16). The adjustment of the third control signal $\varphi_3$ (1612) can be performed by an optimization or pseudo-optimization algorithm (e.g., a gradient descent algorithm) that seeks to minimize or reduce the measured error. For example, the adjustment of the third control signal $\varphi_3$ (1612) can be performed by searching within a local neighborhood of the current value of third control signal $\varphi_3$ (1612) to find a new value that reduces the measured error. As a specific example, a description will be given in which the third control signal $\varphi_3$ (1612) is adjusted in steps of $+/-\Delta\varphi_3$ to find a value that reduces measured error. The step size $\Delta\varphi_3$ can be dynamically adjusted in each iteration. If the value of the third control $\varphi_3$ (1612) is within $\Delta\varphi_3$ of the end of its range (i.e., within $\Delta\varphi_3$ of either 0, $+\pi$, or $-\pi$), then the third control signal $\varphi_3$ (1612) is not changed. Otherwise, the third control signal $\varphi_3$ (1612) is first increased by $\Delta\varphi_3$ and the resulting error in feedback 1648 is measured. Then, the third control signal $f_3$ (1612) is decreased by $2\Delta\varphi_3$ (i.e., decreased by $\Delta\varphi_3$ from the original value) and the resulting error in feedback 1648 is again measured. The value of the third control signal $\varphi_3$ (1612) that resulted in the lower error is assigned as the new, adjusted value of the third control signal $\varphi_3$ (1612).

In step 2206, the second control signal $\varphi_2$ (1610) is adjusted to reduce the measured error. The adjustment of the second control signal $\varphi_2$ (1610) can be performed by an optimization or pseudo-optimization algorithm (e.g., a gradient descent algorithm) that seeks to minimize or reduce the measured error. For example, the adjustment of the second control signal $\varphi_2$ (1610) can be performed by searching within a local neighborhood of the current value of second control signal $\varphi_2$ (1610) to find a new value that reduces the measured error. As a specific example, a description will be given in which the second control signal $\varphi_2$ (1610) is adjusted in steps of $+/-\Delta\varphi_2$ to find a value that reduces measured error. The step size $\Delta\varphi_2$ can be dynamically adjusted in each iteration. For example, in some implementations, the step size $\Delta\varphi_2$ can be configured to increase as the value $\sin^2(\varphi_3)$ (of the third control signal 1612) becomes smaller. In the search process of step 2206, the second control signal $\varphi_2$ (1610) is first increased by $\Delta\varphi_2$ and the resulting error in feedback (1648) is measured. Then, the second control signal $\varphi_2$ (1610) is decreased by $1\Delta\varphi_2$ (i.e., decreased by $\Delta\varphi_2$ from the original value) and the resulting error in feedback (1648) is again measured. The value of the second control signal $\varphi_2$ (1610) that resulted in the lower error is denoted as $\varphi_2'$ (for purposes of this description).

In step 2208, the demultiplexer determines whether the value $\varphi_2'<-\pi$ (i.e., outside the lower limit). If so, then in step 2210, the new adjusted value of the second control signal $\varphi_2$ (1610) is set to $-2\pi-\varphi_2'$. Furthermore, in step 2212, the first control signal $\varphi_1$ (1608) and the third control signal $\varphi_3$ (1612) are flipped in values. Namely, if the value of the first control signal (1608) is $\varphi_1=-\pi/2$ (meaning that the third control signal 1612 is within a range 0 and $+\pi$), then then a value of $\pi$ is simultaneously added to the first control signal $\varphi_1$ (1608) and subtracted from the third control signal $\varphi_3$ (1612). Alternatively, if the value of the first control signal (1608) is $\varphi_1=+\pi/2$ (meaning that the third control signal 1612 is within a range $-\pi$ and 0), then a value of $\pi$ is simultaneously subtracted from the first control signal $\varphi_1$ (1608) and added to the third control signal $\varphi_3$ (1612). The control loop should pause during this simultaneous addition and subtraction. In some implementations, the simultaneous addition and subtraction of $\pi$ may be performed sequentially (e.g., adjusting the first control signal $\varphi_1$ (1608) and then adjusting the third control signal $\varphi_3$ (1612), or vice versa). Nonetheless, the procedure of adjusting the first control signal $\varphi_1$ (1608) and the third control signal $\varphi_3$ (1612) described above should be performed quickly to avoid long pauses and control lag in the control system.

If it is determined in step 2208 that $\varphi_2'$ is not outside the lower limit, then in step 2214, the demultiplexer checks whether $\varphi_2'>+\pi$ (i.e., outside the upper limit). If so, then in step 2216, the new adjusted value of the second control signal $\varphi_2$ (1610) is set to $+2\pi-\varphi_2'$. Furthermore, in step 2212 (as described above), the values of the first control signal $\varphi_1$ (1608) and the third control signal $\varphi_3$ (1612) are flipped.

If it is determined in step 2214 that $\varphi_2'$ is not outside the upper limit (meaning that $\varphi_2'$ is within the range of $-\pi$ to $+\pi$), then in step 2218, the new adjusted value of the second control signal $\varphi_2$ (1610) is set to $\varphi_2'$. In this case, the first control signal $\varphi_1$ (1608) and the third control signal $\varphi_3$ (1612) are not flipped. Then, the next iteration of adjusting the control signals is performed, returning back to step 2204.

The control process of method 2200 can achieve an "endless" operation of demultiplexing without requiring a reset or interruption of data reception. This property is enabled by the fact that when the second control signal $\varphi_2$ (1610) reaches either of end points ($+\pi$ or $-\pi$), then the second stage of phase shifting (1604 in FIG. 16) behaves as a pass-through. At this point, when the second control signal $\varphi_2$ (1610) is at an end point of its range, then $\pi$ is added or subtracted from the first control signal $\varphi_1$ (1608) and the third control signal $\varphi_3$ (1612) simultaneously (as discussed above in step 2212). Similarly, when control signal $\varphi_3$ (1612) is at an endpoint of its range, $+\pi$ or $-\pi$ is added to $\varphi_2$ (1610). As such, an "endless" operation of polarization demultiplexing can be achieved, without requiring any reset or interruptions of data reception.

Although the example method 2200 in FIG. 22 shows a specific ordering of steps, one or more of these steps can be performed in a different order. For example, steps 2208 and 2214, namely checking whether the second control signal $\varphi_2$ (1610) is within the lower and upper bounds of the range $-\pi$ to $+\pi$, can be reversed.

Furthermore, the specific ranges of values described in step 2202 can be modified. For example, the possible values of the first control signal $\varphi_1$ (1608) can have a fixed offset, so as to be a shifted binary value of $(-\pi/2+c)$ or $(+\pi/2+c)$. The possible values of the second control signal $\varphi_2$ (1610) could be shifted by integer multiples of $2\pi$, as long as the end points of the range enable the pass-through property discussed above. The possible values of the third control signal $\varphi_3$ (1612) could also be shifted by integer multiples of $2\pi$.

Figure 23:
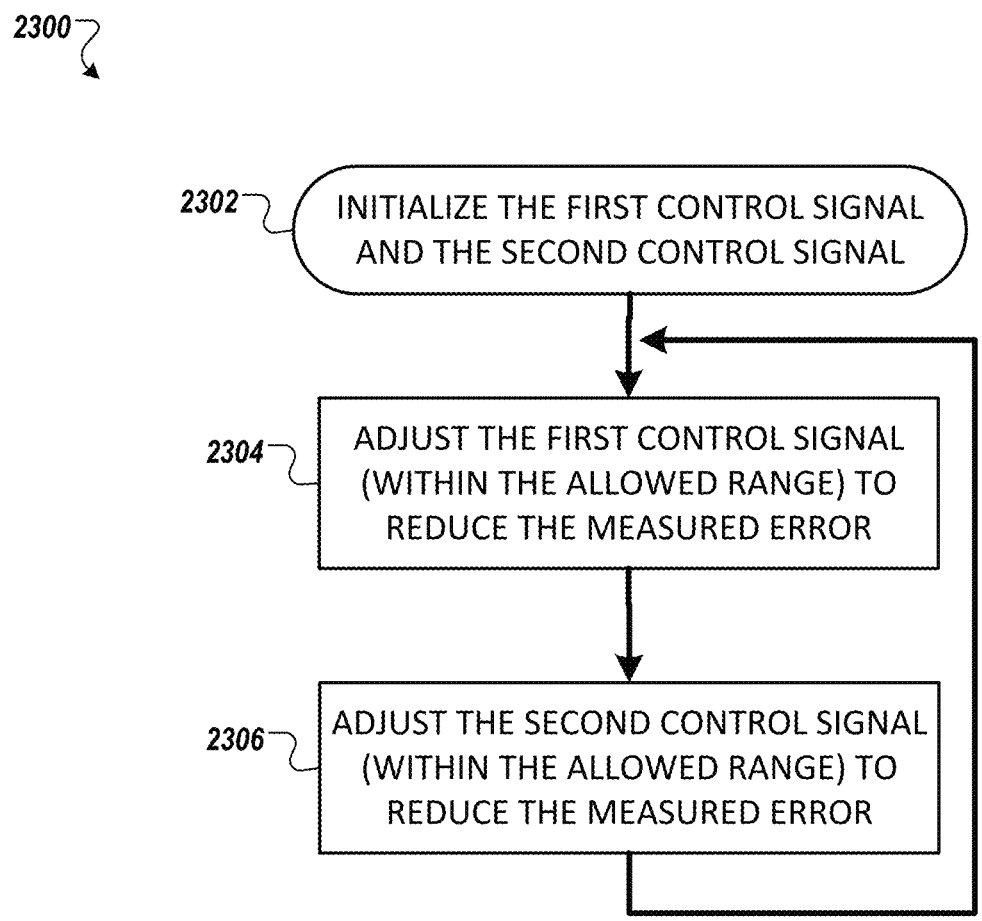
FIG. 23 is a flow chart illustrating an example of controlling relative attenuation values in an optical polarization demultiplexer, according to implementations of the present disclosure.

FIG. 23 is a flow chart illustrating an example method 2300 of controlling relative attenuation values in an optical polarization demultiplexer, according to implementations of the present disclosure. The method 2300 can be used to control relative attenuation signals, such as relative attenuation control signals $a_1$ (1708) and $a_2$ (1714) in the demultiplexer 1700 of FIG. 17. For purposes of illustration, the description of method 2300 will be provided with reference to demultiplexer 1700 of FIG. 17.

Although the example method 2300 illustrates control of both relative attenuation control signals $a_1$ (1708) and $a_2$ (1714), in some scenarios only one of the signals is implemented. For example, in some implementations, only the first control signal $a_1$ is implemented. This may be appropriate, for example, in scenarios where the PDL levels are moderate (e.g., in scenarios where the only source of PDL is in the receiver, rather than in the fiber transmission line itself). Furthermore, if the PDL values are not expected to change significantly over time, then the control value $a_1$ can be set once at the beginning of operation (e.g., in a factory), and left unchanged.

Alternatively, as shown in method 2300, both optical attenuation control signals $a_1$ and $a_2$ are can be adjusted (e.g., continuously), for example by using variable optical attenuators (VOAs). This may be appropriate, for example, in scenarios where PDL levels are more significant (e.g., in scenarios where PDL occurs in both the receiver and in the fiber transmission line).

In general, the relative attenuation signals $a_1$ (1708) and $a_2$ (1714) can be controlled using an optimization or pseudo-optimization process, designed to reduce or minimize the measured error in the feedback (e.g., feedback 1760 in FIG. 17, or feedback 1904 in FIG. 19). For example, in some implementations, the relative attenuation control signals $a_1$ (1708) and $a_2$ (1714) can be controlled simultaneously through joint optimization. As another example, which is shown in the method 2300 of FIG. 23, an iterative process can be implemented to adapt the relative attenuation control signals $a_1$ (1708) and $a_2$ (1714) to gradually reduce the measured feedback error.

In step 2302, at the beginning of the iterations, the demultiplexer initializes the two VOA control signals $a_1$ (1708) and $a_2$ (1714) to initial values, for example to zero values.

In step 2304, the first VOA control signal $a_1$ (1708) is adjusted (within its allowed range, such as −3 to +3) to reduce the measured error in the feedback. The adjustment of the first VOA control signal $a_1$ (1708) can be performed by an optimization or pseudo-optimization algorithm (e.g., a gradient descent algorithm) that seeks to minimize or reduce the measured error. For example, the adjustment of the first VOA control signal $a_1$ (1708) can be performed by searching within a local neighborhood of the current value of first VOA control signal $a_1$ (1708) to find a new value that reduces the measured error. As a specific example, a description will be given in which the first VOA control signal $a_1$ (1708) is adjusted in steps of $+/-\Delta a_1$ to find a value that reduces measured error. The step size $\Delta a_1$ can be dynamically adjusted in each iteration. The first VOA control signal $a_1$ (1708) is first increased by $\Delta a_1$ and the resulting error in feedback 1760 is measured. Then, the first VOA control signal $a_1$ (1708) is decreased by $2\Delta a_1$ (i.e., decreased by $\Delta a_1$ from the original value) and the resulting error in feedback 1760 is again measured. The value of the first VOA control signal $a_1$ (1708) that resulted in the lower error is assigned as the new, adjusted value of the first VOA control signal $a_1$ (1708).

In step 2306, the second VOA control signal $a_2$ (1714) is adjusted (within its allowed range, such as −3 to +3) to reduce the measured error. The adjustment of the second VOA control signal $a_2$ (1714) can be performed by an optimization or pseudo-optimization algorithm (e.g., a gradient descent algorithm) that seeks to minimize or reduce the measured error. For example, the adjustment of the second VOA control signal $a_2$ (1714) can be performed by searching within a local neighborhood of the current value of second control signal $a_2$ (1714) to find a new value that reduces the measured error. As a specific example, a description will be given in which the second VOA control signal $a_2$ (1714) is adjusted in steps of $+/-\Delta a_2$ to find a value that reduces measured error. The step size $\Delta a_2$ can be dynamically adjusted in each iteration. For example, in some implementations, the step size $\Delta a_2$ can be configured to increase as the value $\sin^2(a_1)$ (of the first VOA control signal 1708) becomes smaller (and vice versa). In the search process of step 2306, the second VOA control signal $a_2$ (1714) is first increased by $\Delta a_2$ and the resulting error in feedback 1760 is measured. Then, the second VOA control signal $a_2$ (1714) is decreased by $2\Delta a_2$ (i.e., decreased by $\Delta a_2$ from the original value) and the resulting error in feedback 1760 is again measured. The value of the second VOA control signal $a_2$ (1714) that resulted in the lower error is assigned as the new, adjusted value of the second VOA control signal $a_2$ (1714). Then, the next iteration of adjusting the control signals is performed, returning back to step 2304.

Although the example method 2300 in FIG. 23 shows a specific ordering of steps, one or more of these steps can be performed in a different order. For example, steps 2304 and 2306 can be reversed. Furthermore, the specific ranges of values can be modified. For example, the range of values −3 to +3 for the first and second VOA controls signals can be modified to different ranges of values.

In some implementations, the techniques described herein for optical MIMO polarization demultiplexing can be applied to general 2×2 optical MIMO demultiplexing. For example, in some implementations, the techniques described herein can be implemented separately from or without the PBSR.

Figure 24:
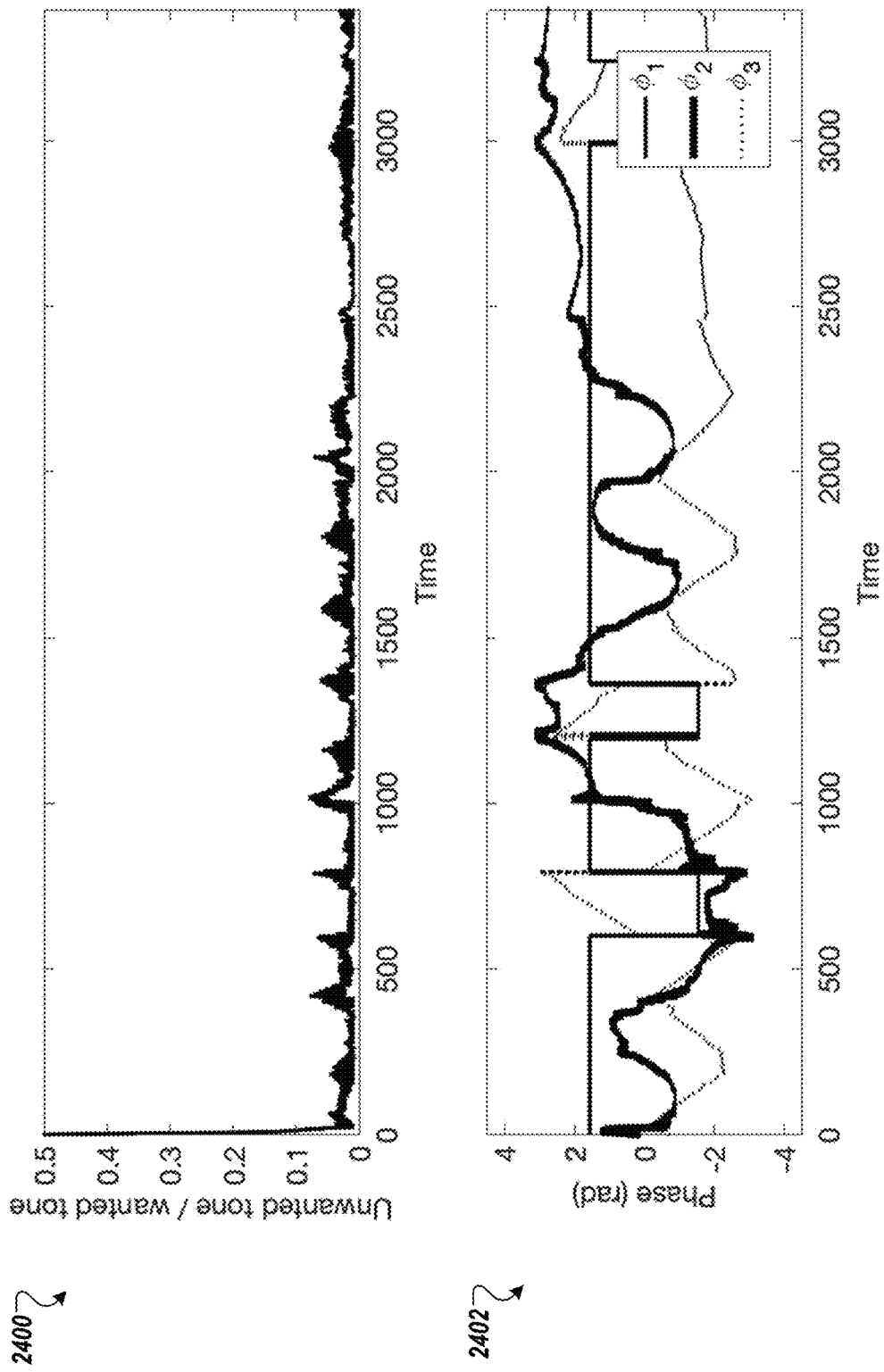
FIG. 24 illustrates examples of simulation results showing an operation of a PDM MIMO demultiplexer according to implementations of the present disclosure.

FIG. 24 illustrates examples of simulation results showing an operation of a PDM MIMO demultiplexer according to implementations of the present disclosure. In the simulation results of FIG. 24, the light which is input to the demultiplexer (simulating light that is received from a fiber transmission line) is continuously and randomly polarization-scrambled. The demultiplexer (e.g., demultiplexer 1600 of FIG. 16) is then controlled to continuously demultiplex the received signals.

Graph 2402 shows an example of an evolution of the three control signals $\varphi_1$ (1608), $\varphi_2$ (1610), and $\varphi_3$ (1612) over time, as they are adjusted by the control algorithm. Graph 2400 shows an example of the resulting amount of crosstalk, namely the error "e" discussed above.

Figure 25:
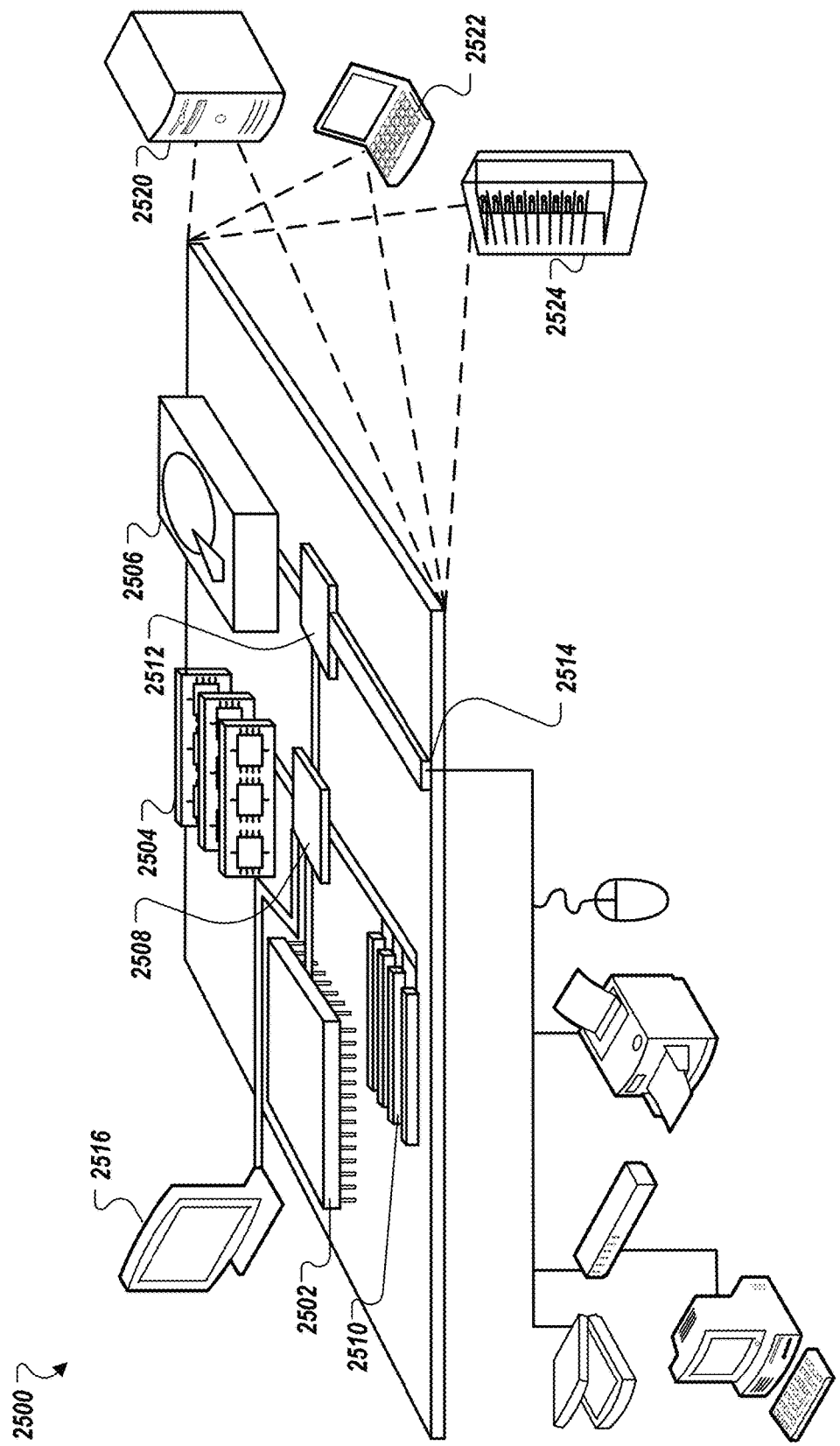
FIG. 25 is a diagram illustrating an example of a computing system that can be used to implement one or more components of a system that performs adaptive control of an optical MIMO demultiplexer based on Stokes measurements.

FIG. 25 is a diagram illustrating an example computing system 2500 that can be used to implement one or more components of a system that performs adaptive control of an optical MIMO demultiplexer based on Stokes measurements. The computing system 2500 can be used to implement the techniques described herein. For example, one or more parts of a controller (e.g., controller 806 of FIG. 8A, controller 816 of FIG. 8B, controller 906 of FIG. 9, controller 1106 of FIG. 11, controller 1644 of FIG. 16, controller 1756 of FIG. 17, controller 1906 of FIG. 19) and/or a pilot tone detector (e.g., pilot tone detector 1902 of FIG. 19) could be implemented by components of computing system 2500 described here.

The computing system 2500 is intended to represent various systems that include digital computers, such as laptops, desktops, workstations, personal digital assistants, servers, blade servers, mainframes, and other appropriate computers. The components shown here, their connections and relationships, and their functions, are meant to be examples only, and are not meant to be limiting.

The computing system 2500 includes a processor 2502, a memory 2504, a storage device 2506, a high-speed interface 2508 connecting to the memory 2504 and multiple high-speed expansion ports 2510, and a low-speed interface 2512 connecting to a low-speed expansion port 2514 and the storage device 2506. Each of the processor 2502, the memory 2504, the storage device 2506, the high-speed interface 2508, the high-speed expansion ports 2510, and the low-speed interface 2512, are interconnected using various busses, and may be mounted on a common motherboard or in other manners as appropriate. The processor 2502 can process instructions for execution within the computing system 2500, including instructions stored in the memory 2504 or on the storage device 2506 to display graphical information for a GUI on an external input/output device, such as a display 2516 coupled to the high-speed interface 2508. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 2502 is a single-threaded processor. In some implementations, the processor 2502 is a multi-threaded processor. In some implementations, the processor 2502 is a quantum computer.

The memory 2504 stores information within the computing system 2500. In some implementations, the memory 2504 is a volatile memory unit or units. In some implementations, the memory 2504 is a non-volatile memory unit or units. The memory 2504 may also be another form of computer-readable medium, such as a magnetic or optical disk.

The storage device 2506 is capable of providing mass storage for the computing system 2500. In some implementations, the storage device 2506 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 2502), perform one or more methods, such as those described above. The instructions can also be stored by one or more storage devices such as computer- or machine-readable mediums (for example, the memory 2504, the storage device 2506, or memory on the processor 2502).The high-speed interface 2508 manages bandwidth-intensive operations for the computing system 2500, while the low-speed interface 2512 manages lower bandwidth-intensive operations. Such allocation of functions is an example only. In some implementations, the high-speed interface 2508 is coupled to the memory 2504, the display 2516 (e.g., through a graphics processor or accelerator), and to the high-speed expansion ports 2510, which may accept various expansion cards (not shown). In the implementation, the low-speed interface 2512 is coupled to the storage device 2506 and the low-speed expansion port 2514. The low-speed expansion port 2514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing system 2500 may be implemented in a number of different forms, as shown in the figure. For example, it may be implemented as a standard server 2520, or multiple times in a group of such servers. In addition, it may be implemented in a personal computer such as a laptop computer 2522. It may also be implemented as part of a rack server system 2524.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. An optical multiple-input-multiple-output (MIMO) receiver comprising:
   an input port configured to receive input light;
   a Stokes measurement apparatus configured to generate measurements of Stokes parameters;
   an optical MIMO demultiplexer configured to generate a plurality of demultiplexed output light signals based on (i) the input light and (ii) the measurements of the Stokes parameters generated by the Stokes measurement apparatus, wherein the optical MIMO demultiplexer is configured to receive an electrical signal from the Stokes measurement apparatus and phase-shift light in the optical MIMO demultiplexer based on the electrical signal; and
   a plurality of output ports configured to output the plurality of demultiplexed output light signals generated by the optical MIMO demultiplexer,
   wherein an analog bandwidth at which the Stokes measurement apparatus is configured to measure the Stokes parameters is smaller than an analog bandwidth of the demultiplexed output light signals, and
   wherein a bandwidth of the electrical signal received from the Stokes measurement apparatus is smaller than the analog bandwidth of the demultiplexed output light signals.

2. The optical MIMO receiver of claim 1, wherein the Stokes measurement apparatus comprises a plurality of balanced photodiode pairs, and
   wherein the plurality of balanced photodiode pairs are configured with reception bandwidths that are smaller than the analog bandwidth of the demultiplexed output light signals.

3. The optical MIMO receiver of claim 1 wherein the Stokes measurement apparatus is integrated on the same substrate as the optical MIMO demultiplexer.

4. The optical MIMO receiver of claim 1 wherein the Stokes measurement apparatus and the optical MIMO demultiplexer share a polarization beam-splitter (PBS).

5. The optical MIMO receiver of claim 1, wherein the Stokes measurement apparatus is configured to measure the Stokes parameters from an optical input of the optical MIMO demultiplexer or from an optical output of the optical MIMO demultiplexer.

6. The optical MIMO receiver of claim 5, wherein the Stokes measurement apparatus is configured to provide the measurements of the Stokes parameters to the optical MIMO demultiplexer in a feedforward structure or in a feedback structure.

7. The optical MIMO receiver of claim 1, further comprising an electrical filter configured to detect whether a marker tone is present on the input light.

* * * * *